(12) United States Patent
Ozawa et al.

(10) Patent No.: US 7,693,397 B2
(45) Date of Patent: Apr. 6, 2010

(54) WATCHING SUPPORT APPARATUS AND PROGRAM RECORDING SYSTEM

(75) Inventors: Jun Ozawa, Nara (JP); Eiichi Naito, Yawata (JP)

(73) Assignee: Panasonic Corporation, Osaka (JP)

(*) Notice: Subject to any disclaimer, the term of this patent is extended or adjusted under 35 U.S.C. 154(b) by 1357 days.

(21) Appl. No.: 11/132,271

(22) Filed: May 19, 2005

(65) Prior Publication Data
US 2005/0213938 A1  Sep. 29, 2005

Related U.S. Application Data

(63) Continuation of application No. PCT/JP2005/005351, filed on Mar. 24, 2005.

(30) Foreign Application Priority Data

Mar. 25, 2004  (JP) .............................. 2004-089681

(51) Int. Cl.
 H04N 5/76 (2006.01)
 H04N 7/00 (2006.01)
 H04N 7/10 (2006.01)
 H04N 7/025 (2006.01)

(52) U.S. Cl. .............................. 386/83; 386/46; 725/32

(58) Field of Classification Search .................. None
See application file for complete search history.

(56) References Cited

U.S. PATENT DOCUMENTS

| | | | | |
|---|---|---|---|---|
| 5,758,259 | A * | 5/1998 | Lawler | 725/45 |
| 6,674,959 | B2 * | 1/2004 | Maruyama et al. | 386/95 |
| 6,681,396 | B1 * | 1/2004 | Bates et al. | 725/58 |
| 2002/0151271 | A1 * | 10/2002 | Tatsuji et al. | 455/3.05 |
| 2003/0237097 | A1 * | 12/2003 | Marshall et al. | 725/105 |

FOREIGN PATENT DOCUMENTS

| | | |
|---|---|---|
| JP | 9-102827 | 4/1997 |
| JP | 11-164217 | 6/1999 |
| JP | 2001-238157 | 8/2001 |
| JP | 2002-199316 | 7/2002 |
| JP | 2003-179919 | 6/2003 |
| JP | 2004-007659 | 1/2004 |
| JP | 2005-020395 | 1/2005 |
| JP | 2005-101970 | 4/2005 |

\* cited by examiner

*Primary Examiner*—Thai Tran
*Assistant Examiner*—Gelek Topgyal
(74) *Attorney, Agent, or Firm*—Wenderoth, Lind & Ponack, L.L.P.

(57) ABSTRACT

A watching support apparatus and a program recording system recording a currently broadcasted program or a program to be broadcasted by an in-home recording apparatus set in a user's residential area even in the case where the user goes to a different location from the user's residential area. A watching support apparatus includes: a recording apparatus position obtainment unit which obtains information indicating a location where the recording apparatus is positioned; a recordable-program guide obtainment unit which obtains a program guide including broadcast content of the recording apparatus setting position; a watching possible program guide obtainment unit which obtains a program guide including broadcast content in the current location; a same program judgment unit which compares a program included in the watching possible program guide with a program included in the recordable-program guide, and judges sameness of the respective programs; and a display unit which displays whether or not the currently watched program can be recorded by the recording apparatus based on the sameness judged by the sameness judgment unit.

19 Claims, 45 Drawing Sheets

FIG. 9

| | NKK | T TV | F TV |
|---|---|---|---|
| 11:00 | 00 Today's cooking<br>25 Downtown gourmet | 00 Sunday Japan | 00 Smile, smile<br>45 News<br>05 Love birds |
| 12:00 | 00 News<br>10 Singing contest | 45 Viva, life | |
| 13:00 | 00 Family<br>30 No.1 Comedy | | 00 Great professor<br>45 The non-fiction |
| 14:00 | 00 Chorus contest | 00 Tokyo magazine | |
| 15:00 | | 00 Three o'clock for you | 00 Japan open golf |

FIG. 10

| | NKK | T TV | F TV |
|---|---|---|---|
| 11:00 | 00 Today's cooking<br><br>25 Downtown gourmet | 00 Sunday Japan<br><br>45 Movie "Magic delivery" | 00 Smile, smile<br><br>45 News<br><br>05 Resident officer |
| 12:00 | 00 News<br>10 Singing contest | | |
| 13:00 | 00 Family<br><br>30 No.1 Comedy | | 00 Great professor<br><br>45 The non-fiction |
| 14:00 | 00 Chorus contest | 00 Go with SMASMA | |
| 15:00 | | 00 Three o'clock for you | 00 Japan open golf |

FIG. 11

| | NKK | T TV | F TV |
|---|---|---|---|
| 11:00 | 00 Today's cooking (S)<br>25 Downtown gourmet (S) | 00 Sunday Japan (S)<br><br>45 Viva, life | 00 Smile, smile (S)<br>45 News (S)<br>05 Love birds |
| 12:00 | 00 News (S)<br>10 Singing contest (S) | | |
| 13:00 | 00 Family (S)<br>30 No.1 Comedy (S) | | 00 Great professor (S)<br>45 The non-fiction (S) |
| 14:00 | 00 Chorus contest (S) | 00 Tokyo magazine | |
| 15:00 | | 00 Three o'clock for you (S) | 00 Japan open golf (S) |

(S) : Recordable programs

| Recording apparatus setting position | Current location |
|---|---|
| San Diego | Utah |
| Professional baseball news<br>·Spanish<br>·French | Professional baseball news<br>·Only English broadcast |

FIG. 23

| Theme | Watching time (time) |
|---|---|
| Drama | 1.2 |
| Sports | 21.4 |
| News | 2.5 |
| Variety | 4.3 |
| Others | 12.9 |
| Total | 42.3 |

FIG. 30

| Recording ID | Date | Time | Title | From_command |
|---|---|---|---|---|
| ... | ... | ... | ... | ... |
| 11 | 03/10/02 | 10:00:00 | News forest | Direct Manipulation |
| 12 | 03/10/21 | 9:10:13 | Viva, sports | Mobile_Phone 090-**-** |
| ... | ... | ... | ... | ... |
| 15 | 03/10/30 | 19:15:35 | News paradise | Mobile_Phone 090-**-** |
| ... | ... | ... | ... | ... |

FIG. 38

```
Tag information of moving picture
<Mpeg7>
  <Description xsi:type="ContentEntityType">
    <MultimediaContent xsi:type="AudioVisualType">
      <AudioVisual>
        <MediaLocator>
          <MediaUri>http://www.somewhere.co.jp/news.mpg</MediaUri>
        </MediaLocator>
        <TextAnnotation>
          <FreeTextAnnotation>News grove</FreeTextAnnotation>     ←―― Program title
        </TextAnnotation>
        <TemporalDecomposition>
          <AudioVisualSegment id="Change of prime minister due to scandal">
            <MediaTime>                                        ⎫  From 0 seconds to 3 minutes and 24 seconds
              <MediaTimePoint>PT0S</MediaTimePoint>            ⎬  News related to "Change of prime
              <MediaDuration>PT3M24S</MediaDuration>           ⎭  minister due to scandal"
            </MediaTime>
          </AudioVisualSegment>
          <AudioVisualSegment id="Criminal of parent and child murder in Suminoe arrested">
            <MediaTime>                                        ⎫  From 3 minuted and 24 seconds to 6 minutes
              <MediaTimePoint>PT3M24S</MediaTimePoint>         ⎬  and 33 seconds
              <MediaDuration>PT6M33S</MediaDuration>           ⎭  News related to "Criminal of parent and child
            </MediaTime>                                          murder in Suminoe arrested"
          </AudioVisualSegment>
          :
          :
      </AudioVisual>
  </Description>
</Mpeg7>
```

WATCHING SUPPORT APPARATUS AND PROGRAM RECORDING SYSTEM

CROSS REFERENCE TO RELATED APPLICATION

This is a continuation of PCT application No. PCT/JP2005/005351, filed on Mar. 24, 2005.

BACKGROUND OF THE INVENTION (1) Field of the Invention

The present invention relates to a watching support apparatus and a program recording system which support watching and recording programs such as TV broadcast.

(2) Description of the Related Art

In recent years, along with the widespread digital broadcast, various kinds of programs have been broadcasted. Also, due to the widespread use of Electronic Program Guide (hereinafter, referred to as EPG), it has been made possible to check, on TV screen, the schedule of programs to be broadcasted in the future. Moreover, along with the widespread use of hard disk and Digital Versatile Disc (DVD), it has been made possible to easily record programs.

For example, Japanese Laid-Open Patent Application No. 09-102827 discloses a technique for remote-controlling electronic devices in home by using a cellular phone. In particular, it has been made possible to set timer recording from outside by remote-controlling a device which can receive broadcast in home using a cellular phone.

Also, Japanese Laid-Open Patent Application No. 11-164217 suggests a system in which: user's taste for TV programs is extracted based on the details of timer recording into a hard disk and the like, and a watching history of programs; and a program associated with the user's taste is recommended among the programs to be broadcasted in the future.

However, there is a case where even when a user attempts to record a currently broadcasted program or a program checked in an EPG, the program is not broadcasted in the location (in many cases the user's home) where a recording apparatus is positioned. Therefore, there is a case where a user cannot record content even if the user attempts to record the content by an in-home recording apparatus, the content being watched using a cellular phone.

Also, in the case where a user goes to a different location from the user's residential area, the user can watch an EPG of the different location. However, in such case as described above, even if the user attempts to record a program by an in-home recording apparatus using the EPG of the different location, the same program may not be broadcasted in the user's residential area.

In addition, in the case where a user goes to a different location from the user's residential area, the user can enjoy entertainment of the different location by watching broadcast content of the different location which is different from broadcast content that the user usually watches. However, in the program recommendation system in which the conventional statistical information is used, the same program as usual is recommended using information regarding the user's usual taste, although there are programs that can be watched only in the different location.

Moreover, even when a user attempts to record a currently broadcasted program by an in-home recording apparatus, it takes time to connect from a cellular phone to the in-home recording apparatus and set recording. Therefore, the currently broadcasted program may not be recorded. Furthermore, in the case where the in-home recording apparatus is being used or timer recording is already set, recording may not be performed by the in-home recording apparatus.

SUMMARY OF THE INVENTION

An object of the present invention, in view of the above mentioned problems, is to provide a watching support apparatus and a program recording system which can support easily recording a currently broadcasted program or a program to be broadcasted by an in-home recording apparatus set in user's residential area, even in the case where the user goes to a different location from the user's residential area.

In order to achieve the above mentioned object, the watching support apparatus according to the present invention supports watching of a broadcast program, the apparatus including: a same program judgment unit operable to judge sameness of a program included in a watching possible program guide which is a program guide in a current location of the apparatus and a program included in a recordable-program guide which is a program guide in a location where a recording apparatus is positioned; and a display unit operable to display the sameness of the programs judged by the same program judgment unit.

As it is evident from the above mentioned description, according to the watching support apparatus of the present invention, for example, even in the case where a user goes to a different location from the user's residential area, support can be performed so that a currently broadcasted program and a program to be broadcasted can be easily recorded by the recording apparatus set in the user's residential area. Therefore, a broadcasted program can be watched using a mobile terminal such as a cellular phone. Moreover, the watching support apparatus according to the present invention is highly valuable today when remote recording can be performed, using the mobile terminal via network, by an apparatus such as a hard disk recorder and a DVD recorder.

FURTHER INFORMATION ABOUT TECHNICAL BACKGROUND TO THIS APPLICATION

The disclosure of Japanese Patent Application No. 2004-089681 filed on Mar. 25, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 9 is a diagram showing an example of a watching possible program guide;

FIG. 10 is a diagram showing an example of a recordable-program guide;

FIG. 11 is a diagram showing an example of a program guide to which a mark is added, the mark indicating that recording is possible;

FIG. 23 is a diagram showing an example of each watching time calculated per theme;

FIG. 30 is a diagram showing an example of recording information of programs recorded by the second recording apparatus;

FIG. 38 is a diagram showing an example of tag information;

DESCRIPTION OF THE INVENTION

Figure 1:
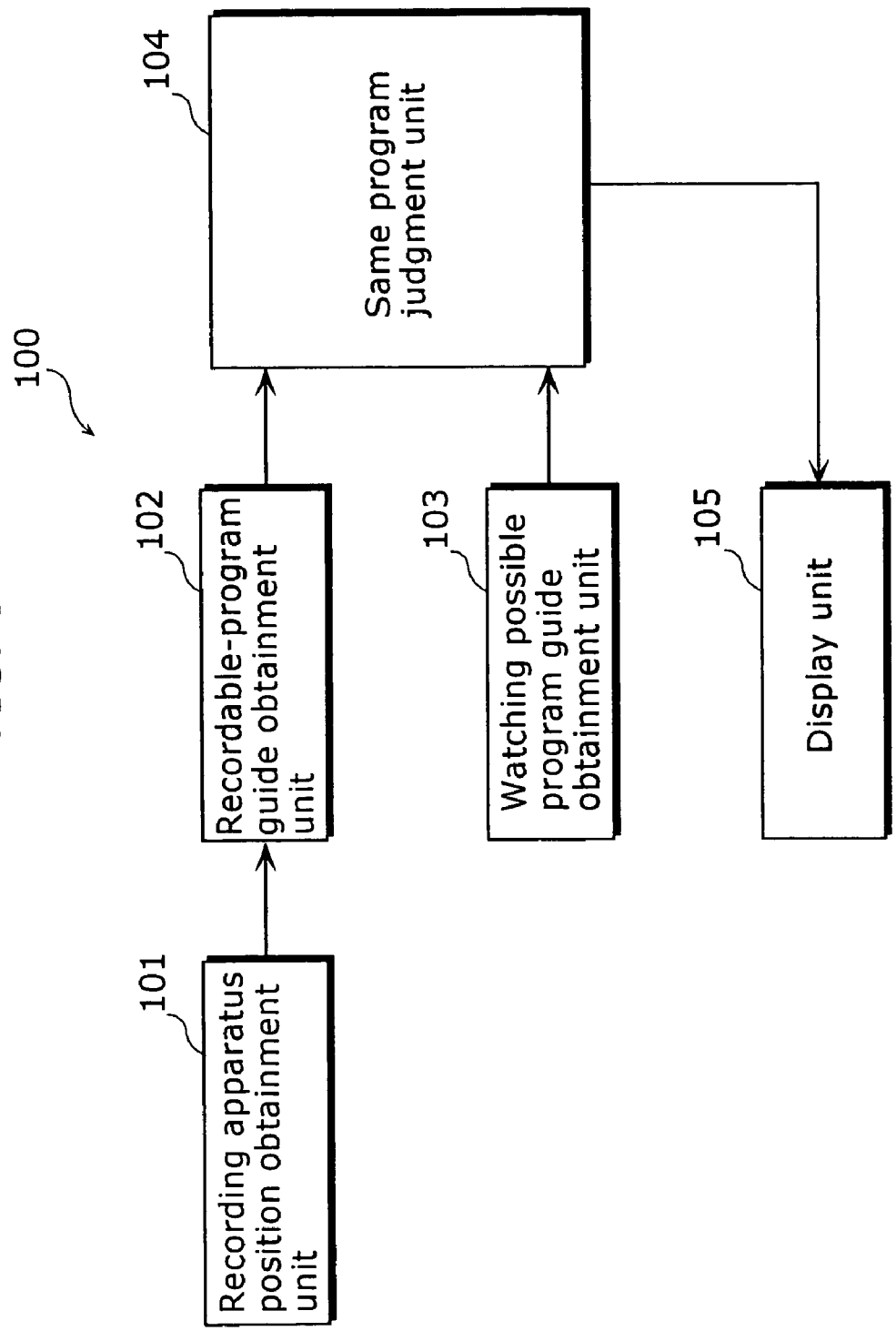
FIG. 1 is a block diagram showing a configuration of a watching support apparatus according to the first embodiment of the present invention.

A watching support apparatus according to the present invention supports watching of a program, the apparatus including: a same program judgment unit operable to judge sameness of a program included in a watching possible program guide which is a program guide in a current location of the apparatus and a program included in a recordable-program guide which is a program guide in a location where a recording apparatus is positioned; and a display unit operable to display the sameness of the programs judged by the same program judgment unit. Therefore, for example, even in the case where a user goes to a different location from the user's residential area, support can be performed so that a currently broadcasted program and a program to be broadcasted can be recorded by the recording apparatus set in the user's residential area.

Here, the same program judgment unit may include: a time extraction unit operable to extract at least one of a start time, an end time and a broadcast time of a certain program included in the watching possible program guide; a search unit operable to search the recordable-program guide for a program, based on at least one of the start time, the end time and the broadcast time of the certain program which have been extracted by the time extraction unit, and to extract the program found in the search; a text extraction unit operable to extract text information of the program included in the recordable-program guide, the program having been extracted by the search unit, and text information of the certain program; a correspondence degree calculation unit operable to calculate a correspondence degree by comparing the text information of the recordable program with the text information of the certain program, the respective text information having been extracted by the text extraction unit; and a judgment unit operable to judge whether or not a program having sameness as the certain program exists based on the correspondence degree calculated by the correspondence degree calculation unit. Thereby, it can be judged whether or not the programs are the same, using the information regarding the broadcast time of the program and the text information described in the program guide such as the title, the sub-title and the performers of the program.

Also, the search unit may search the recordable-program guide for a program based on a start time and an end time of the certain program, and may extract the program having the same start time and the end time as the certain program.

The search unit may search the recordable-program guide for a program based on a broadcast time of the certain program, and may extract the program having the same broadcast time as the broadcast time of the certain program.

The watching support apparatus may further include: a recording apparatus position obtainment unit operable to obtain information indicating a location where the recording apparatus is positioned; a recordable-program guide obtainment unit operable to obtain the recordable-program guide in the location indicated in the information obtained by the recording apparatus position obtainment unit; and a watching possible program guide obtainment unit operable to obtain the watching possible program guide.

The watching support apparatus may further include: a recordable-program guide storage unit operable to store the recordable-program guide; a watching possible program guide storage unit operable to store the watching possible program guide; a recordable-program guide update unit operable to: obtain the watching possible program guide; judge whether or not the obtained watching possible program guide is the program guide in the location where the recording apparatus is positioned; and (i) store the obtained watching possible program guide into the recordable-program guide storage unit in the case where the obtained watching possible program guide is the program guide in the location where the recording apparatus is positioned, and (ii) store the obtained watching possible program guide into the watching possible program guide storage unit in the case where the obtained watching possible program guide is not the program guide in the location where the recording apparatus is positioned, and the same program judgment unit may judge the sameness of a program included in the recordable-program guide stored in the recordable-program guide storage unit and a program included in the watching possible program guide stored in the watching possible program guide storage unit. Therefore, in the case where the program guide of the recording apparatus setting position is already stored, it is possible to judge whether or not the programs are the same without obtaining a new program guide.

The watching support apparatus may further include: an associated program guide judgment unit operable to judge whether or not the recordable-program guide associated with the watching possible program guide is stored in the recordable-program guide storage unit, in the case where the obtained watching possible program guide is not the program guide in the location where the recording apparatus is positioned; and an associated program guide obtainment unit operable to obtain the recordable-program guide associated with the watching possible program guide in the case where the associated program guide judgment unit judges that the recordable-program guide associated with the watching possible program guide is not stored in the recordable-program guide storage unit. Therefore, even in the case where the program guide of the recording apparatus setting position is not stored, a new program guide of the recording apparatus setting position can be obtained via network. Thus, it is possible to judge whether or not the programs are the same.

The watching support apparatus may further include: a providing source detection unit operable to detect respective providing sources of the watching possible program guide and the recordable-program guide; and a same providing source program guide obtainment unit operable to obtain a watching possible program guide and a recordable-program guide having the same providing source, in the case where the detected providing source of the watching possible program guide and the detected providing source of the recordable-program guide are different, and the same program judgment unit may judge the sameness of a program included in the watching possible program guide and a program included in the recordable-program guide obtained by the same providing source program guide obtainment unit. Therefore, in the case where the providing sources of the watching possible program guide and the recordable-program guide are different, the program guides having the same providing source are obtained and used for judging the same programs. Thereby, it is possible to prevent the same programs from being expressed differently by the distribution agent. Thus, it is possible to judge the same programs more accurately.

Also, the display unit may display whether or not the currently watched program can be recorded by the recording apparatus, based on the sameness of the programs judged by the same program judgment unit. Thereby, in the case where the user watches a program in a location remote from the user's own recording apparatus setting position, it can be judged whether or not the currently watched program is broadcasted in the recording apparatus setting position. Then, the judgment result can be displayed on the screen. Thus, the user can immediately judge whether or not it is possible to set recording of the currently watched program on the recording apparatus via network.

The display unit may further display a watching possible language of the program which can be recorded by the recording apparatus based on the recordable-program guide, in the case where the currently watched program can be recorded by the recording apparatus.

Also, the display unit may add, to the watching possible program guide, information indicating whether or not each program can be recorded by the recording apparatus based on the sameness of the respective programs judged by the same program judgment unit, and may display the watching possible program guide added with the information.

Thereby, in the case where the user watches a program in a location remote from the user's own recording apparatus setting position, it is possible to display a program guide added with the information indicating whether or not the program can be recorded by the recording apparatus. Thus, the user can immediately judge whether or not it is possible to set recording of the program to be broadcasted in the current location via network.

The watching support apparatus may further include a selection reception unit operable to receive a selection instruction of a program guide, and the display unit may display one of the recordable-program guide, the watching possible program guide and the watching possible program guide added with the information indicating the recording possibility, based on the selection instruction.

The watching support apparatus may further include: a taste information accumulation unit operable to accumulate taste information; and a program recommendation unit operable to select a program based on the taste information, the watching possible program guide and the recordable-program guide, and to recommend the selected program.

Thereby, in the case where the user watches a program in a location remote from the user's residential area, it is possible to preferentially recommend the program broadcasted only in the current location. Thus, it is possible to avoid missing the program which can be watched only in the move destination.

The program recommendation unit may preferentially select a program which is not included in the recordable-program guide from among the programs included in the watching possible program guide. Also, the taste information may be extracted from a watching history of a program.

Also, the watching support apparatus may further include: a program reception unit operable to receive a program; a program recording unit operable to record the program received by the program reception unit; and a recording instruction unit operable to instruct the recording apparatus to record the program recorded by the program recording unit, in the case where the same program judgment unit judges that the same program as the program recorded by the program recording unit is included in the recordable-program guide.

A program recording system according to the present invention includes a first recording apparatus and a second recording apparatus, wherein the first recording apparatus includes: a first program reception unit operable to receive a program; a same program judgment unit operable to judge sameness of a program included in a watching possible program guide which is a program guide in a current location of the apparatus and a program included in a recordable-program guide which is a program guide in a location where the second recording apparatus is positioned; a display unit operable to display the sameness of the programs judged by the same program judgment unit; a first program recording unit operable to record the program received by the first program reception unit; and a recording instruction unit operable to instruct the second recording apparatus to record the program recorded by the first program recording unit, in the case where the same program judgment unit judges that the same program as the program recorded by the program recording unit is included by in the recordable-program guide, and the second recording apparatus includes: a second program reception unit operable to receive a program instructed to record by the recording instruction unit; and a second program recording unit operable to record the program received by the second program reception unit.

Thereby, the user can start recording, by the first recording apparatus, the program currently watched using the first recording apparatus such as a mobile terminal. Moreover, the recording instruction can be provided to the second recording apparatus such as an in-home recording apparatus. Thus, the user can easily record a desired program by the second recording apparatus where a stable reception state can be desired.

The second recording apparatus may further include a recording information transmission unit operable to notify the first recording apparatus that the second program recording unit has started recording the program instructed to record, and the first program recording unit may cancel recording the program after the recording information transmission unit notifies the recording start.

The second program recording unit may generate a recording ID for specifying the program instructed to record, and may record the program so that the program is associated with the recording ID. The recording information transmission unit may notify the recording ID to the first recording apparatus. And, the first program recording unit may associate the notified recording ID with the program, and may store the recording ID associated with the program.

The second recording apparatus may further include: a recorded program obtainment unit operable to obtain the program recorded by the first recording apparatus; and a program combination unit operable to combine the obtained program and the program recorded by the second program recording unit, based on the recording ID.

Thereby, it is possible to combine a part of the program recorded by the first recording apparatus and a part of the program recorded by the second recording apparatus. Thus, the user can reproduce, as one program, both of the parts recorded by the first recording apparatus and the second recording apparatus without reproducing them separately.

The second recording apparatus may further include: a sampling moving picture extraction unit operable to extract respective content data for a time part which is common between the program obtained by the recording program obtainment unit and the program recorded by the second program recording unit; a sound volume power measurement unit operable to measure respective sound volume powers of the content data extracted by the sampling moving picture extraction unit; and an amendment amount calculation unit operable to calculate an amendment amount of at least one of the sound volume powers so that the respective sound volume powers measured by the sound volume power measurement unit are the same, and the program combination unit may amend at least one of the sound volume powers based on the amendment amount calculated by the amendment amount calculation unit, and may combine the program obtained by the recorded program obtainment unit and the program recorded by the second program recording unit. Thereby, using the recorded parts broadcasted at the same time, at least one of the respective sound volume powers of the recorded content data is amended, and the recorded programs are combined. Thus, it is not necessary to readjust the volume and the like when reproducing the program.

The second recording apparatus may further include: a tag information obtainment unit operable to obtain tag information related to the program obtained by the recorded program obtainment unit and the program recorded by the second program recording unit; and a switching part detection unit operable to detect a switching part of scenes of the program based on the tag information obtained by the tag information obtainment unit. And, said program combination unit may combine the program obtained by the recorded program obtainment unit and the program recorded by the second program recording unit in the switching part of scenes of the program detected by the switching part detection unit.

Thereby, the switching part of the programs is detected from the tag information of the recorded programs, and the recorded contents are combined using the switching part of the programs. Thus, the well-presented combination of the recorded programs can be realized.

The second recording apparatus may further include a combination key judgment unit operable to extract a combination key from the program obtained by the recorded program obtainment unit, and to judge whether or not the extracted combination key exists in the program recorded by the second program recording unit. And, the program combination unit may combine the program obtained by the recorded program obtainment unit and the program recorded by the second program recording unit, in the case where the combination key judgment unit judges that the combination key exists in the program recorded by the second program recording unit. Thereby, the programs can be combined by licensing copying of the content recorded by the first recording apparatus into a recorded content having the combination key. Also, illegal copy can be prevented by prohibiting copying of the recorded content into the media which do not have the combination key.

The second recording apparatus may further include a recorded program deletion unit operable to delete the program obtained by the recorded program obtainment unit from the obtainment source of the program. Thereby, it can be prevented that the program is recorded in a plurality of media.

The second recording apparatus may further include a recording possibility judgment unit operable to judge whether or not recording is possible when the recording instruction is received from the recording instruction unit. And, the recording information transmission unit may notify the first recording apparatus that recording is not possible when the recording possibility judgment unit judges that the recording is not possible.

The recording possibility judgment unit may further judge whether or not the program instructed to record is being recorded by the second program recording unit when the recording instruction is received from the recording instruction unit. And, the recording information transmission unit may notify the first recording apparatus that the program is being recorded when the recording possibility judgment unit judges that the program is being recorded.

Thereby, in the case where the recording instruction is provided from the first recording apparatus to the second recording apparatus, response can be made according to the situation.

The present invention can be realized not only as the watching support apparatus and the program recording system, but also as a watching support method and a program recording method which have, as steps, the characteristic units included in the watching support apparatus and the program recording system. Also, the present invention can be realized as a program which causes a computer to execute these steps. Needless to say, the program can be distributed via a recording medium such as a CD-ROM or a transmission medium such as Internet.

Hereinafter, each embodiment of the present invention will be described referring to the drawings.

First Embodiment

FIG. 1 is a block diagram showing a configuration of a watching support apparatus according to the first embodiment of the present invention.

A watching support apparatus 100 is an apparatus which supports a user to watch programs. And, the watching support apparatus 100 includes: a recording apparatus position obtainment unit 101; a recordable-program guide obtainment unit 102; a watching possible program guide obtainment unit 103; the same program judgment unit 104; and a display unit 105.

The recording apparatus position obtainment unit 101 obtains information indicating a position (hereinafter, referred to as a recording apparatus setting position) where a recording apparatus is positioned. The recordable-program guide obtainment unit 102 obtains a program guide (hereinafter, referred to as a recordable-program guide) of broadcast content (programs) in a recording apparatus setting position. The watching possible program guide obtainment unit 103 obtains a program guide (hereinafter, referred to as a watching possible program guide) of broadcast content in the current location. The same program judgment unit 104 compares a watching possible program guide with a recordable-program guide, and judges sameness of the programs listed in the respective guides. The display unit 105 displays whether or not a currently watched program can be recorded, based on the sameness of the programs judged by the same program judgment unit 104.

Figure 2:
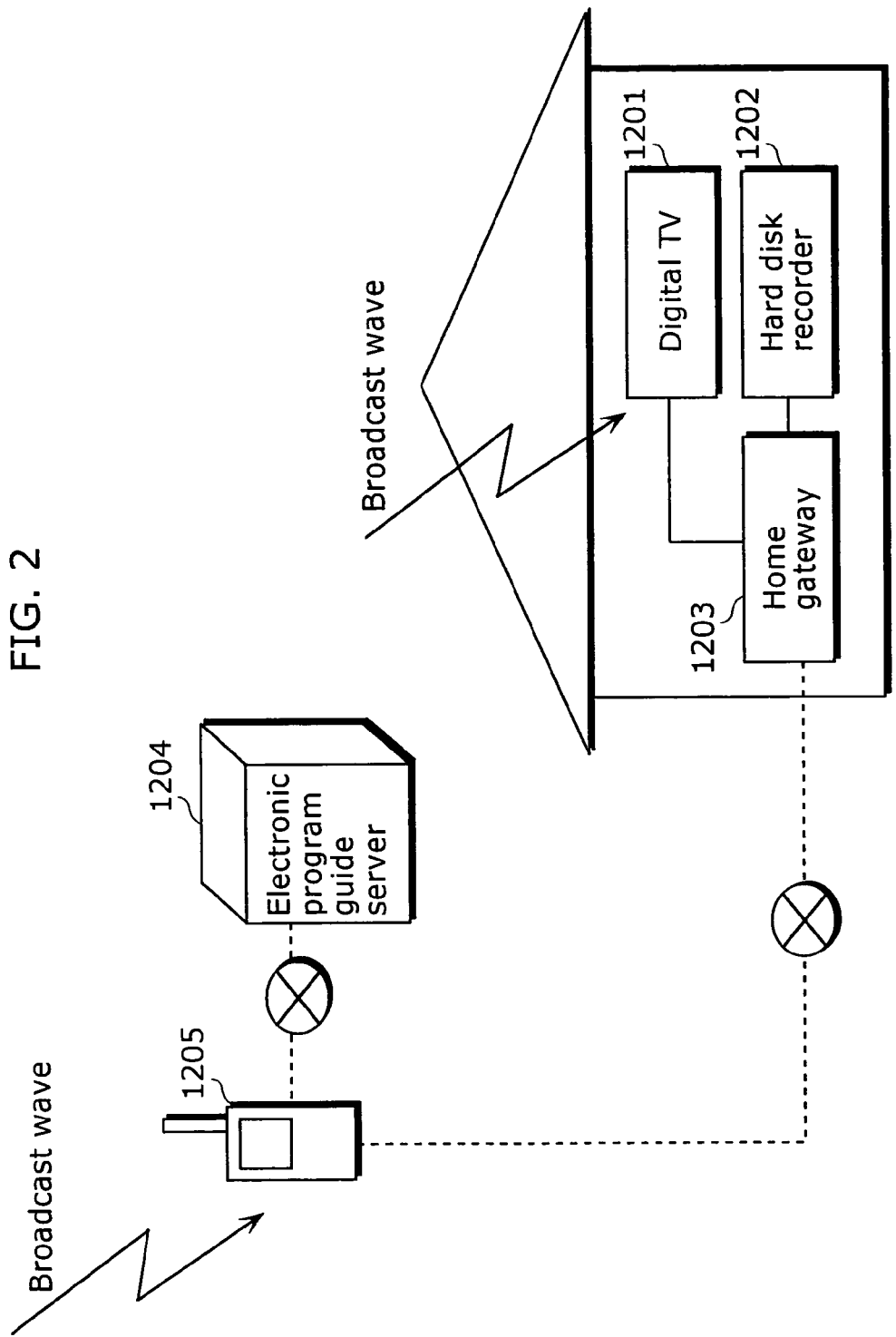
FIG. 2 is a diagram showing an example of hardware configuration in which a watching support apparatus according to the first embodiment of the present invention is used.

FIG. 2 is a diagram showing an example of hardware configuration in which a watching support apparatus according to the first embodiment of the present invention is used. This system includes: a digital TV 1201 which receives digital broadcast; a hard disk recorder 1202 which is a recording apparatus that can accumulate digital broadcast into a hard disk; a home gateway 1203 which connects in-home networking devices to outside-home networking devices; an electronic program guide server 1204 where electronic program guides (EPG) are accumulated, and which can be accessed from an external network; and a cellular phone 1205 which can receive and display digital broadcast, and has a watching support apparatus 100.

Figure 3:
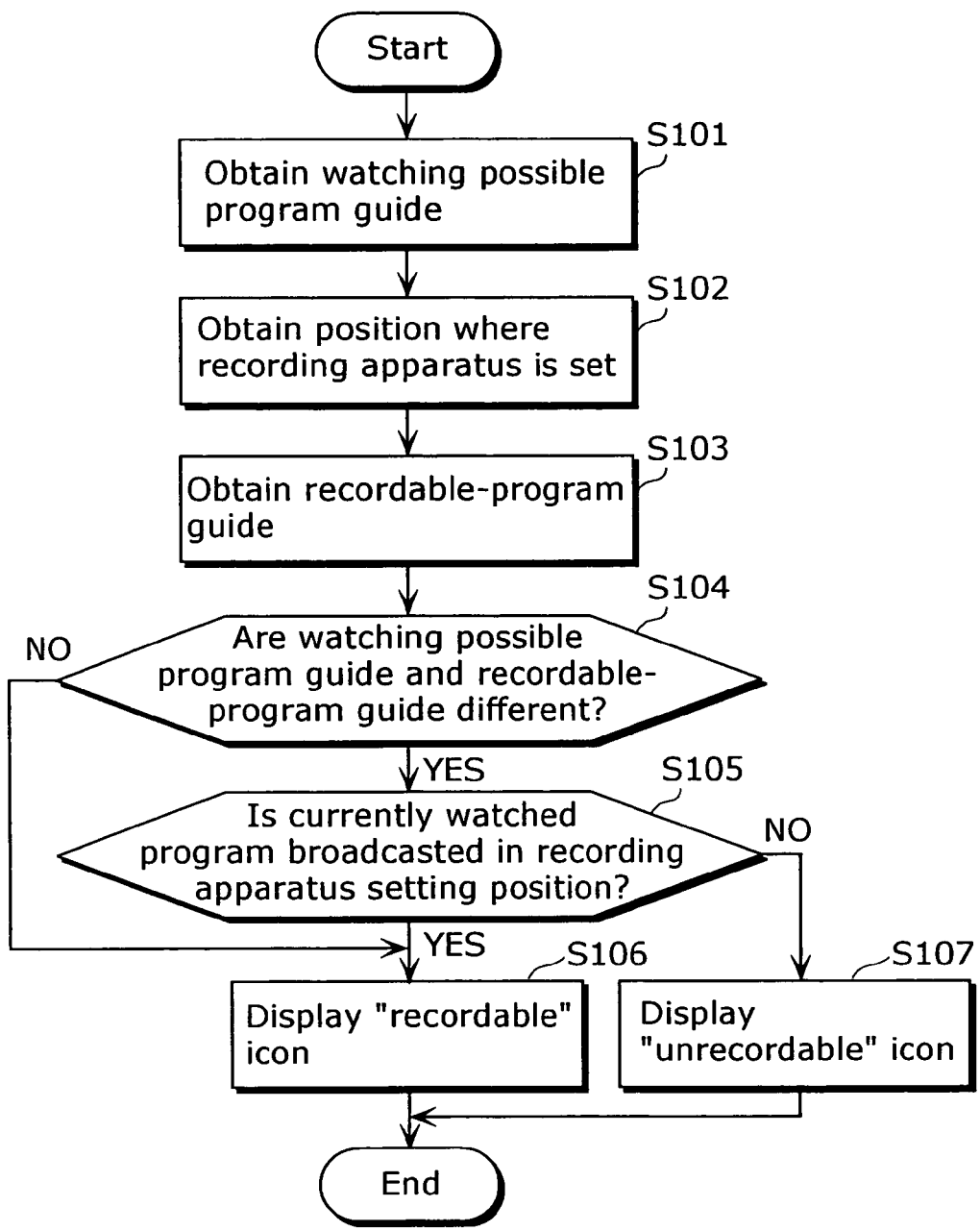
FIG. 3 is a flowchart showing an operational flow of the case where a user watches a program using a cellular phone.

Next, the following operations will be described: a user watches a program in a location remote from the location where the recording apparatus (hard disk recorder 1202) is positioned, using the cellular phone 1205 which has the watching support apparatus 100 configured as described above. FIG. 3 is a flowchart showing a flow of operations performed in the case where the user watches the program using the cellular phone 1205. Here, for example, the recording apparatus setting position is Osaka (home and the like), and the user is in Tokyo on business trip.

First, the watching possible program guide obtainment unit 103 obtains, from a received broadcast wave, a watching possible program guide which is a program guide in the current location (step S101). Here, it is assumed that a program guide distributed in the multiplexed state in each area where the user carries the cellular phone 1205. Therefore, the cellular phone 1205 with a built-in broadcast receiving tuner can receive a program guide related to programs which can be received in each area. Also, the cellular phone 1205 may have a Global Positioning System (GPS) function, and may obtain a program guide of each area from the electronic program guide server 1204 via network by specifying the current location.

Next, the recording apparatus position obtainment unit 101 obtains information indicating a location where a recording apparatus is positioned, the recording apparatus being able to be randomly accessed such as a hard disk recorder and a DVD recorder (step S102). The recording apparatus receives a program to be broadcasted, and records the program into a storage medium. Therefore, in general the recording apparatus setting position tends to be the user's home and the like. Here, the recording apparatus setting position may be already set.

The recordable-program guide obtainment unit 102 accesses the electronic program guide server 1204, for example, via network, and obtains a recordable-program guide which is a program guide in the recording apparatus setting position (Osaka) obtained by the recording apparatus position obtainment unit 101 (step S103).

Next, the same program judgment unit 104 judges whether or not the watching possible program guide and the recordable-program guide are different (step S104). Here, according to the example of the present embodiment, since different programs are broadcasted in each area, the distributed program guides are different between the recording apparatus setting position (Osaka) and a location (Tokyo) where the user is currently present.

As a result of the judgment, in the case where the watching possible program guide and the recordable-program guide are different (YES in step S104), the same program judgment unit 104 judges whether or not the currently watched program is broadcasted in the location (Osaka) where the recording apparatus is positioned (step S105). Here, even in the case where the same program is not broadcasted in the same time period, but the same program is to be broadcasted at a different time in the future or in a week, it is judged that the same program is broadcasted. Also, in the case where the same program has been already broadcasted, it is judged that the same program is not broadcasted.

Figure 4:
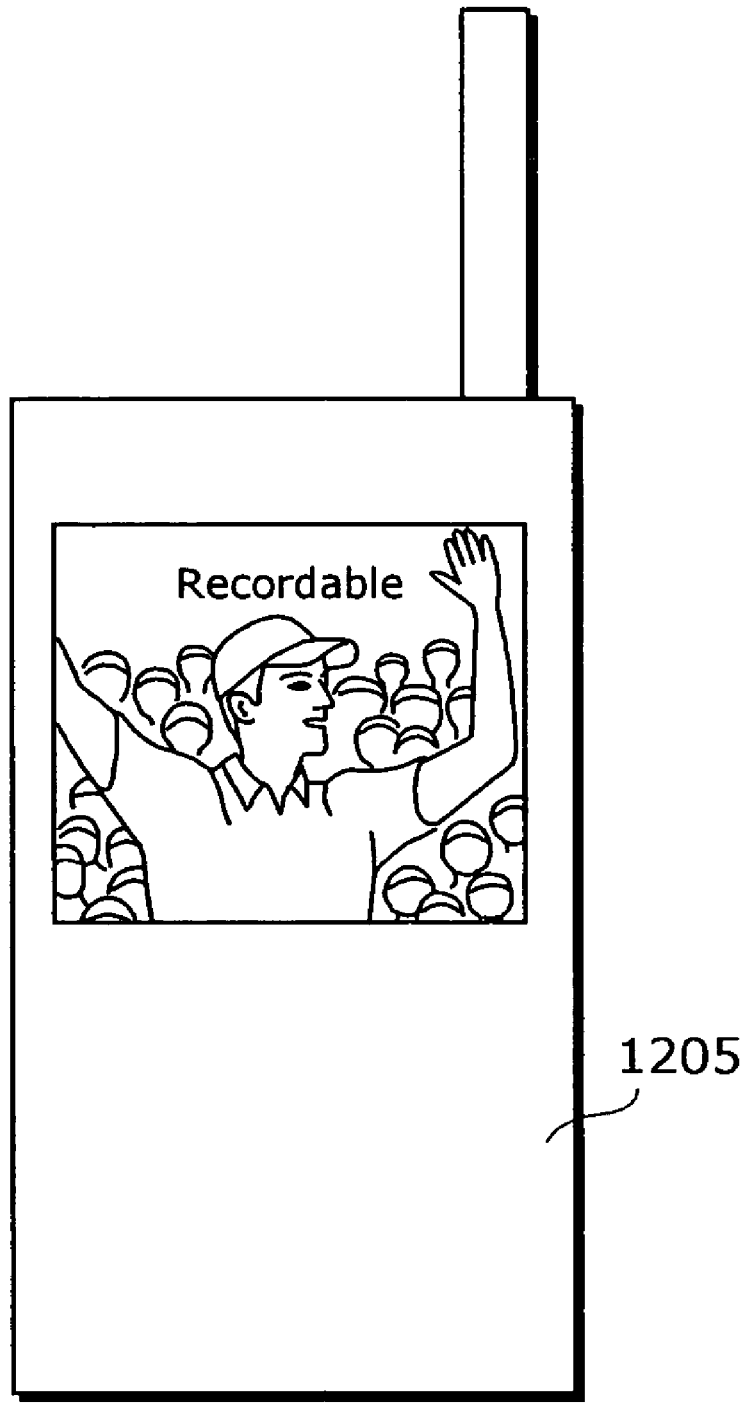
FIG. 4 is a diagram showing a display example of a screen on which a program is watched.

Here, in the case where the currently watched program is broadcasted in the location (Osaka) where the recording apparatus is positioned (YES in step S105), and in the case where it is judged in the judgment processing (step S104) that the watching possible program guide and the recordable-program guide are the same (NO in step S104), the same program can be recorded in the recording apparatus setting position. Therefore, the display unit 105 displays an icon, "recordable", on the screen where the program is currently watched using the cellular phone 1205 (step S106). FIG. 4 is a diagram showing a display example of a screen where the program is watched. In FIG. 4, "recordable" icon is displayed because a golf program is broadcasted in the recording apparatus setting position (Osaka) as well as in Tokyo where the user is currently present. Here, the user can set recording on the recording apparatus, for example, via network.

On the other hand, in the case where the currently watched program is not broadcasted in the location (Osaka) where the recording apparatus is positioned (NO in step S105), the same program cannot be recorded in the recording apparatus setting position, the display unit 105 displays "unrecordable" icon on the screen where the program is currently watched using the cellular phone 1205 (step S107).

As described above, the obtained watching possible program guide and recordable-program guide are compared; it is judged whether or not the currently watched program is broadcasted in the recording apparatus setting position; and the icon indicating recording possibility is displayed on the screen. Thereby, the user can easily judge whether or not it is possible to set recording of the currently watched program via network. Moreover, in the case where the user requests setting timer recording, the desired setting can be performed in the in-home recording apparatus via network.

The present embodiment has been described using an example of the watching terminal which uses the cellular phone as hardware. However, the present embodiment can be realized using a terminal which is connected to network, such as a general Personal Digital Assistant (PDA).

Also, an ID may be used in the processing (step S105) of judging whether or not the currently watched program is broadcasted in the recording apparatus setting position, the ID being uniquely assigned to a program. This ID is assigned to each program to be broadcasted. In the case where broadcast contents are different, different IDs are assigned to the programs. In the case where such ID is not assigned, the judgment processing can be realized by matching broadcast times, titles and performers of programs.

Furthermore, the configuration of the watching support apparatus as described according to the present embodiment can be realized using a program built in the cellular phone 1205. Also, only an interface with the user may be implemented in the cellular phone 1205, and the configuration of the watching support apparatus may be included in the server apparatus such as the electronic program guide server 1204.

Second Embodiment

A variation example of the first embodiment will be described. According to the first embodiment, the following case has been described: the circuit for receiving digital broadcast is built in the cellular phone, and digital broadcast is received and watched using the cellular phone. According to the present embodiment, a cellular phone has a remote control function of operating channels or screen of digital TV.

Figure 5:
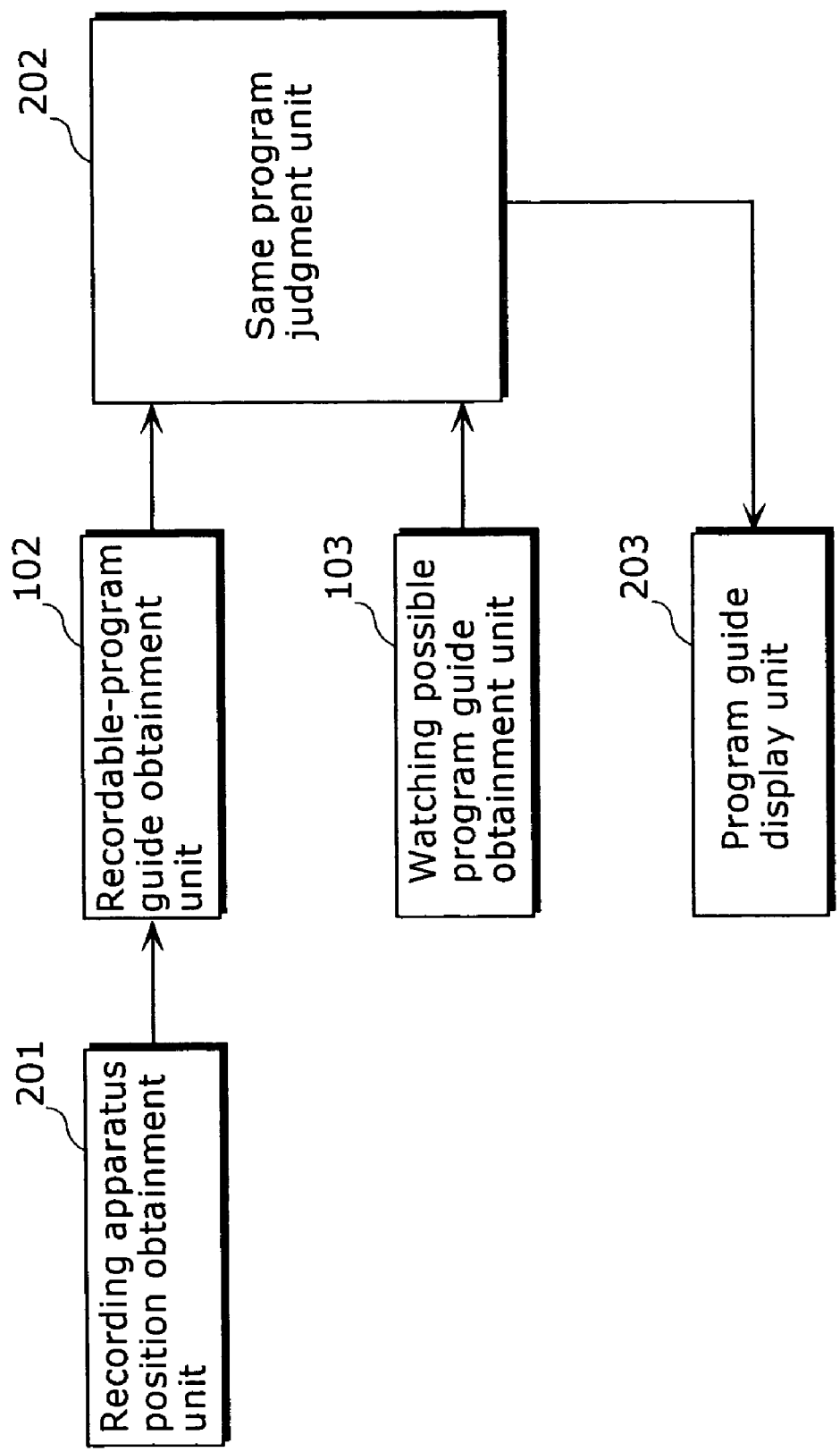
FIG. 5 is a block diagram showing a configuration of a watching support apparatus according to the second embodiment of the present invention.

FIG. 5 is a block diagram showing a configuration of a watching support apparatus according to the second embodiment of the present invention. Here, the same components as the first embodiment are assigned with the same codes, and detailed description will be omitted.

The watching support apparatus 200 includes a program guide display unit 203 in location of the display unit 105 included in the configuration of the first embodiment. Also, the operations performed by the recording apparatus position obtainment unit 201 and the same program judgment unit 202 are different from the first embodiment.

The program guide display unit 203 adds, to a watching possible program guide, information indicating whether or not the respective programs can be recorded by the recording apparatus, based on the sameness of the programs judged by the same program judgment unit 202.

Figure 6:
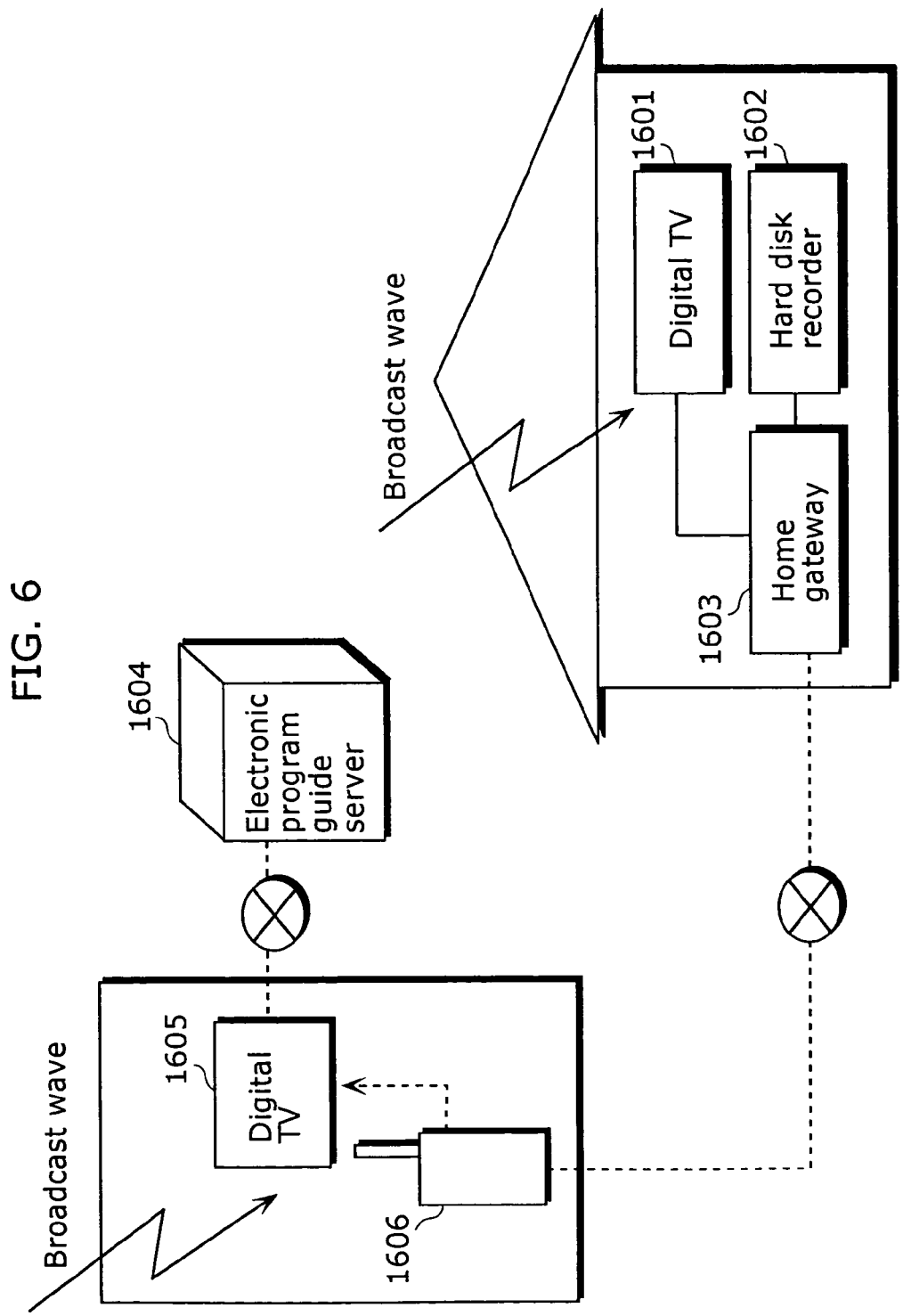
FIG. 6 is a diagram showing an example of hardware configuration in which a watching support apparatus according to the second embodiment of the present invention is used.

FIG. 6 is a diagram showing an example of hardware configuration in which a watching support apparatus according to the second embodiment of the present invention is used. This system includes: a digital TV 1601 which receives digital broadcast; a hard disk recorder 1602 which is a recording apparatus that can accumulate digital broadcast into a hard disk; a home gateway 1603 which connects in-home networking devices with outside-home networking devices; an electronic program guide server 1604 where electronic program guides are accumulated, and which can be accessed from an external network; a digital TV 1605 which receives digital broadcast and has a watching support apparatus 200; and a cellular phone 1606 which can remote-operate the digital TV 1605.

Figure 7:
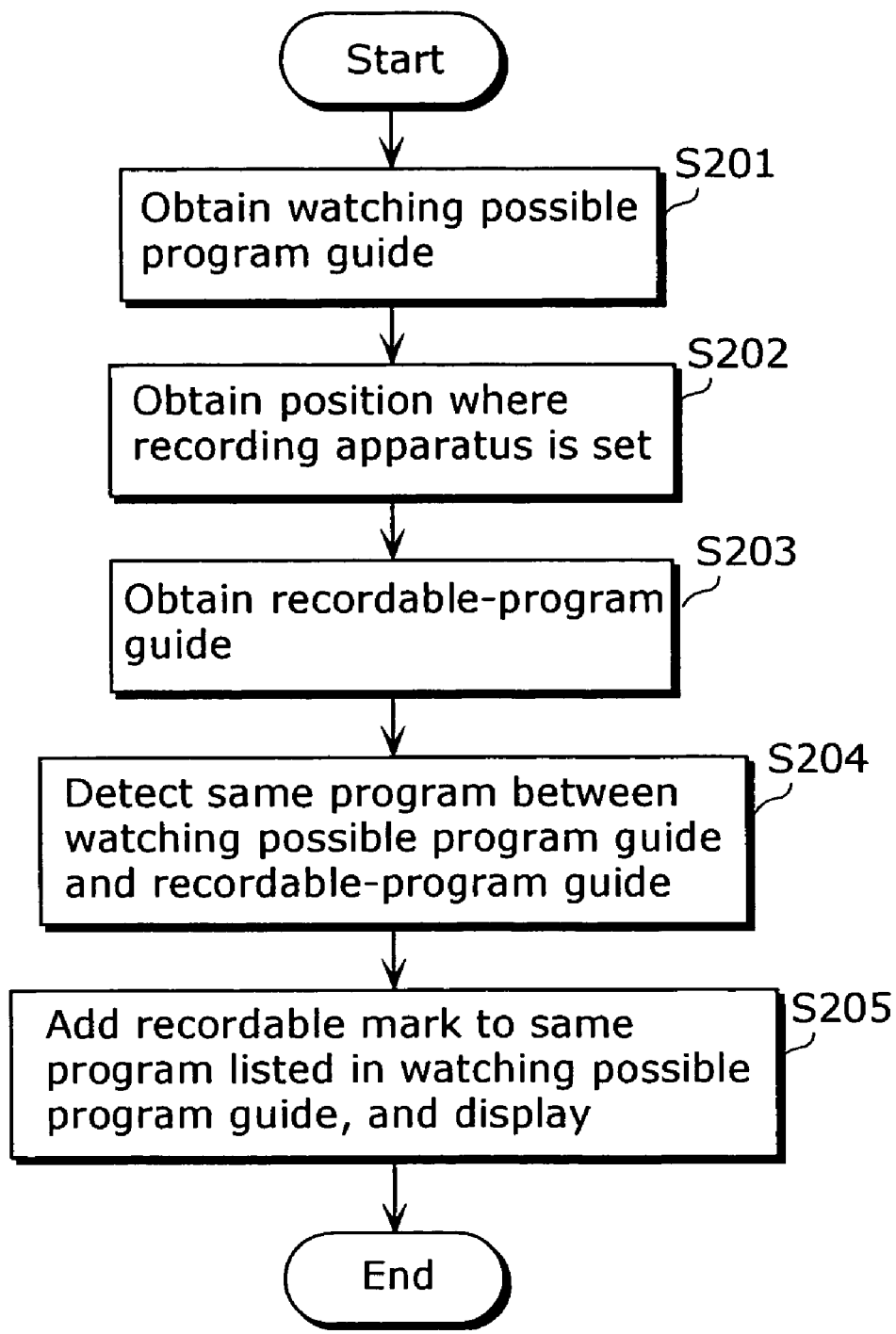
FIG. 7 is a flowchart showing a flow of operations performed in the case where a user watches a program on a digital TV.
Figure 8:
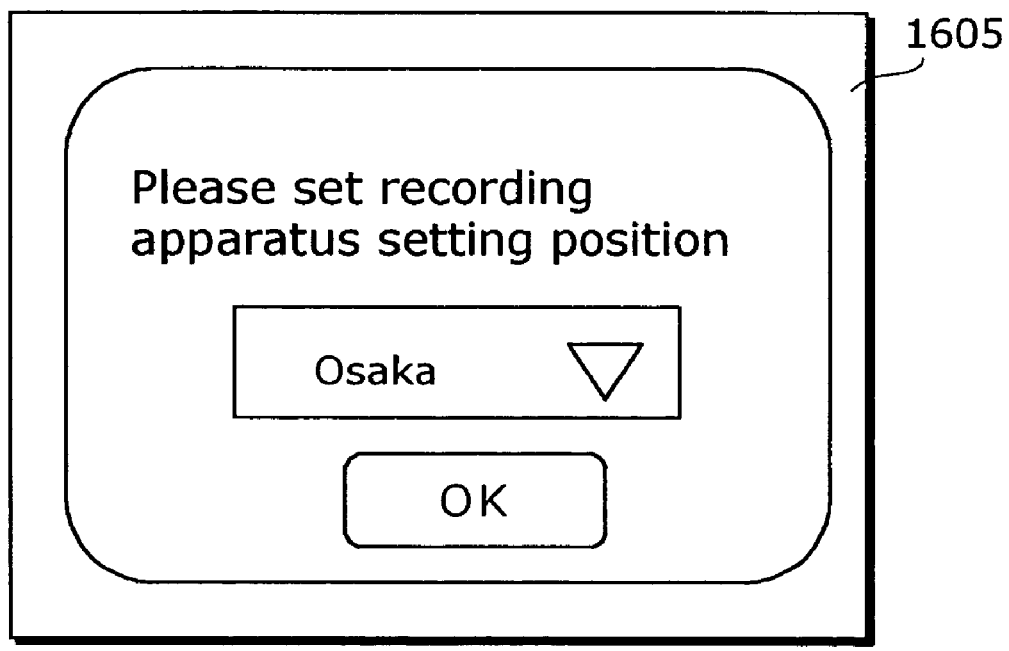
FIG. 8 is a diagram showing a display example of a screen into which setting position of a recording apparatus is inputted.

Next, the following operations will be described: a user watches a program on the digital TV 1605 including the watching support apparatus 200 as described above. FIG. 7 is a flowchart showing a flow of operations performed in the case where a user watches a program on the digital TV 1605. Here, for example, the location where the recording apparatus (hard disk recorder 1602) is positioned is Osaka (the user's home and the like), and the digital TV 1605 is positioned in Tokyo where the user is on business trip.

First, the watching possible program guide obtainment unit 103 obtains, from a received broadcast wave, a watching possible program guide which is a program guide in the current location (S201). Here, for example, a watching possible program guide as shown in FIG. 9 is obtained.

Next, the recording apparatus position obtainment unit 201 receives the user's input regarding a recording apparatus setting position, and obtains information indicating the recording apparatus setting position (step S202). For example, the recording apparatus position obtainment unit 201 displays a screen, on the digital TV 1605, for the user to input the recording apparatus setting position, and obtains the position selected from the pull-down menu by the user as the recording apparatus setting position. Here, the user's recording apparatus setting position (in many cases the same as the user's residential area) may be previously stored in the cellular phone and the like. Then, when the screen for the user to input the recording apparatus setting position is displayed, the position may be inputted using the cellular phone 1606. Thereby, it is possible to set the user's residential area using a button on the cellular phone 1606, without selecting from the pull-down menu each time.

The recordable-program guide obtainment unit 102 accesses the electronic program guide server 1204, for example, via network, and obtains a recordable-program guide which is a program guide in the recording apparatus setting position (Osaka) obtained by the recording apparatus position obtainment unit 201 (step S203). Here, for example, a recordable-program guide as shown in FIG. 10 is obtained.

Next, the same program judgment unit 202 compares the watching possible program guide with the recordable-program guide, and judges the same program (step S204). For example, while a program called "Viva, life" is to be broadcasted from 12:45 on "T TV" according to the watching possible program guide (Tokyo area) as shown in FIG. 9, a movie called "Magic delivery" is to be broadcasted on "T TV" according to the recordable-program guide (Osaka area) as shown in FIG. 10. Also, a program called "Love birds" is to be broadcasted from 12:05 on "F TV" according to the watching possible program guide as shown in FIG. 9, a program called "Resident officer" is to be broadcasted on "F TV" according to the recordable-program guide as shown in FIG. 10. According to the examples as shown in FIGS. 9 and 10, except for the programs called "Viva, life" and "Love birds", the programs are the same. Therefore, the same program judgment unit 202 judges the programs except for "Viva, life" and "Love birds" as same programs. In such case as described above, for example, when the user (i) attempts to record the program, "Viva, life" or "Love birds" according to the program guide watched in Tokyo area, and (ii) sets remote-recording on the recording apparatus (hard disk recorder 1602), the program is not broadcasted in Osaka area (where the recording apparatus is positioned), thus cannot be recorded.

Next, in the watching possible program guide, the program guide display unit 203 adds marks to the same programs judged by the same program judgment unit 202, the marks indicating that recording is possible in the recording apparatus, and displays a program guide as shown in FIG. 11 (step S205). In the example as shown in FIG. 11, marks are added to the programs except for the programs, "Viva, life" and "Love birds". And, it is indicated that the programs added with the marks can be remote-recorded by the recording apparatus, when the user inputs timer recording code using a cellular phone and the like. On the other hand, the programs which are not added with the marks can be watched only in the user's current location (Tokyo).

As described above, the obtained watching possible program guide and recordable-program guide are compared, and the same programs are judged. Then, the same programs are displayed in the program guide where the same programs are added with the marks indicating that recording is possible in the recording apparatus. Therefore, the user can easily judge whether or not the user can set recording of the programs to be broadcasted in the user's current location via network.

According to the present embodiment, the program guide display unit 203 displays the program guide added with the marks. However, there are other cases, as well. For example, a selection reception unit for receiving the user's instruction to select the program guide may be set. And, the program guide display unit 203 may display one of the recordable-program guide, the watching possible program guide and the program guide added with the marks, according to the user's selection instruction.

Third Embodiment

According to the first and second embodiments, the same program judgment units 104 and 202 (i) compare the watching possible program guide with the recordable-program guide, (ii) judge the same programs and (iii) judge whether or not the currently watched program can be recorded in the remote position. However, the display details of the obtained watching possible program guide and recordable-program guide are not necessarily the same. Depending on the size of the screen on which the program details are provided, an omitted word may be used. For example, in the case of the program called "Japanese professional baseball newsflash", an omitted word such as "Professional baseball N" may be used. However, in many cases the time lengths of the programs are the same. According to the present embodiment, the following case will be described: sameness of the programs is judged based on information regarding broadcast time of the program and text of the program information.

Figure 12:
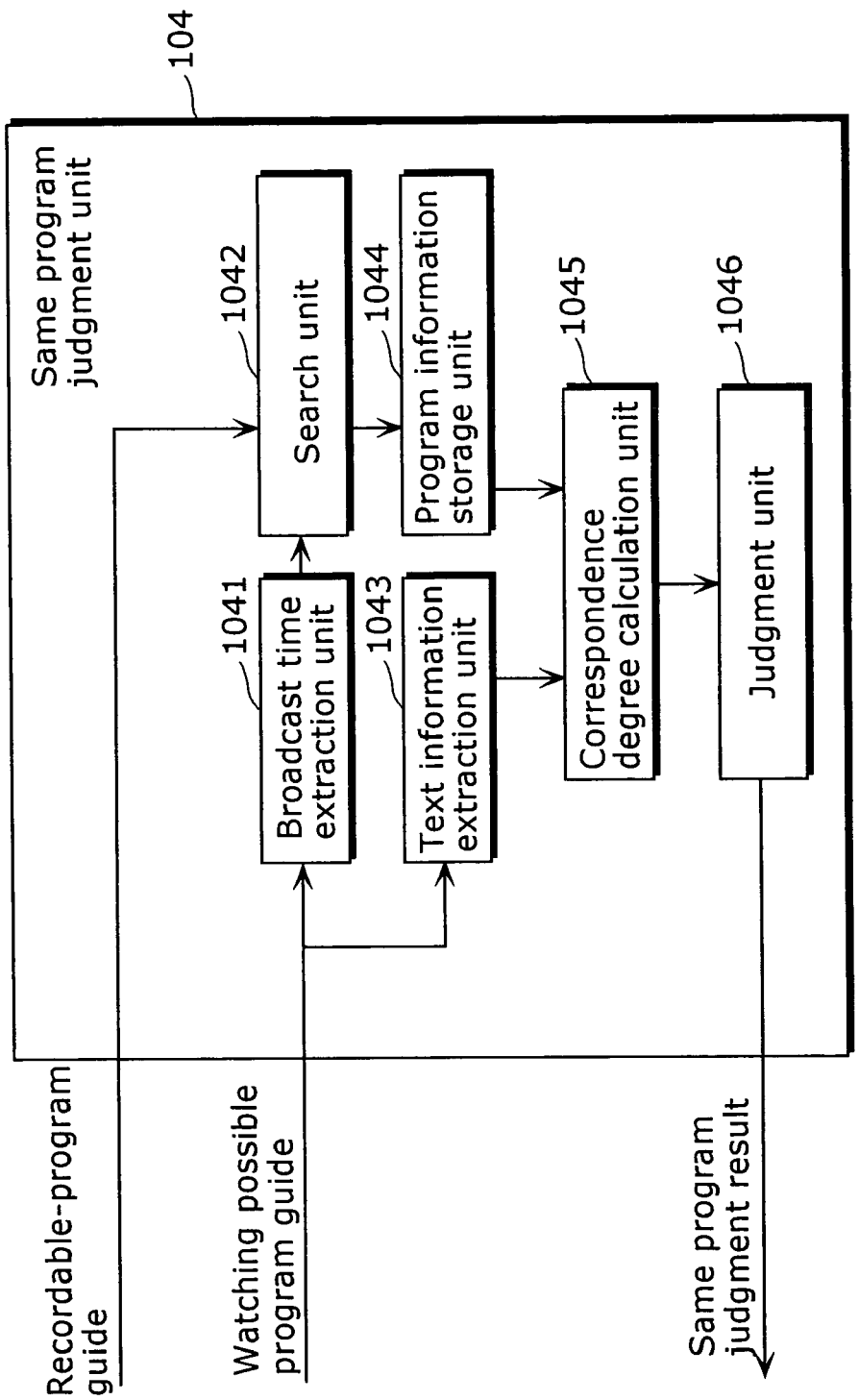
FIG. 12 is a block diagram showing a detailed configuration of the same program judgment unit.

FIG. 12 is a block diagram showing a detailed configuration of the same program judgment unit.

The same program judgment unit judges sameness of the programs respectively based on the watching possible program guide and the recordable-program guide. As shown in FIG. 12, the same program judgment unit includes: a broadcast time extraction unit 1041; a search unit 1042; a text information extraction unit 1043; a program information storage unit 1044; a correspondence degree calculation unit 1045; and a judgment unit 1046.

The broadcast time extraction unit 1041 extracts the start time, the end time and the broadcast time of the target program from the watching possible program guide obtained by the watching possible program guide obtainment unit 103. For example, the following information is extracted: the target program starts at 19:00, ends at 19:30 and the broadcast time is 30 minutes.

The search unit 1042 searches the recordable-program guide obtained by the recordable program obtainment unit 102, using the start time, the end time and the broadcast time of the target program. In the case where there are programs which have the same start time, the same end time and the same broadcast time, the search unit 1042 extracts text information indicating the titles, performers, sub-titles, program details and the like. In the case where there are not programs which have the same start time, the same end time and the same broadcast time, the search unit 1042 searches the recordable-program guide using the broadcast time of the target program, and extracts respective text information of the programs which have the same broadcast time.

The text information extraction unit 1043 extracts text information indicating the title, the performers, the sub-title and the program details of the target program from the watching possible program guide obtained by the watching possible program guide obtainment unit 103. The program information storage unit 1044 stores text information extracted by the search unit 1042. For example, in the case where the broadcast time of the target program is 30 minutes, a group of the programs which have the broadcast time of 30 minutes is stored as the search result.

Figure 13:
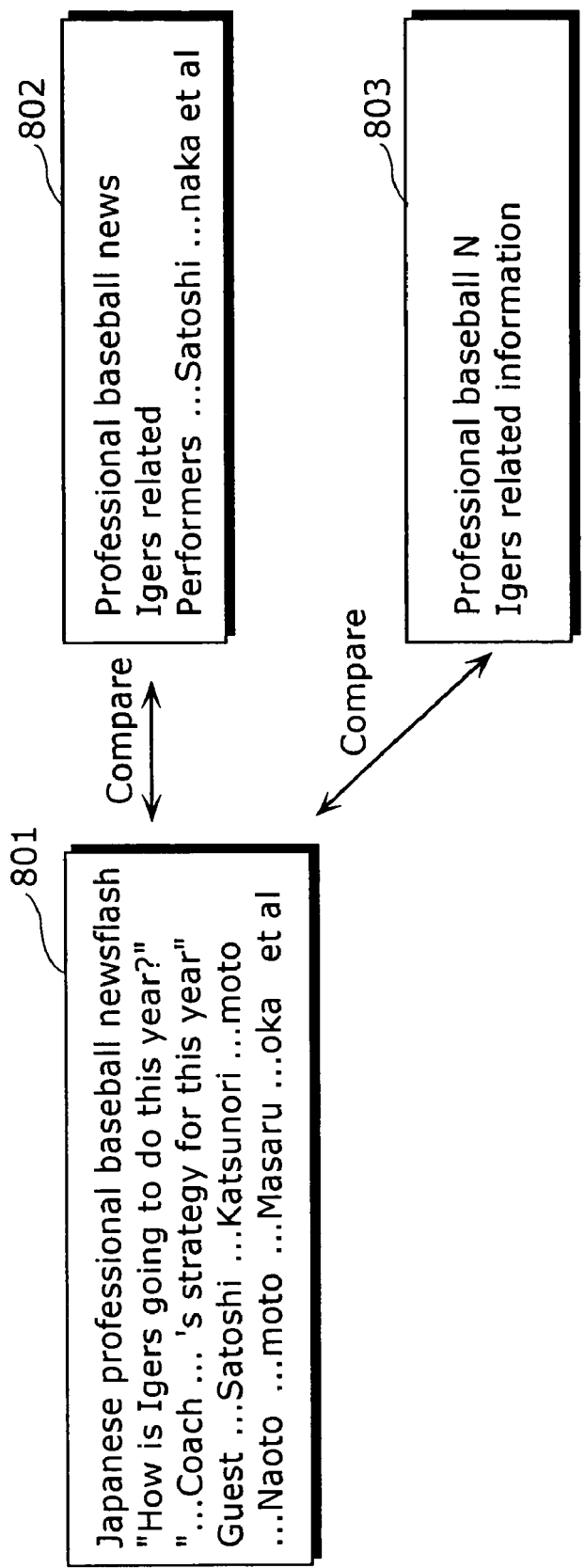
FIG. 13 is a diagram showing an example of text information of programs.

The correspondence degree calculation unit 1045 calculates correspondence degree between the target program and the programs stored in the program information storage unit 1044. In other words, the correspondence degree calculation unit 1045 (i) compares the text information of the target program extracted by the text information extraction unit 1043 with the text information of the programs stored in the program information storage unit 1044, and (ii) calculates correspondence degree of the programs. For example, as shown in FIG. 13, respective text information of the programs is separated into information such as title, details and performers. Respective information is morphologically analyzed, and correspondence degree between characters or words is calculated. Here, as shown in FIG. 13, the program text information 801 is an example in which details are described in detail; the program text information 802 and 803 are examples in which the details are omitted and described. For example, there are programs described as follows: in the program text information 802, partial information regarding the performers is described; and in the program text information 803, the keyword "news" is described only as "N". As described above, in the case where (i) only the partial information regarding the performers is described, and this partial information corresponds with the concretely described program text information and (ii) the titles partially correspond with each other, the correspondence degree is calculated as high.

Figure 14:
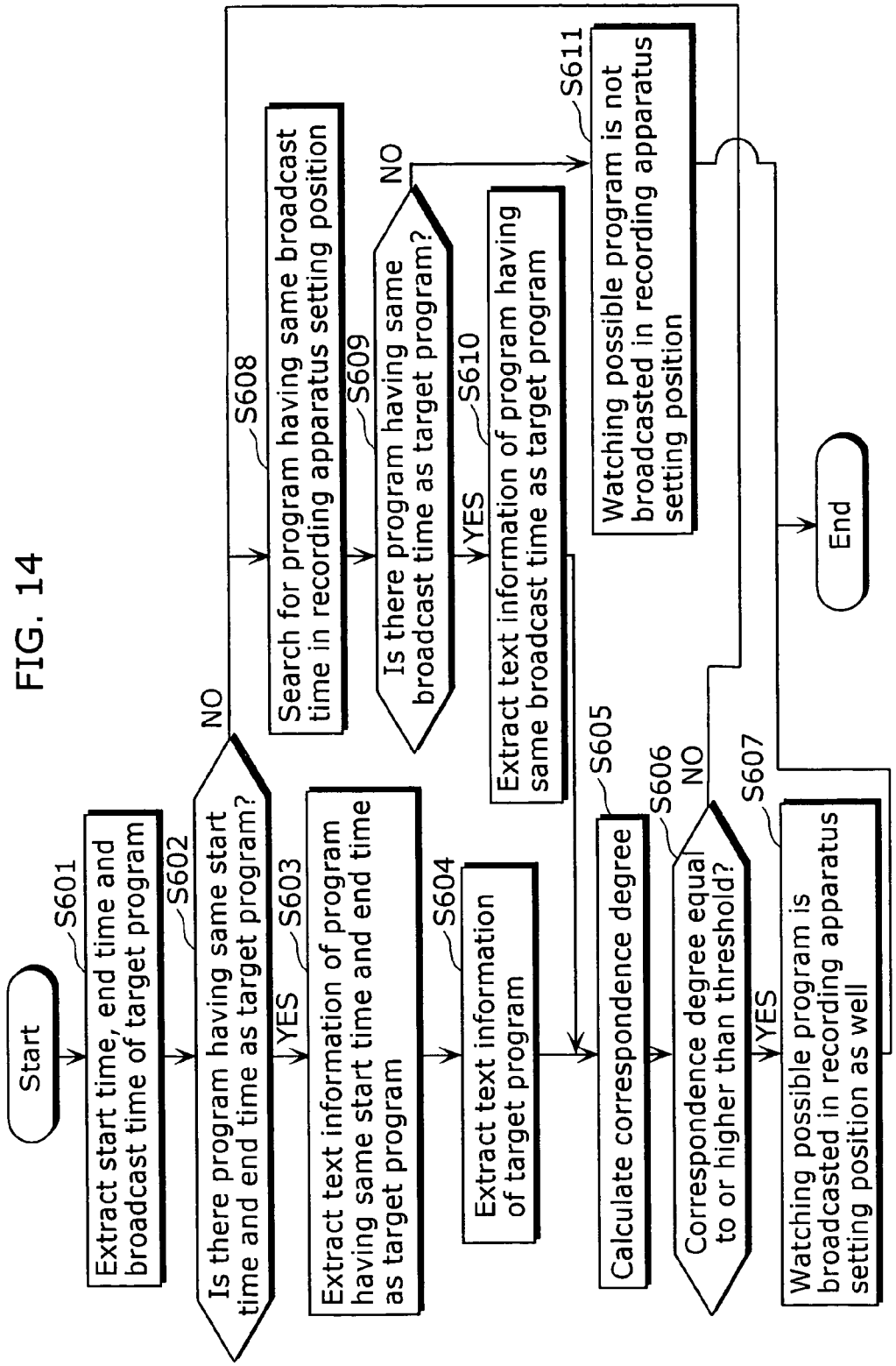
FIG. 14 is a flowchart showing a flow of operations performed by the same program judgment unit.

The judgment unit 1046 judges whether or not the correspondence degree between the programs calculated by the correspondence degree calculation unit 1045 is equal to or higher than the predetermined threshold. In the case where the calculated correspondence degree is equal to or higher than the predetermined threshold, the judgment unit 1046 judges that the programs are the same. Next, the operations performed by the same program judgment unit configured as described above will be described. FIG. 14 is a flowchart showing a flow of operations performed by the same program judgment unit.

The broadcast time extraction unit 1041 extracts the start time, the end time and the broadcast time of the target program to be broadcasted from the watching possible program guide (step S601). Next, the search unit 1042 judges whether or not there is a program which has the same start time, the same end time and the same broadcast time as the target program in the recordable-program guide (step S602). Here, in the case where there is a program which has the same start time, the same end time and the same broadcast time as the target program (YES in step S602), the search unit 1042 extracts text information indicating the title, the performers, the sub-title, the program details and the like, and stores the extracted text information into the program information storage unit 1044 (step S603). Next, the text information extraction unit 1043 extracts text information indicating the title, the performers, the sub-title and the program details of the target program from the watching possible program guide (step S604).

On the other hand, as a result of the judgment (step S602) by the search unit 1042, in the case where there is no program having the same start time, the same end time and the same broadcast time as the target program (NO in step S602), the search unit 1042 searches the recordable-program guide using the broadcast time of the target program, and judges whether or not there is a program having the same broadcast time as the target program (step S609). Here, in the case where there is a program having the same broadcast time as the target program (YES in step S609), the search unit 1042 extracts text information indicating the title, the performers, the sub-title, the program details and the like, and stores the extracted text information into the program information storage unit 1044 (step S610).

Next, the correspondence degree calculation unit 1045 (i) compares the text information of the target program extracted by the text information extraction unit 1043 with the text information of the programs stored in the program information storage unit 1044, and (ii) calculates correspondence degree between the programs (step S605). Then, the judgment unit 1046 judges whether or not the correspondence degree between the programs calculated by the correspondence degree calculation unit 1045 is equal to or higher than the predetermined threshold (step S606). As a result, in the case where the correspondence degree is equal to or higher than the predetermined threshold (YES in step S606), the judgment unit 1046 judges that the target program is broadcasted in the recording apparatus setting position as well (step S607).

Also, as a result of the judgment (step S608) by the search unit 1042, in the case where there is no program having the same broadcast time (NO in step S608), the judgment unit 1046 judges that the target program is not broadcasted in the recording apparatus setting position (step S611).

According to the second embodiment, the same program judgment unit repeats the operations as described above for each program listed in the watching possible program guide.

As described above, it can be judged whether or not the programs are the same using the information regarding the program broadcast time and the program text information described in the program guide such as the title, the sub-title and the performers.

There is a case where programs have the same title such as drama, but the respective numbers of broadcast are different, thus the respective details of the programs are different. In such case as described above, it is necessary to refer to the past program guides, judge which episodes the respective programs are, and judge whether or not the programs are the same. On the contrary, in the case where the future program guides are distributed, it may be judged whether or not the programs are the same using the respective numbers of broadcast up to the final broadcast.

In other words, the interval between broadcasts of the target program is detected, and the last broadcasted time is estimated based on the detected interval. In the case where the target program is broadcasted at the estimated time, it is detected whether or not the target program was broadcasted before the last broadcasted time. In the case where the target program is not detected, the last broadcasted time is judged as the first broadcast day. Then, it is judged whether or not the programs are the same by the broadcast number calculation unit which calculates broadcast number of the target program. A method for calculating the broadcast number of a program will be described in detail. For example, the following case will be described: the broadcast number of "program A" is calculated. In the case where the past distributed program guide is searched for the "program A", the broadcast number is calculated as the number between (i) after the "program A" is broadcasted and ended and (ii) the next "program A" is broadcasted. In such case as described above, all the number of the past broadcasted "program A" is calculated, thereby the calculated number does not reflect the number of "program A" for this cours. In order to solve this problem, at first, the broadcast interval is calculated as to whether the target "program A" is broadcasted every week or every day. Next, it is assumed that the target "program A" is broadcasted with the calculated broadcast interval. In the case where the target "program A" is broadcasted every day, it is searched whether the program is broadcasted in the same time period as the last broadcast. In general, among the programs broadcasted every day, there are programs broadcasted every day only on weekdays, and the programs broadcasted every day including holidays. Therefore, with regard to the programs broadcasted every day, it is distinguished whether or not the program is broadcasted every day only on weekdays or including holidays, and then the time period predicted as the last broadcast time is searched. In the case where the program was broadcasted in the time period predicted as the last broadcast time, it is further searched whether or not the program was broadcasted in the time period predicted as the last but one broadcast time in the similar way. By repeating the operations as described above, in the case where the program was not broadcasted in the time period predicted as the last broadcast time, it is judged that the episode is the first one of the broadcast. Then, the broadcast number of the "program A" is calculated as the number from the first episode to the current one.

Also, in the case of the frequently broadcasted programs such as news and weather forecast, the details of the program may be provided using icon and the like. In such case as described above, an icon details accumulation unit may be included for accumulating associations of the icons and the details in text information. Thereby, even in the case where details of one program guide are described using icons, it is possible to judge associated relations between the programs.

Fourth Embodiment

According to the first and second embodiments, when the watching possible program guide is obtained, (i) the program guide of the recording apparatus setting position is obtained, (ii) correspondence degree between the respective programs is calculated, thereby (iii) it is judged whether or not the programs are the same. However, when a user having a cellular phone watches programs on travel, even if the user does not obtain a program guide in the recording apparatus setting position such as the user's home where the user usually lives, in many cases the user obtains a program guide at the travel destination. Also, in the program guide, not only information regarding the currently broadcasted programs but also information regarding the programs to be broadcasted in the future are multiplexed with program contents and distributed.

Therefore, according to the present embodiment, the following case will be described: the program guide received in the user's home (the recording apparatus setting position) is accumulated into a mobile terminal, and then when the user receives a program guide at a travel destination and compares the received program guide with the recordable-program guide, the already accumulated program guide is used.

Figure 15:
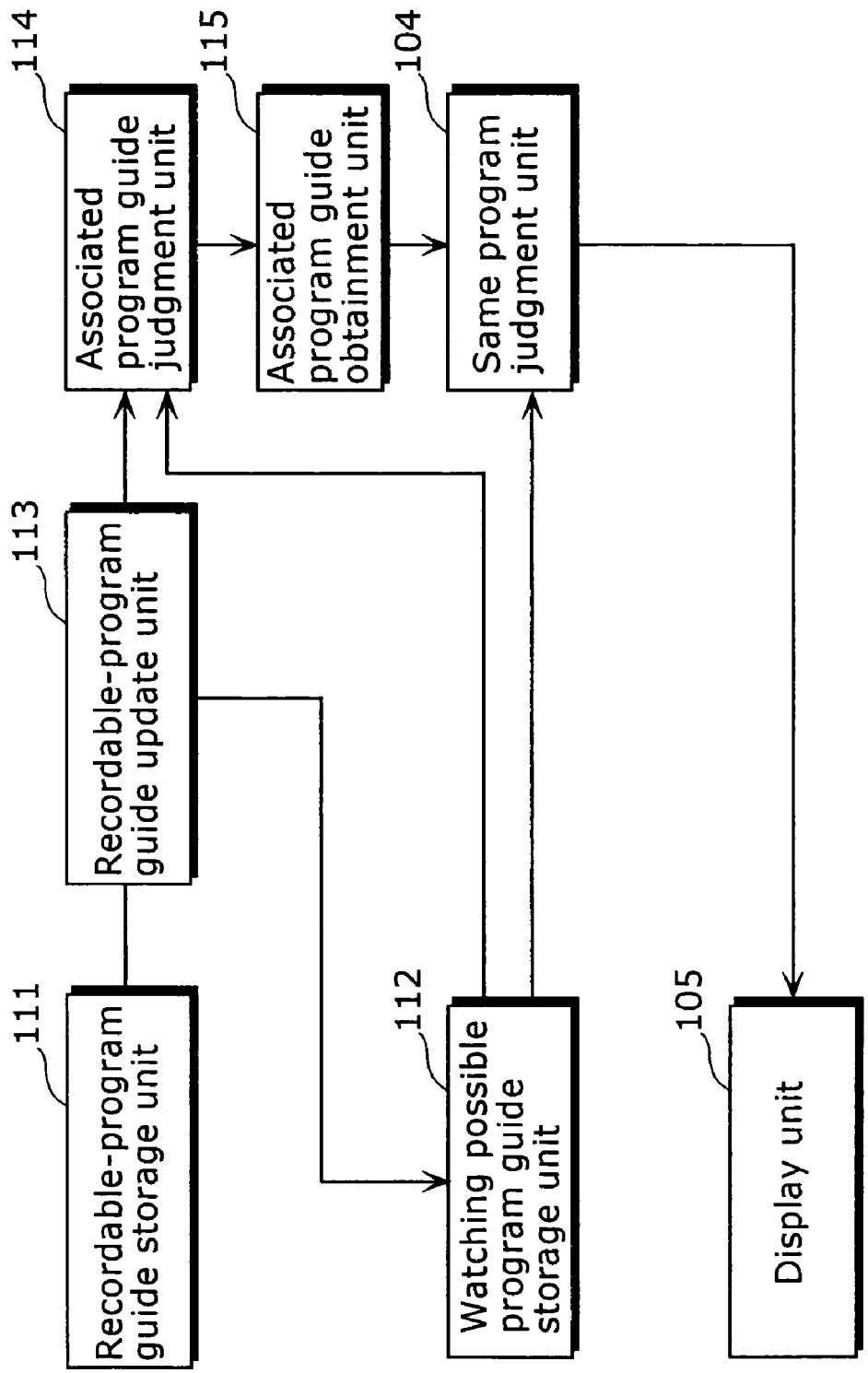
FIG. 15 is a block diagram showing a configuration of a watching support apparatus according to the fourth embodiment of the present invention.

FIG. 15 is a block diagram showing a configuration of a watching support apparatus according to the fourth embodiment of the present invention. Here, the same components as the first embodiment are assigned with the same codes, and the detailed description will be omitted.

The watching support apparatus 110 supports a user to watch programs. As shown in FIG. 15, the watching support apparatus 110 includes: a recordable-program guide storage unit 111; a watching possible program guide storage unit 112; a recordable-program guide update unit 113; an associated program guide judgment unit 114; an associated program guide obtainment unit 115; a same program judgment unit 104; and a display unit 105.

The recordable-program guide storage unit 111 stores a recordable-program guide. The watching possible program guide storage unit 112 stores a watching possible program guide.

After obtaining a new program guide in the recording apparatus setting position, the recordable-program guide update unit 113 stores the obtained program guide into the recordable-program guide storage unit 111. In particular, the recordable-program guide update unit 113 obtains a program guide listing the programs to be broadcasted in the future, and stores the obtained program guide. In the case where the broadcast content is obtained and watched using a cellular phone and the like, information related to a program guide listing the programs simultaneously multiplexed and broadcasted is obtained and stored, regardless of the user's watching and non-watching. Also, after obtaining a program guide other than the program guide of the recording apparatus setting position, the recordable-program guide update unit 113 stores the obtained program guide into the watching possible program guide storage unit 112.

After the associated program judgment unit 114 obtains the program guide other than the program guide of the recording apparatus setting position from the recordable-program guide update unit 113, the associated program judgment unit 114 judges whether or not the a program guide of the recording apparatus setting position (for example, a program guide listing the dates, time periods and the like which include the programs whose sameness is judged: hereinafter, referred to as an associated program guide) is already stored in the recordable-program guide storage unit 111, the associated program guide being associated with the program guide stored in the watching possible program guide storage unit 112.

In the case where the associated program guide judgment unit 114 judges that the associated program guide is not stored, the associated program guide obtainment unit 115 obtains a program guide listing programs to be broadcasted in the recording apparatus setting position via network. In the case where the associated program guide judgment unit 114 judges that the associated program guide is already stored, the associated program guide obtainment unit 115 does not obtain a new program guide.

In the case where the associated program guide is already stored, the same program judgment unit 104 judges whether or not the programs are the same in the similar way to the embodiment as described above, using the program guide stored in the watching possible program guide storage unit 112 and the recordable-program guide stored in the recordable-program guide storage unit 111. On the other hand, in the case where the associated program guide is not stored, the same program judgment unit 104 judges whether or not the programs are the same in the similar way to the embodiment as described above, using the program guide stored in the watching possible program guide storage unit 112 and the recordable-program guide obtained by the associated program guide obtainment unit 115.

Figure 16:
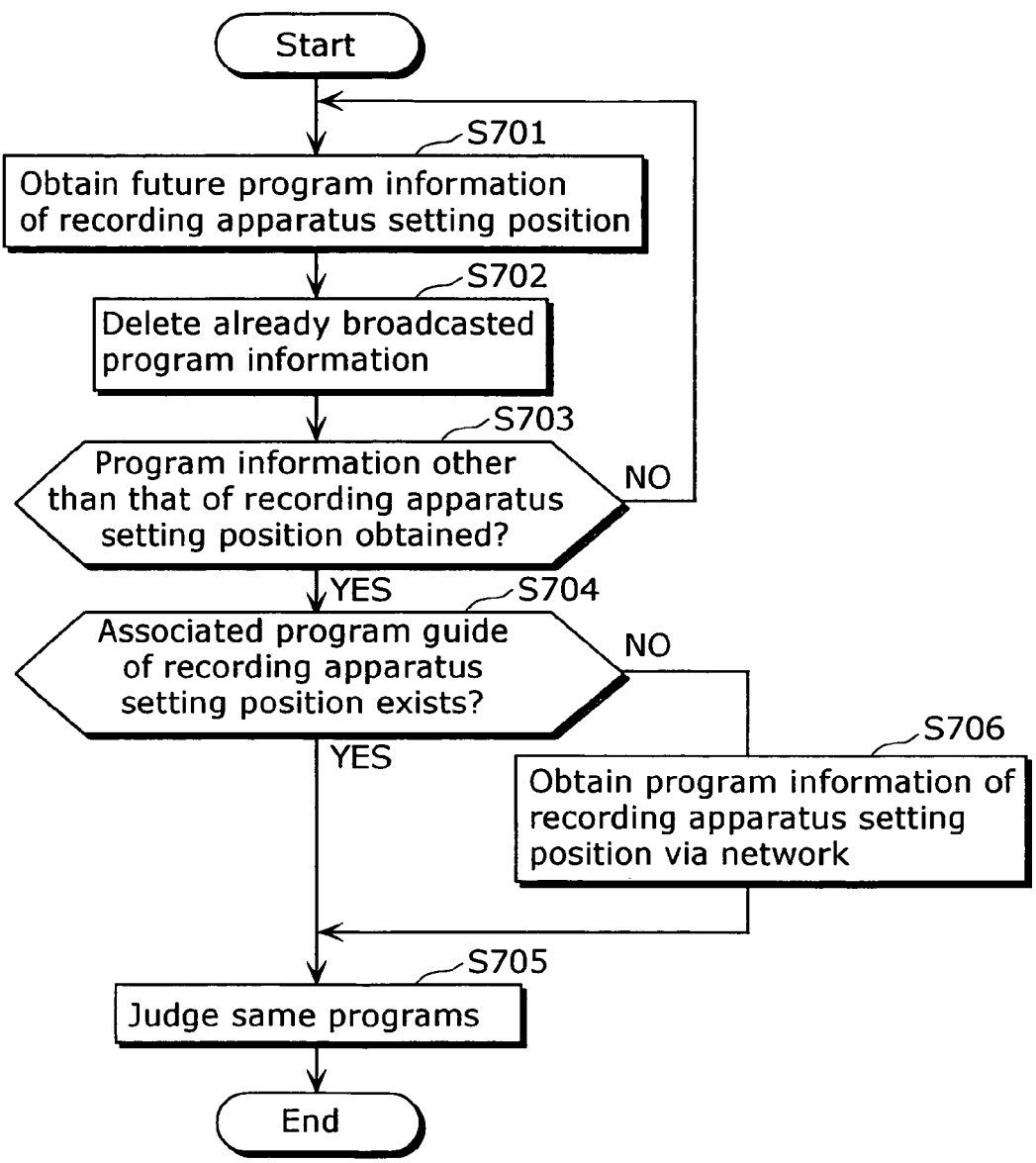
FIG. 16 is a flowchart showing a flow of operations of judging the same programs performed in a watching support apparatus.

Next, the following operations will be described: judging the same programs in the watching support apparatus 110 configured as described above. FIG. 16 is a flowchart showing a flow of operations of judging the same programs performed in a watching support apparatus 110.

First, the recordable-program guide update unit 113 obtains a program guide of the current location from a received broadcast wave (step S701). Next, the recordable-program guide update unit 113 deletes information regarding the already broadcasted programs from the program guide stored in the recordable-program guide storage unit 111 (step S702). Next, the recordable-program guide update unit 113 judges whether or not the obtained program guide is a program guide other than the program guide of the recording apparatus setting position (step S703). As a result, in the case where the obtained program guide is not the program guide other than the program guide of the recording apparatus setting position (NO in step S703), the recordable-program guide update unit 113 stores the obtained program guide into the recordable-program guide storage unit 111, and repeats the operations as described above (step S703 to step S701). Here, the recording apparatus setting position is already set.

On the other hand, in the case where the obtained program guide is a program guide other than the program guide of the recording apparatus setting position (YES in step S703), the recordable-program guide update unit 113 stores the obtained program guide into the watching possible program guide storage unit 112. Then, the associated program guide judgment unit 114 judges whether or not the program guide of the recording apparatus setting position is already stored in the recordable-program guide storage unit 111, the program guide being associated with the obtained program guide (step S704). Here, in the case where the associated program guide is already stored (YES in step S704), the same program judgment unit 104 judges the same programs using the program guide stored in the watching possible program guide storage unit 112 and the program guide stored in the recordable-program guide storage unit 111 (step S705).

As described above, in the case where the program guide of the recording apparatus setting position is already stored, it can be judged whether or not remote recording is possible without obtaining a new program guide. Also, even in the case where the program guide of the recording apparatus setting position is not stored, a program guide listing programs is newly obtained via network, the programs being broadcasted in the recording apparatus setting position. Thereby, it can be judged whether or not remote recording is possible.

Fifth Embodiment

In some cases, information included in a program guide is distributed by many agents, and is different depending on the area. In such cases as described above, program guides are often provided using different expressions for the same programs. According to the present embodiment, the following case will be described: in the case where the providing source of the program guide in the recording apparatus setting position and the providing source of the watching possible program guide (in the current location) are different, the programs having the same providing source are obtained, and used for judging the same programs.

Figure 17:
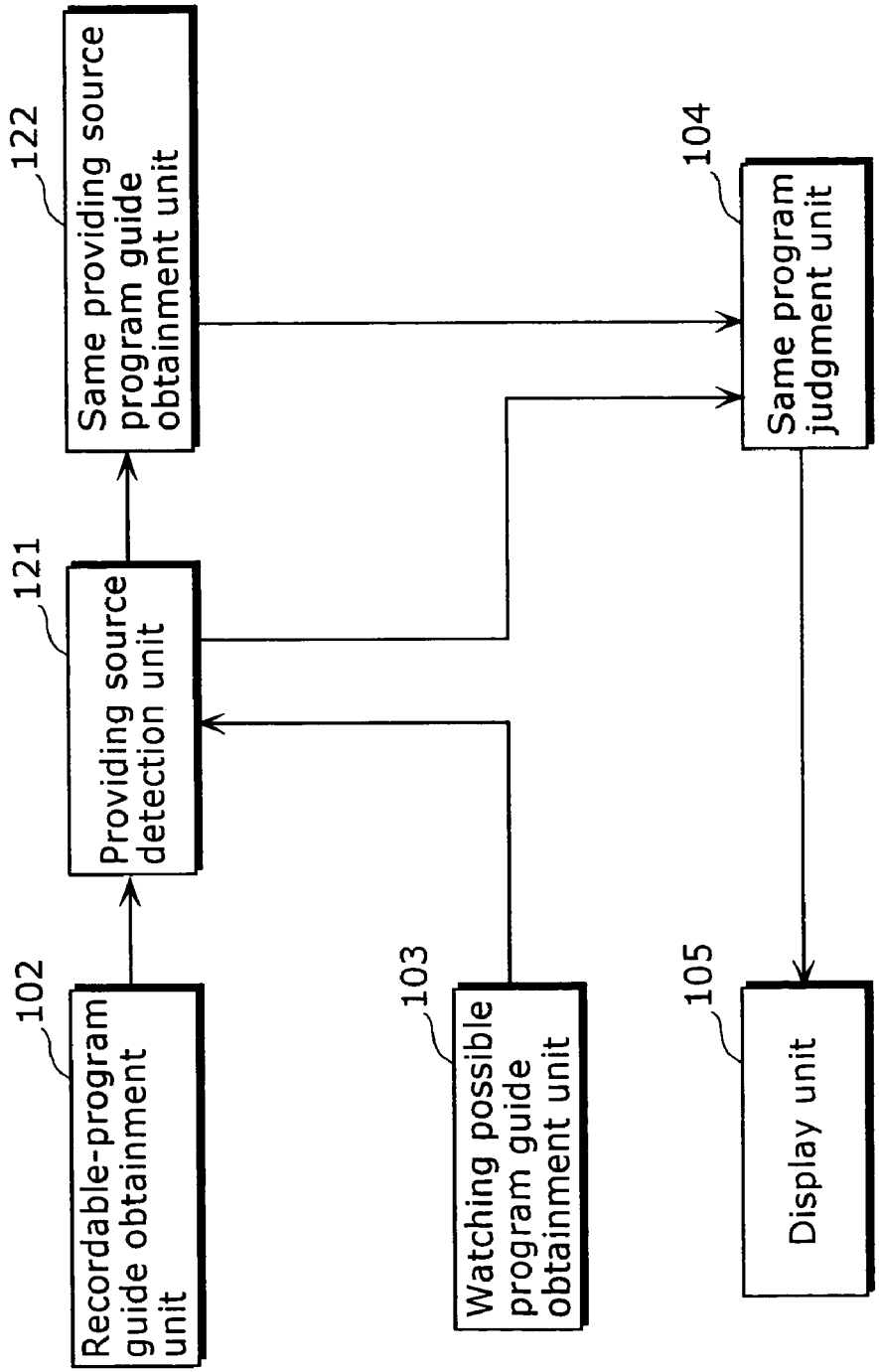
FIG. 17 is a block diagram showing a configuration of a watching support apparatus according to the fifth embodiment of the present invention.

FIG. 17 is a block diagram showing a configuration of a watching support apparatus according to the fifth embodiment of the present invention. The same components as the first embodiment are assigned with the same codes, and the detailed description will be omitted. Here, the hardware configuration in which the watching support apparatus is used is the same as the first embodiment as shown in FIG. 2.

The watching support apparatus 120 is an apparatus which supports a user to watch programs. As shown in FIG. 17, the watching support apparatus 120 includes: a recordable-program guide obtainment unit 102; a watching possible program guide obtainment unit 103; a providing source detection unit 121; a same providing source program guide obtainment unit 122; a same program judgment unit 104; and a display unit 105.

The providing source detection unit 121 detects providing sources of a watching possible program guide obtained by the watching possible program guide obtainment unit 103 and a recordable-program guide obtained by the recordable-program guide obtainment unit 102, and then judges whether or not the respective providing sources are the same.

In the case where the respective providing sources of the watching possible program guide and the recordable-program guide are not the same, the program guide obtainment unit 122 obtains one or more program guides of a providing source which provides the program guides in both of the recording apparatus setting position and the current location.

Figure 18:
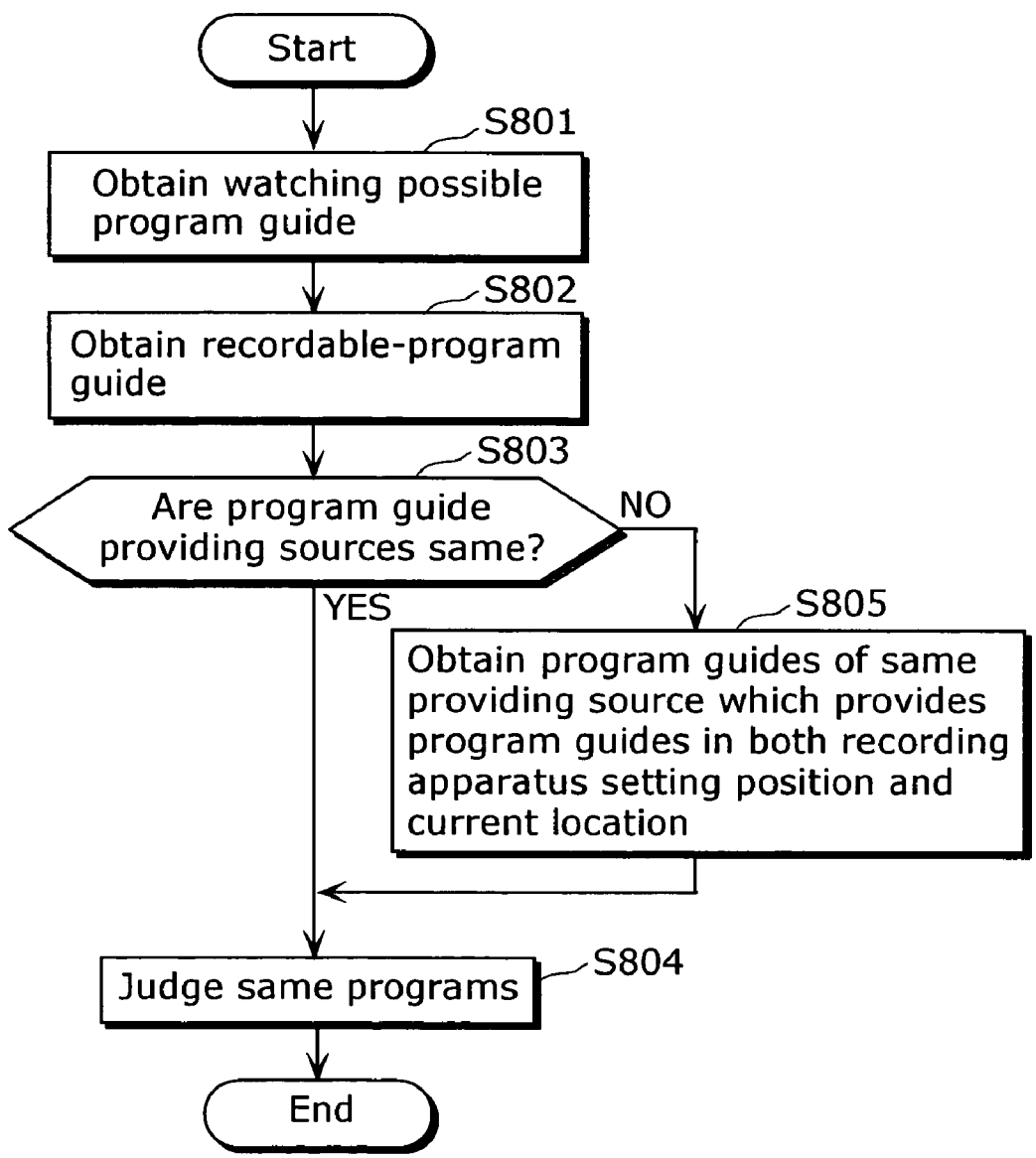
FIG. 18 is a flowchart showing a flow of operations of judging the same programs performed in a watching support apparatus.

Next, the following operations will be described: the same programs are judged in the watching support apparatus 120 configured as described above. FIG. 18 is a flowchart showing a flow of operations of judging the same programs performed in the watching support apparatus 120.

First, the watching possible program guide obtainment unit 103 obtains a watching possible program guide which is a program guide in the current location from the received broadcast wave (step S801). Next, the recordable-program guide obtainment unit 102 obtains a recordable-program guide which is a program guide in the recording apparatus setting position by accessing the electronic program guide server 1204 via network (step S802). Here, the recording apparatus setting position is already set.

The providing source detection unit 121 detects the providing sources of the watching possible program guide and the recordable-program guide, and judges whether or not the respective providing sources are the same (step S803). As a result, in the case where the providing sources of the watching possible program and the recordable-program guide are the same (YES in step S803), the same program judgment unit 104 judges the same programs using the watching possible program and the recordable-program guide (step S804). On the other hand, in the case where the providing sources of the watching possible program guide and the recordable-program guide are not the same (NO in step S803), the same providing source program guide obtainment unit 122 (i) searches for a providing source which provides respective program guides in both of the recording apparatus setting position and the current location, for example, by accessing the electronic program guide server 1204 via network, and (ii) obtains the respective program guides of the same providing source which are provided in both of the recording apparatus setting position and the current location (step S805). Then, the same program judgment unit 104 judges the same programs using the watching possible program guide and the recordable-program guide which have been obtained by the program guide obtainment unit 122 and have the same providing source (step S804).

As described above, in the case where the providing sources of the watching possible program and the recordable-program guide are different, the program guide having the same providing source is obtained, and used for judging the same program. Thereby, it is possible to prevent the same programs from being expressed differently by the distribution agent. Thus, it is possible to judge the same programs more accurately.

Figures 19A, 19B:
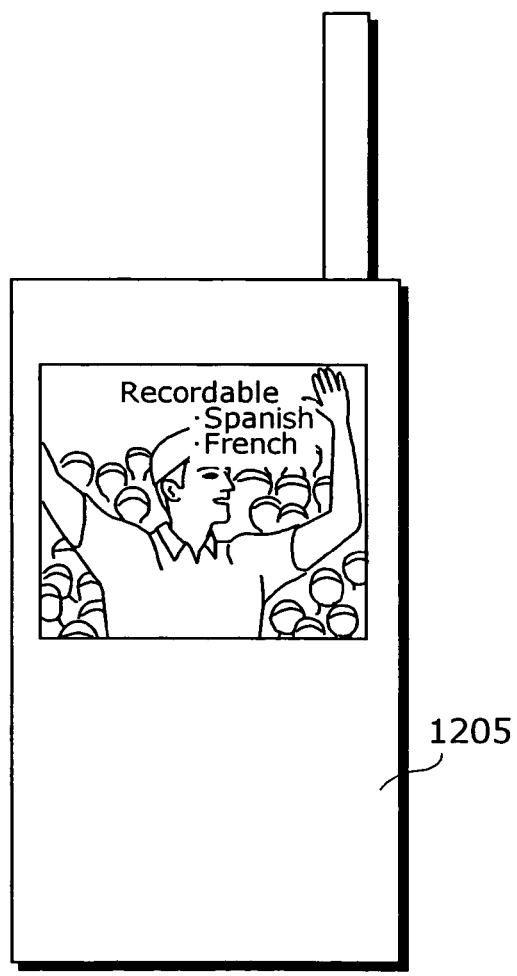
FIG. 19A is a diagram showing an example of languages distributed in a recording apparatus setting position and a current location.
FIG. 19B is a diagram showing a display example of a screen on which a program is being watched.

According to the present embodiment, the icon such as "recordable", the mark indicating that recording is possible, and the like are displayed. However, there are other cases as well. For example, as shown in FIG. 19A, in the case where the languages used for the same programs distributed in the recording apparatus setting position and the current location are different, the language in which the program is distributed is extracted from the recordable-program guide. As shown in FIG. 19B, the language used in the recording apparatus setting position may be displayed. Thereby, it is possible to have the user select whether or not to record the program depending on the distributed language.

Sixth Embodiment

In recent years, due to the low price of hard disk and the like, watching history of TV and the like can be easily accumulated. Thereby, it is possible to extract a user's taste from the watching history of the user's daily life, and to recommend a program that the user is likely to watch, based on the program information. Moreover, due to miniaturization of hardware of communication devices, an environment in which broadcast content can be watched anywhere has been improved. In the case where a program is recommended using the user's taste obtained from the ordinary watching history, the program is selected based on the same taste as usual. Thereby, a program which can be watched only at the travel destination cannot be recommended.

The present embodiment provides an apparatus which preferentially recommends a program that can be watched only at a travel destination in the case where a program is watched in a remote location from the user's residential area on travel and the like.

Figure 20:
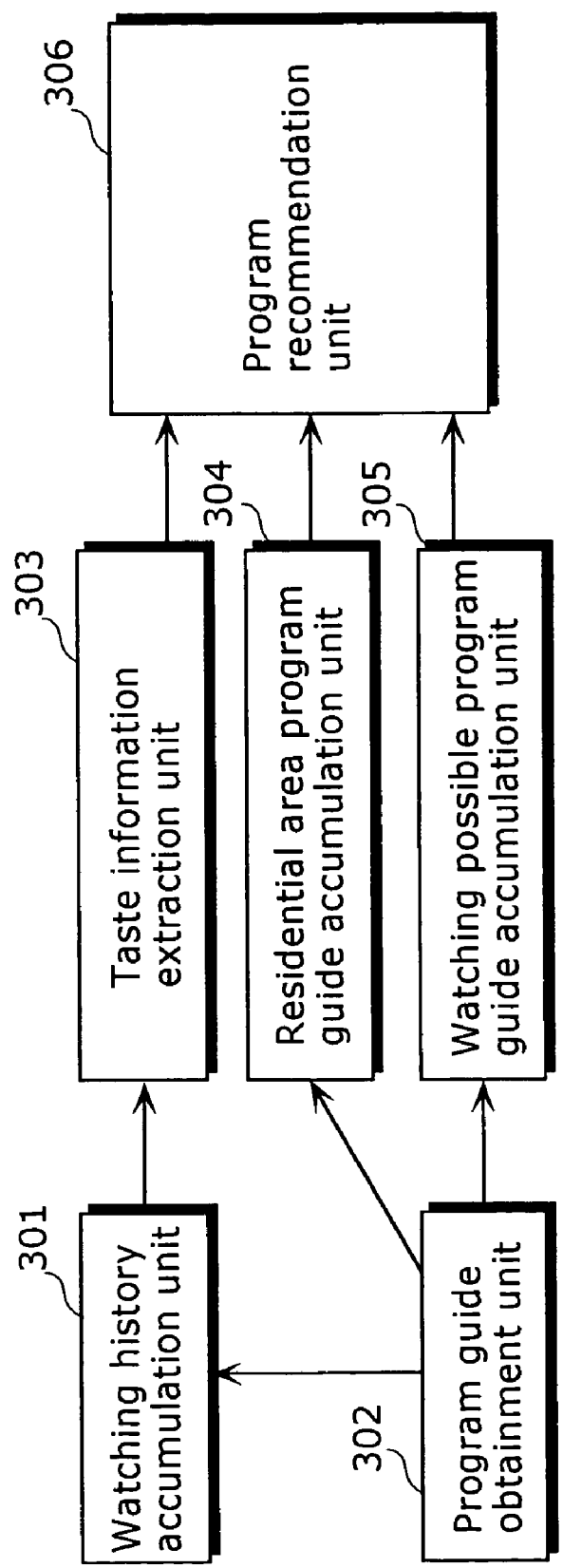
FIG. 20 is a block diagram showing a configuration of a watching support apparatus according to the sixth embodiment of the present invention.

FIG. 20 is a block diagram showing a configuration of a watching support apparatus according to the sixth embodiment of the present invention.

A watching support apparatus 300 is an apparatus which supports a user to watch programs. The watching support apparatus 300 includes: a watching history accumulation unit 301; a program guide obtainment unit 302; a taste information extraction unit 303; a residential area program guide accumulation unit 304; a watching possible program guide accumulation unit 305; and a program recommendation unit 306.

The watching history accumulation unit 301 obtains watching history of programs and accumulates the obtained watching history. The program guide obtainment unit 302 receives and obtains a program guide of broadcast content and program information regarding programs. The taste information extraction unit 303 extracts the user's taste information from the watching history accumulated by the watching history accumulation unit 301 and program information regarding the watched program. The residential area program guide accumulation unit 304 accumulates a program guide (hereinafter, referred to as a residential area program guide) listing programs broadcasted in the user's residential area where the user usually lives, the residential area program guide being obtained by the program guide obtainment unit 302. The watching possible program guide accumulation unit 305 accumulates a program guide (hereinafter, referred to as a watching possible program guide) which can be watched in the current area, the watching possible program guide being obtained by the program guide obtainment unit 302. The program recommendation unit 306 selects a program based on the user's taste information by preferentially selecting a program which is not included in the residential area program guide among the programs listed in the watching possible program guide.

Figure 21:
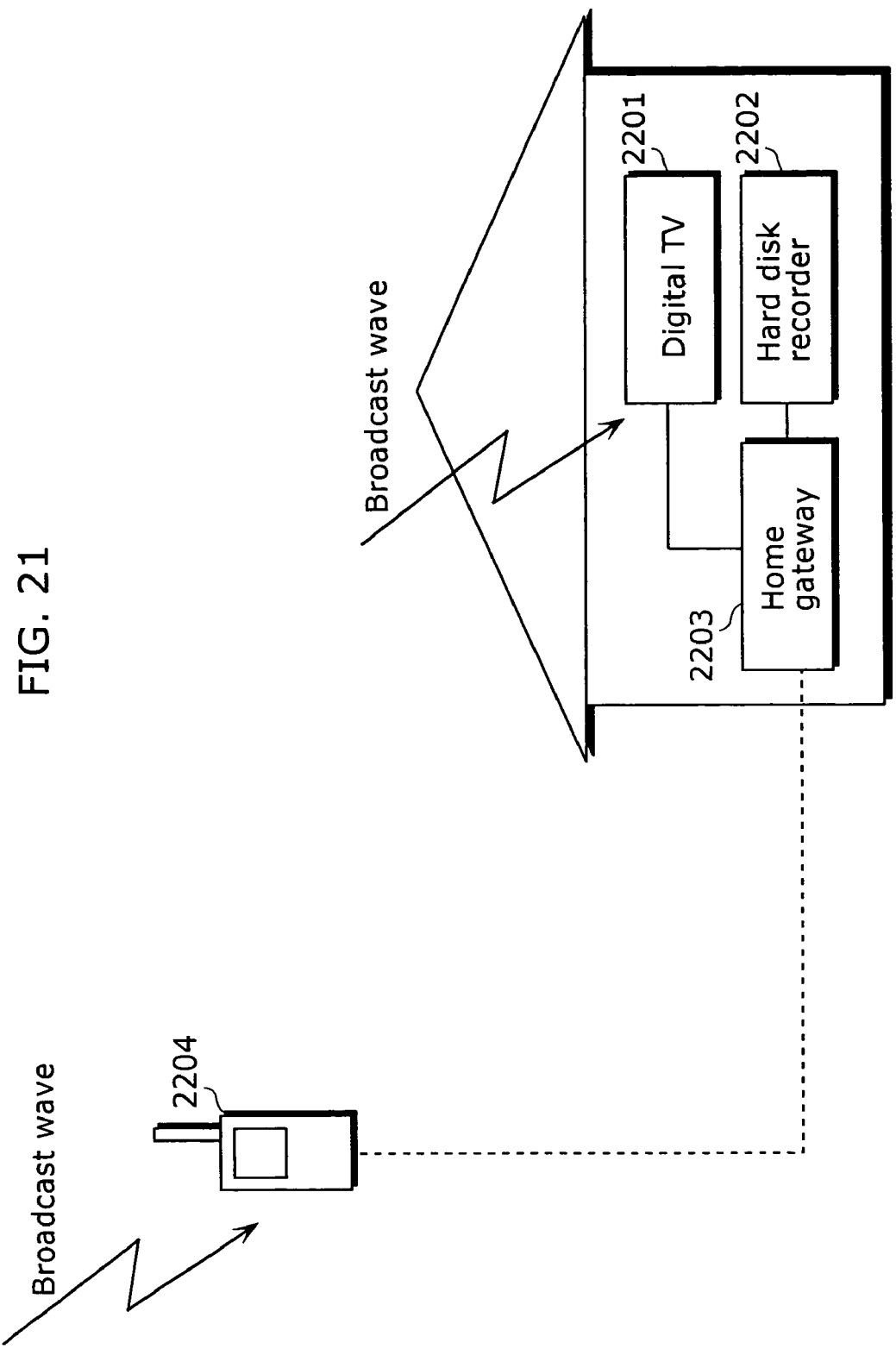
FIG. 21 is a configuration diagram showing an example of a hardware configuration in which a watching support apparatus according to the sixth embodiment of the present invention is used.

FIG. 21 is a configuration diagram showing an example of a hardware configuration in which a watching support apparatus according to the sixth embodiment of the present invention is used. This system includes: a digital TV 2201 which receives digital broadcast; a hard disk recorder 2202 which can accumulate digital broadcast into a hard disk; a home gateway 2203 which connects in-home networking devices to outside-home network; and a cellular phone 2204 which has a watching support apparatus 300 by which digital broadcast can be received and watched.

Figure 22:
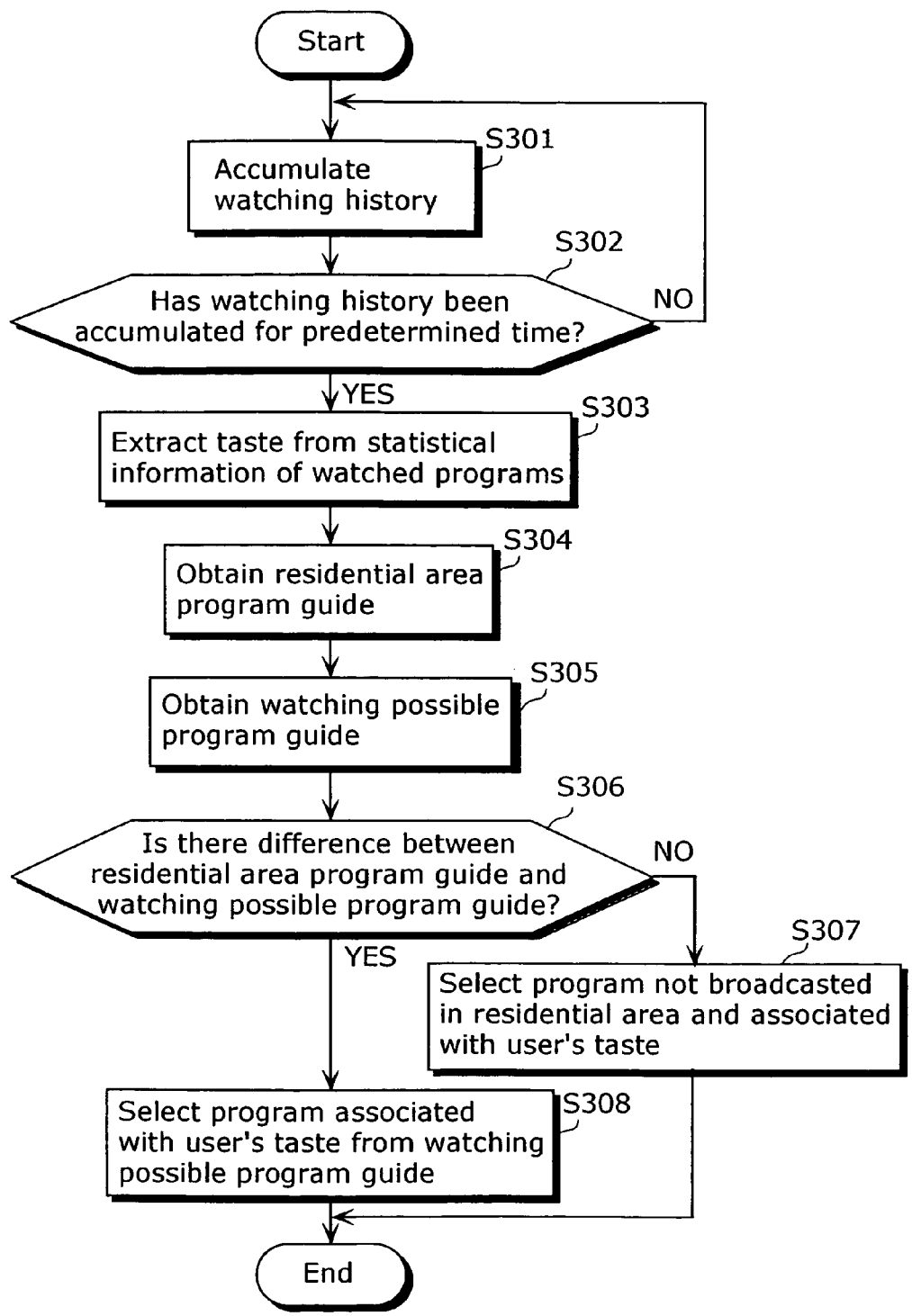
FIG. 22 is a flowchart showing a flow of operations performed in the case where a user watches a program using a cellular phone.

Next, the following operations will be described: a user watches a program using the cellular phone 2204 that has the watching support apparatus 300 configured as described above. FIG. 22 is a flowchart showing a flow of operations performed in the case where the user watches the program using the cellular phone.

The watching history accumulation unit 301 accumulates the following information as watching history: information related to the watching start date and the watching end date; information related to the watched channel; and information related to theme included in the program information obtained by the program guide obtainment unit 302 (step S301). Here, a theme for each program predetermined by a service provider is included in the program information distributed by the service provider which distributes programs.

The taste information extraction unit 303 judges whether or not the watching history has been accumulated for a predetermined watching time (for example, 40 hours and the like) (step S302). Here, in the case where the watching history has not been accumulated for the predetermined watching time (NO in step S302), the user's watching programs and accumulation of the watching history by the watching history accumulation unit 301 are repeated.

On the other hand, in the case where the watching history has been accumulated exceeding the predetermined watching time (YES in step S302), the taste information extraction unit 303 judges that the user's taste can be extracted from the watching history, and extracts the user's taste from the statistical information of the watching history (step S303). In other words, the taste information extraction unit 303 calculates the total amount of the watching time for each theme, for example, as shown in FIG. 23 using the watching history accumulated by the watching history accumulation unit 301. In the example as shown in FIG. 23, according to the watching history, it is noticeable that the user preferentially watches sports programs. According to the present embodiment, information regarding the theme is previously added to the program to be broadcasted. However, a characteristic keyword may be extracted from text information describing the program details, using a natural language processing method and the like.

The program guide obtainment unit 302 obtains a residential area program guide, and accumulates the obtained residential area program into the residential area program guide accumulation unit 304 (step S304). Here, for example, a residential program guide for a month ahead is obtained and accumulated. This residential program guide is obtained and accumulated when the user is present in the residential area.

The program guide obtainment unit 302 obtains the watching possible program guide in the current location, and accumulates the obtained watching possible program guide into the watching possible program guide accumulation unit 305 (step S305).

Figure 24:
FIG. 24 is a diagram showing a display example of a screen on which a program is preferentially recommended, the program not being broadcasted in the user's residential area.

The program recommendation unit 306 compares the residential area program guide with the watching possible program guide, and judges whether or not they are the same (step S306). As a result of the judgment, in the case where the residential area program guide and the watching possible program guide are different (NO in step S306), the program recommendation unit 306 (i) selects programs which are listed in the watching possible program guide and not included in the residential area program guide, (ii) displays a program as a recommended program as shown in FIG. 24, the program being associated with the user's taste information extracted by the taste information extraction unit 303 from among the selected programs, and (iii) recommends the program (step S307). For example, in the case where the user's current location is remote from the user's residential area, the residential area program guide and the watching possible program guide are different. In other words, the following program is preferentially recommended: the program which is broadcasted in the area where the user is currently present, but not broadcasted in the user's residential area.

On the other hand, as a result of the judgment, in the case where the residential area program guide and the watching possible program guide are the same (YES in step S306), the program recommendation unit 306 recommends a program associated with the user's taste information as a recommended program from among the programs listed in the watching possible program guide (step S308).

As described above, it is possible to selectively recommend the program which is broadcasted only outside the user's life area such as travel destination and business trip destination. Thereby, it is possible for the user to avoid missing the program which can be watched only at the moving destination.

Seventh Embodiment

In the case where a watched program is recorded using a cellular phone, since the cellular phone is carried around, the program cannot be received with a stable radio wave. Thereby, it is difficult to record the program clearly. Also, even when a user attempts to record a broadcast being watched on the cellular phone by an in-home recording apparatus using remote operation, recording cannot be immediately performed. According to the present embodiment, the following system will be described: a program is recorded by the cooperative operation between the cellular phone and the in-home recording apparatus.

Figure 25:
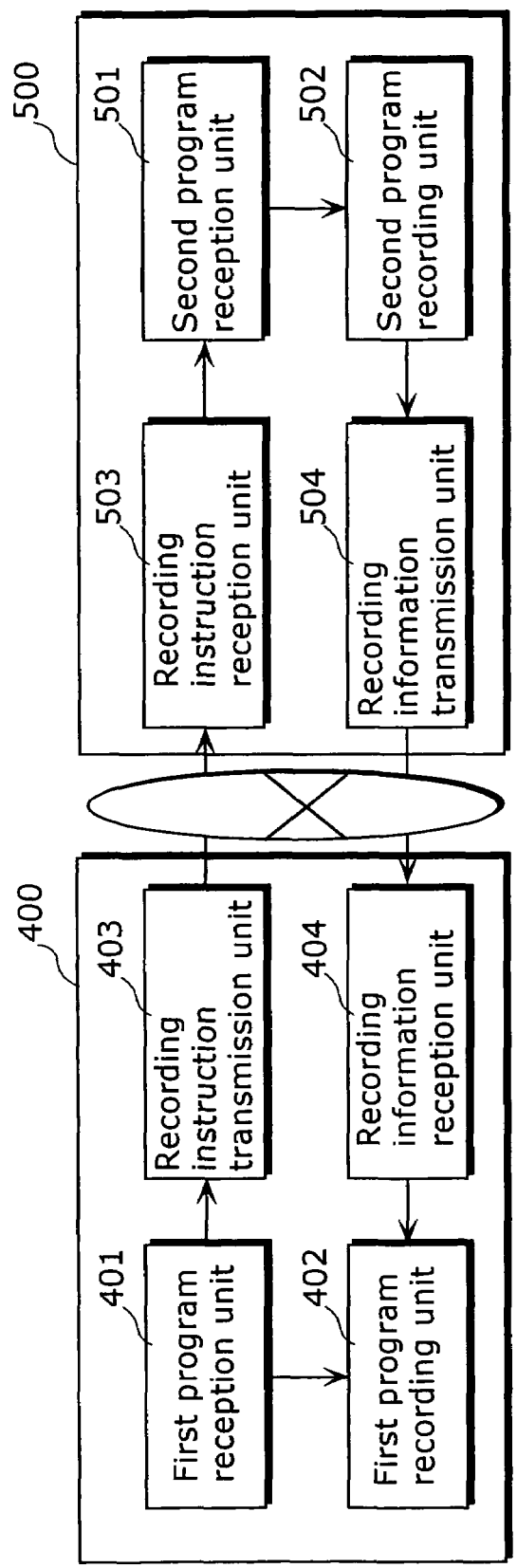
FIG. 25 is a block diagram showing a configuration of a program recording system according to the seventh embodiment of the present invention.

FIG. 25 is a block diagram showing a configuration of a program recording system according to the seventh embodiment of the present invention.

The program recording system is a system in which the program is recorded by the cooperative operation between two recording apparatuses. The program recording system includes the first recording apparatus 400 and the second recording apparatus 500 connected to the first recording apparatus 400 via network.

The first recording apparatus 400 is an apparatus such as a cellular phone, and includes: the first program reception unit 401; the first program recording unit 402; a recording instruction transmission unit 403; and a recording information reception unit 404. On the other hand, the second recording apparatus 500 is, for example, a recording apparatus set in a home, and includes: the second program reception unit 501; the second program recording unit 502; a recording instruction reception unit 503; and a recording information transmission unit 504.

The first program reception unit 401 receives a broadcasted program. The first program recording unit 402 records a program received by the first program reception unit 401. The recording instruction transmission unit 403 transmits an instruction, to the second recording apparatus 500, to record the program being recorded by the first program recording unit 402. The recording information reception unit 404 receives recording information which includes the recording start time and the recording ID, the recording information being transmitted from the second recording apparatus 500.

The recording instruction reception unit 503 receives the instruction to record the program, the instruction being transmitted from the first recording apparatus 400. The second program reception unit 501 receives a broadcasted program. The second program recording unit 502 (i) generates a recording ID for specifying a program instructed to record by the first recording apparatus 400, (ii) associates the program instructed to record with the recording ID, and (iii) records the program. The recording information transmission unit 504 transmits recording information to the first recording apparatus 400, the recording information including the time at which recording was started by the second program recording unit 502 and the generated recording ID.

Figure 26:
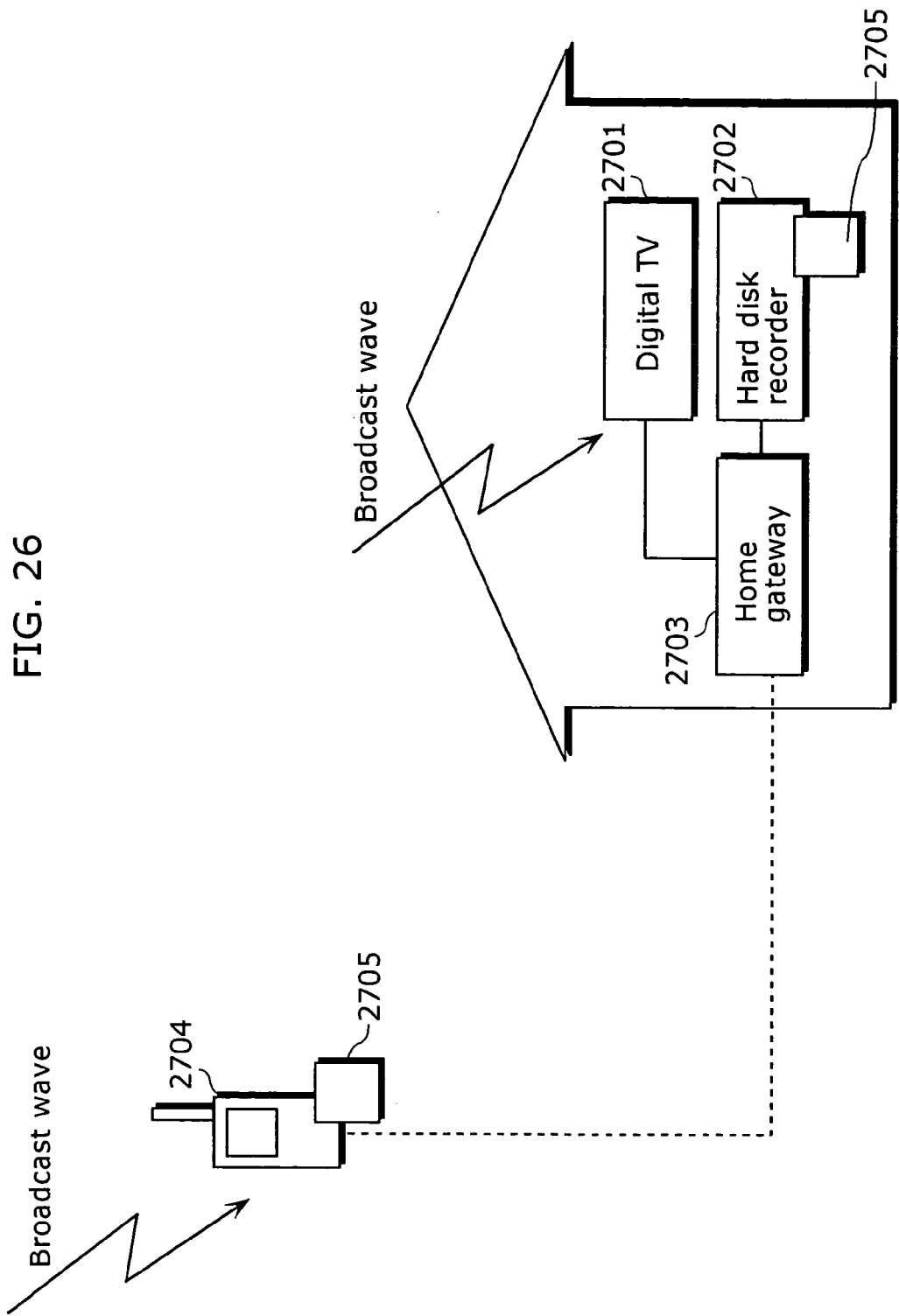
FIG. 26 is a diagram showing an example of hardware configuration in which a program recording system according to the seventh embodiment of the present invention is used.

FIG. 26 is a diagram showing an example of a hardware configuration in which a program recording system according to the seventh embodiment of the present invention is used. This system includes: a digital TV 2701 which receives digital broadcast; a hard disk recorder 2702 which is the second recording apparatus 500 that can accumulate digital broadcast into a hard disk; a home gateway 2703 which connects in-home networking devices to outside-home network; a cellular phone 2704 which is the first recording apparatus 400 by which digital broadcast can be received and watched; and a program accumulation semiconductor medium 2705 which can accumulate content such as broadcast.

Figure 27:
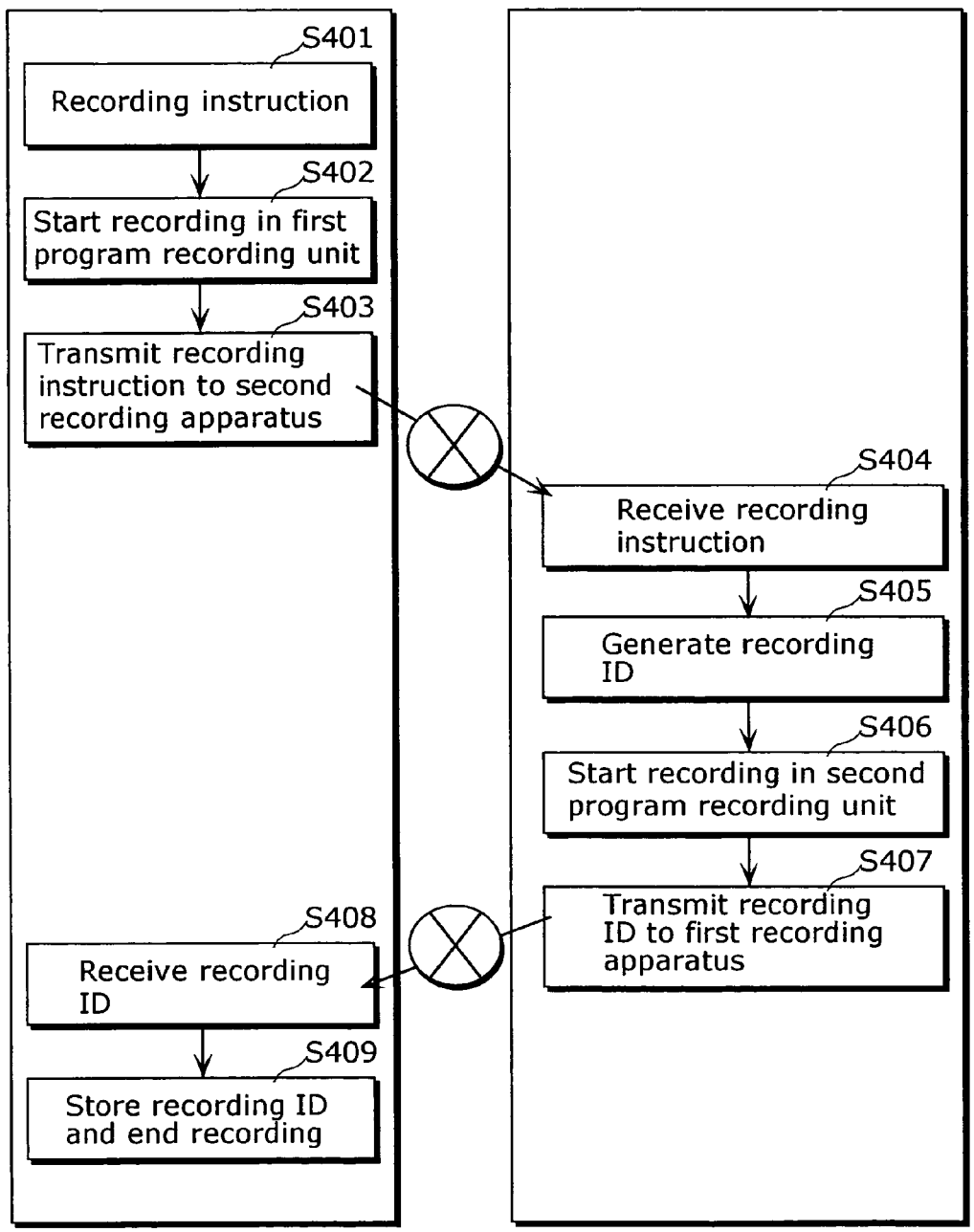
FIG. 27 is a flowchart showing a flow of operations performed in the case where a program is recorded in a program recording system.

Next, the following operations will be described: a program is recorded, the program being watched using the cellular phone 2704 which is the first recording apparatus 400 included in the program recording system configured as described above. FIG. 27 is a flowchart showing a flow of operations performed in the case where the program is recorded in the program recording system.

Figure 28:
FIG. 28 is a diagram showing a display example of a screen on which a program is watched using a cellular phone.

Here, as shown in FIG. 28, when a user is watching a sports program using the cellular phone 2704, the user provides the cellular phone 2704 with an instruction to record the program so as to repeatedly watch the program or to accumulate the program for storing.

Figure 29:
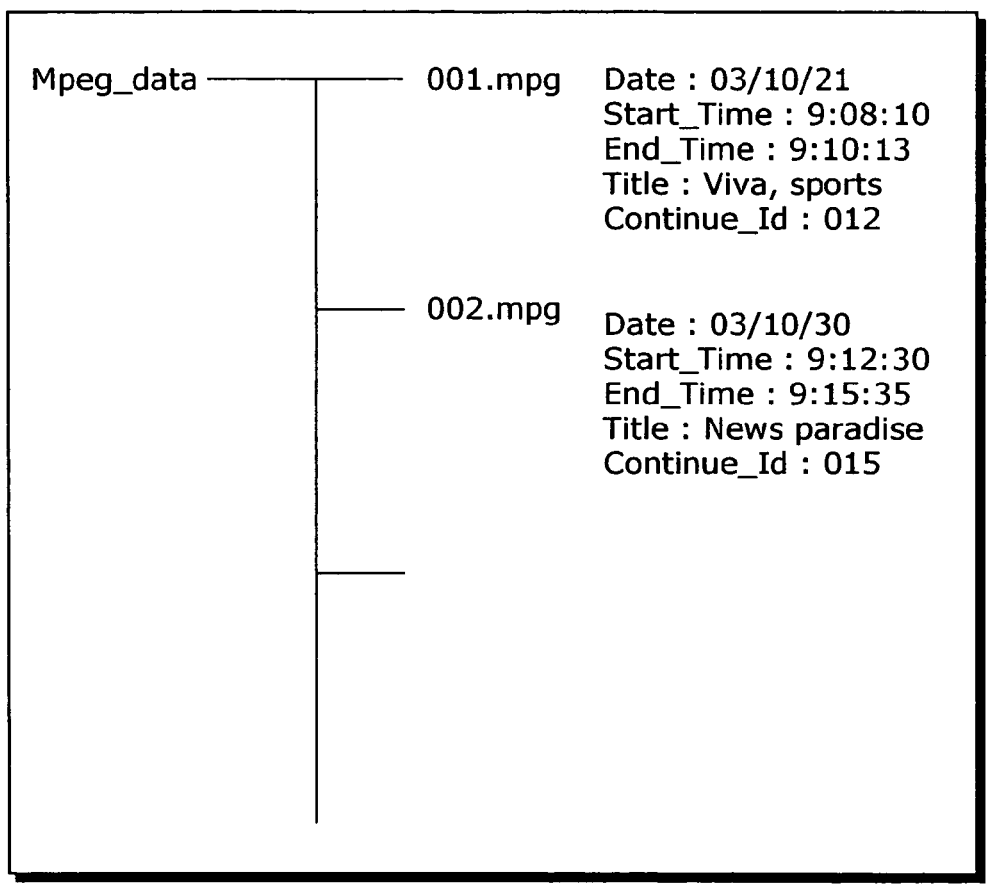
FIG. 29 is a diagram showing an example of information stored in a semiconductor medium.

After recording is requested for the program being watched by the user in the first recording apparatus 400 which is the cellular phone 2704 (step S401), the first program recording unit 402 starts recording the program for which the recording has been requested (step S402). Here, the first program recording unit 402 stores the program into the program accumulation semiconductor medium 2705 attached to the cellular phone 2704. Also, as shown in FIG. 29, the first program recording unit 402 simultaneously stores information such as a file name (for example, "001. mpg"), a recording start time (for example, "8 minutes and 10 seconds past 9 o'clock") and a title (for example, "Viva, sports").

Simultaneously, the recording instruction transmission unit 403 transmits, to the second recording apparatus 500 via network and home gateway, an instruction to record a program for which recording has been requested (step S403). Here, the recording instruction transmission unit 403 transmits the recording instruction including channel information regarding the program for which recording has been requested.

The recording instruction reception unit 503 included in the second recording apparatus 500 (hard disk recorder 2702) receives the recording instruction transmitted from the first recording apparatus 400 (step S404). Then, the recording instruction reception unit 503 notifies (i) the second program reception unit 501 of the channel information and (ii) the second program recording unit 502 of the recording instruction.

The second program reception unit 501 receives broadcast of the notified channel. The second program recording unit 502 generates a recording ID for specifying a program which has been instructed to record (step S405). Then, the second program recording unit 502 associates the program with the recording ID, and starts recording the program received by the second program reception unit 501 (step S406). FIG. 30 is a diagram showing an example of recording information of programs recorded by the second recording apparatus 500. In the example as shown in FIG. 30, as recording information, a recording ID, a recording date, a recording start time, a title and information regarding a recording setting source are accumulated. Also, information such as a direct recording request, a timer recording, recording setting using a cellular phone is accumulated into the recording setting source.

Next, the recording information transmission unit 504 transmits the recording ID and the recording start time as recording information to the first recording apparatus 400 (step S407). Thereby, the first recording apparatus 400 is notified that recording has been started in the second recording apparatus 500.

The recording information reception unit 404 of the first recording apparatus 400 receives recording information including the recording start time and the recording ID, the recording information being transmitted from the second recording apparatus 500, and notifies the first program recording unit 402 of the received recording information (step S408). Here, in the case where the program instructed to record is "Viva, sports" as shown in FIG. 30, "12" is received as the recording ID.

Figure 32:
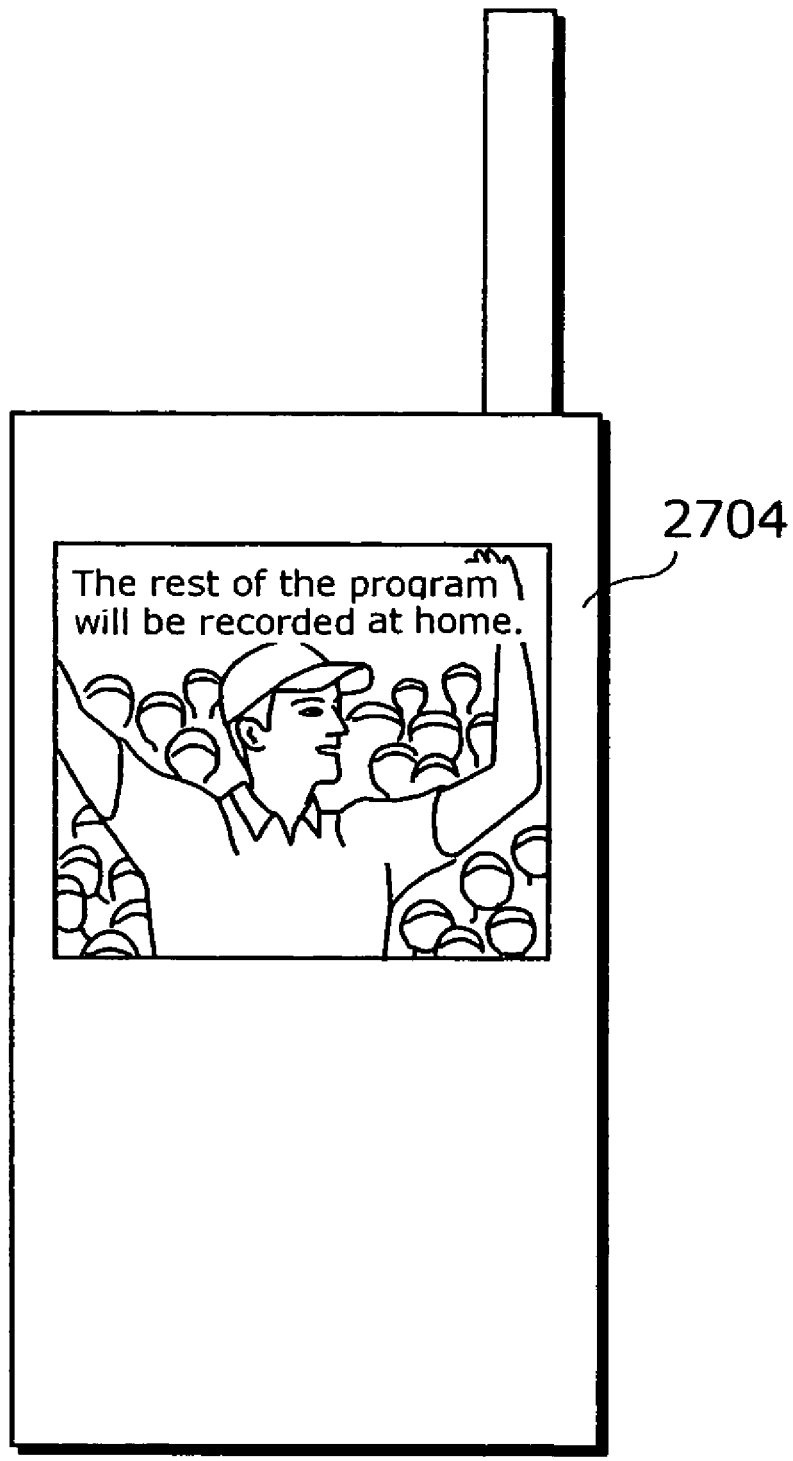
FIG. 32 is a diagram showing a display example of notifying termination of recording a program being recorded by the first recording apparatus.

After the recording ID is notified, the first program recording unit 402 displays such a message as shown in FIG. 32, and ends recording the program which is being recorded (step S409). Here, the first program recording unit 402 associates the recording completed program with the recording ID, and stores the program associated with the recording ID. Thereby, as shown in FIG. 29, in addition to the information such as a file name, a recording start time and a title, information such as the recording ID (for example, "12") and a recording end time (for example, "10 minutes and 13 seconds past 9 o'clock") is accumulated into the program accumulation semiconductor medium 2705.

As described above, at the stage when the recording of the program is requested in the first recording apparatus 400 (the cellular phone 2704), the recording in the first recording apparatus 400 is started. And, the recording in the first recording apparatus 400 is continued until the recording in the second recording apparatus 500 (the hard disk recorder 2702) is started. Then, at the point when the recording in the second recording apparatus 500 is started, the recording in the first recording apparatus 400 is ended. Thereby, recording of the program can be started in the first recording apparatus 400, the program being currently watched by the user in the first watching apparatus 400. Moreover, the recording can be instructed to the second recording apparatus 500. Thus, the user can easily record the desired program in the second recording apparatus 500 where the stable receiving state can be desired.

In addition to the case where the state of the radio wave is unstable, for example, the present embodiment is effective in the case where there is little battery power or there is little capacity in memory.

Figure 31:
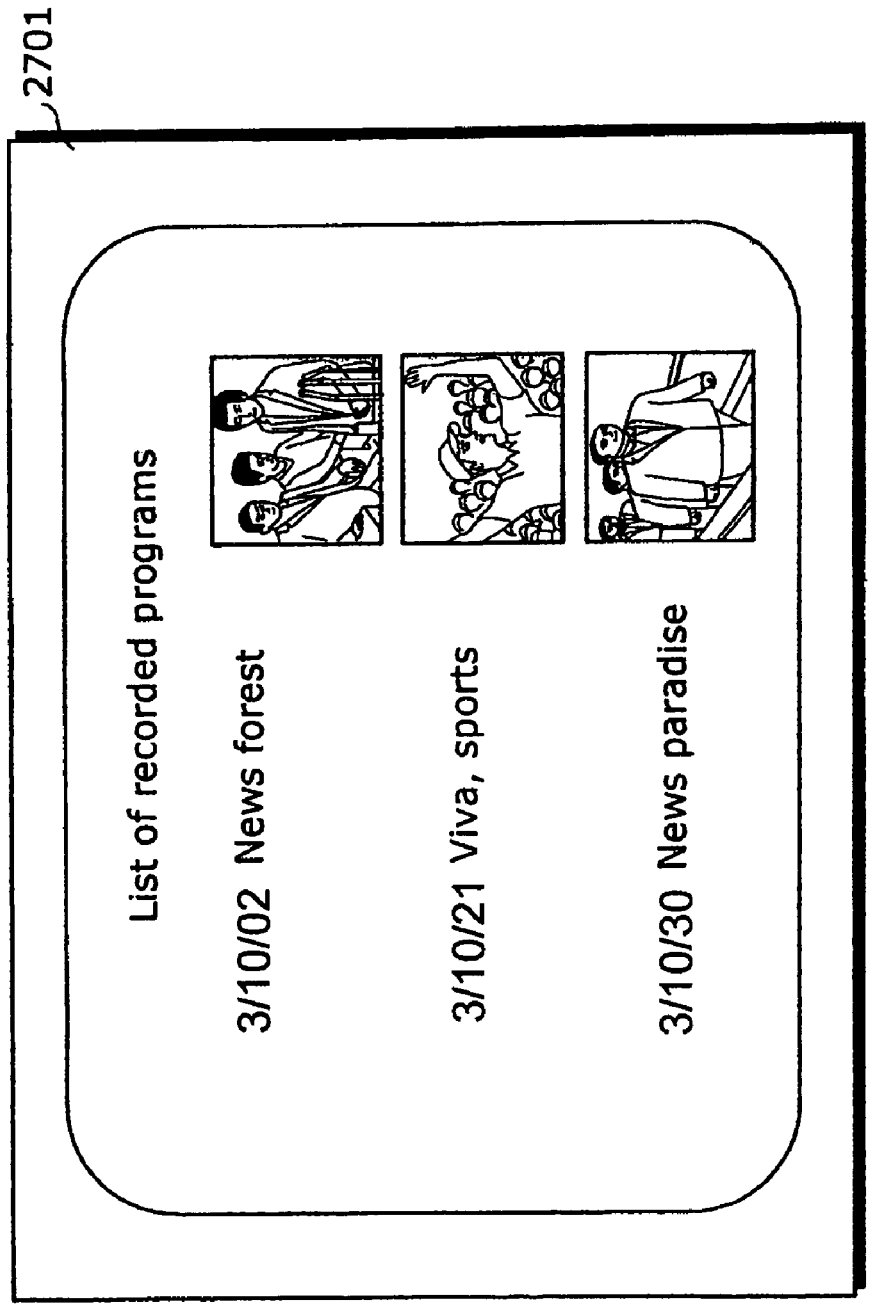
FIG. 31 is a diagram showing an example of a list of programs recorded by the second recording apparatus.

Also, using a semiconductor memory inserted into an interface, the semiconductor memory including the program recorded by the first recording apparatus 400, the second recording apparatus 500 can obtain a program recorded by the first recording apparatus 400, and combine the obtained program with the program recorded by the second program recording unit 502. Here, based on the recording ID, it can be judged which of the programs recorded by the second program recording unit 502 is the continuation of the program recorded by the first recording apparatus 400, and the associated programs can be combined. Thereby, the programs partially recorded separately by the first recording apparatus 400 and the second program recording unit 502 can be recognized as one program as shown in FIG. 31.

According to the present embodiment, using the semiconductor memory inserted into the interface of the second recording apparatus 500, the semiconductor memory including the program recorded by the first recording apparatus 400, it is possible to combine the program recorded by the first recording apparatus 400 and the program recorded by the second recording apparatus 500, and to sequentially watch the combined programs. However, in the case where a sufficient bandwidth can be secured between the first recording apparatus 400 and the second recording apparatus 500, it is possible to combine the programs and reproduce the combined programs in the first recording apparatus 400 by distributing the program to the first recording apparatus 400, recording of the program being completed in the second recording apparatus 500. Thereby, the user can record the program in the first recording apparatus 400 only by operating the first recording apparatus 400. Moreover, since the program is recorded by the second recording apparatus 500, the battery power of the first recording apparatus 400 is not wasted. Furthermore, since the program is received using a fixed antenna in home, the image can be recorded clearly.

Also, according to the present embodiment, after the recording instruction is provided in the first recording apparatus 400, communication with the second recording apparatus 500 is performed. However, the communication with the second recording apparatus 500 may be performed at the point when the program watching operation is started in the first recording apparatus 400. Thereby, in the case where the recording instruction is provided in the first recording apparatus 400, the recording can be immediately started. In addition, the program recording may be started in the second recording apparatus 500 when the program watching is started in the first recording apparatus 400. Thereby, in the case where the recording instruction is provided from the first recording apparatus 400, it is possible to sequentially record the program whose broadcast has been already started.

Eighth Embodiment

According to the seventh embodiment, the following case has been described: a program is recorded by the cooperative operation of the cellular phone and the in-home recording apparatus. According to the present embodiment, the following case will be described: a recording instruction is provided after it is judged whether or not a program to be instructed to record is broadcasted in the location where the in-home recording apparatus is positioned.

Figure 33:
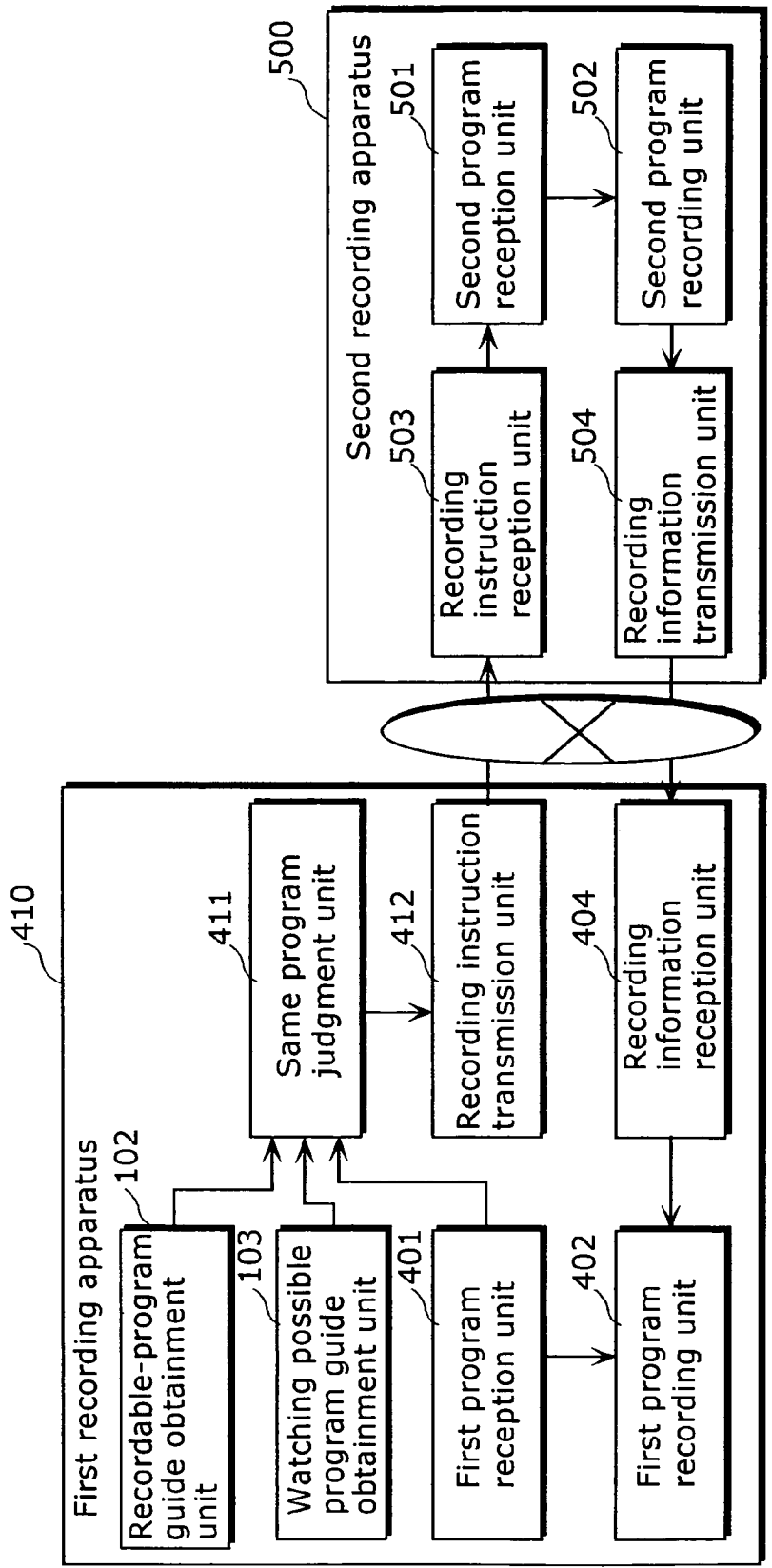
FIG. 33 is a block diagram showing a configuration of a program recording system according to the eighth embodiment of the present invention.

FIG. 33 is a block diagram showing a configuration of a program recording system according to the eighth embodiment of the present invention. Here, the same components as in the first embodiment and the seventh embodiment are assigned with the same codes, and the detailed description will be omitted.

According to the program recording system of the present embodiment, in addition to the configuration of the first recording apparatus 400 of the seventh embodiment, as shown in FIG. 33, the first recording apparatus 410 includes: a recordable-program guide obtainment unit 102; a watching possible program guide obtainment unit 103; and a same program judgment unit 411.

The same program judgment unit 411 compares a watching possible program guide with a recordable-program guide, and judges whether or not the same program as the program recorded by the first program recording unit 402 is broadcasted in the location where the second recording apparatus 500 is positioned. In the case where it is judged that the same program is broadcasted in the location where the second recording apparatus 500 is positioned, the recording instruction transmission unit 412 transmits a recording instruction of the program recorded by the first program recording unit 402 to the second recording apparatus 500. On the other hand, in the case where it is judged that the same program is not broadcasted in the location where the second recording apparatus 500 is positioned, the same program judgment unit 411 causes the following message to be displayed such as "this program is not broadcasted in the location where the second recording apparatus 500 is positioned".

As described above, the recording instruction is provided after it is judged whether or not the program requested to be recorded by the first recording apparatus 410 is broadcasted in the location where the second recording apparatus 500 is positioned. Thereby, it can be prevented that a different program is recorded by the second recording apparatus 500.

Ninth Embodiment

For example, according to the program recording system of the seventh embodiment, since the recording apparatuses are different, the program recorded by the first recording apparatus and the program recorded by the second recording apparatus may have different volume and the like. In the case where recorded contents having different volumes are combined, it may be necessary to adjust the volume and the like when reproducing the part around the union of the combined contents. According to the present embodiment, the following case will be described: contents recorded by respective recording apparatuses are combined while adjusting the sound volume powers.

Figure 34:
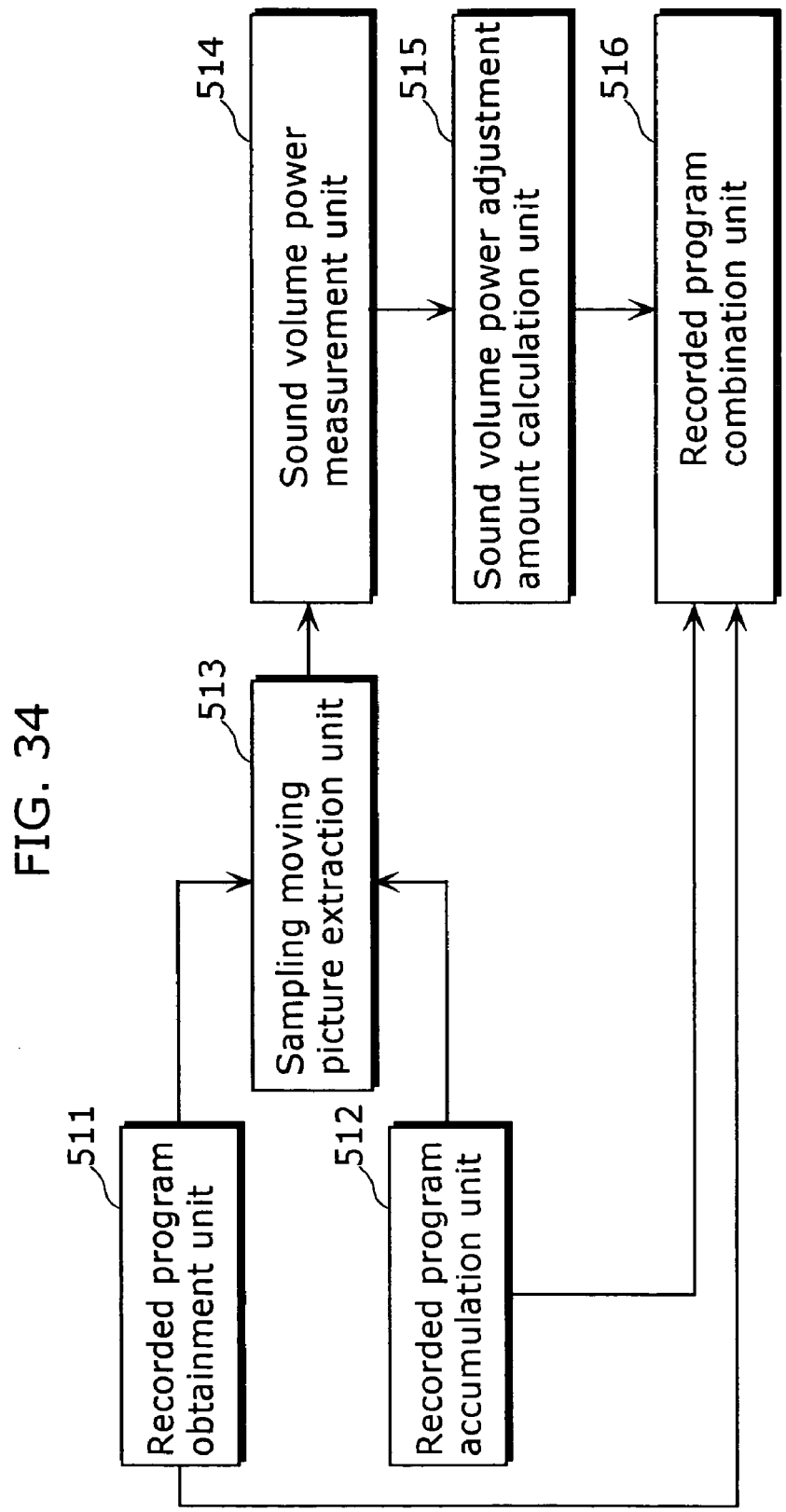
FIG. 34 is a block diagram showing a configuration of the second recording apparatus in a program recording system according to the ninth embodiment of the present invention.

FIG. 34 is a block diagram showing a configuration of the second recording apparatus in a program recording system according to the ninth embodiment of the present invention. Here, the configuration of the first recording apparatus is the same as the seventh embodiment, and the description will be omitted.

The second recording apparatus 510 is, for example, a recording apparatus set in home. As shown in FIG. 34, the second recording apparatus 510 includes: a recoded program obtainment unit 511; a recorded program accumulation unit 512; a sampling moving picture extraction unit 513; a sound volume power measurement unit 514; a sound volume power adjustment amount calculation unit 515; and a recorded program combination unit 516.

The recorded program obtainment unit 511 obtains a program (hereinafter, referred to as the first recorded content) recorded by the first recording apparatus 400 from a semiconductor memory which includes the first recorded content. The recorded program accumulation unit 512 accumulates a program (hereinafter, referred to as the second recorded content) recorded according to the recording instruction from the first recording apparatus 400. The sampling moving picture extraction unit 513 extracts the respective content data (hereinafter, referred to as sampling moving pictures) for the part of the common time from the first recorded content obtained by the recorded program obtainment unit 511 and from the second recorded content accumulated in the recorded program accumulation unit 512. Here, the content data for the part of the predetermined time is recorded in both of the first recorded content and the second recorded content.

Figures 35A, 35B:
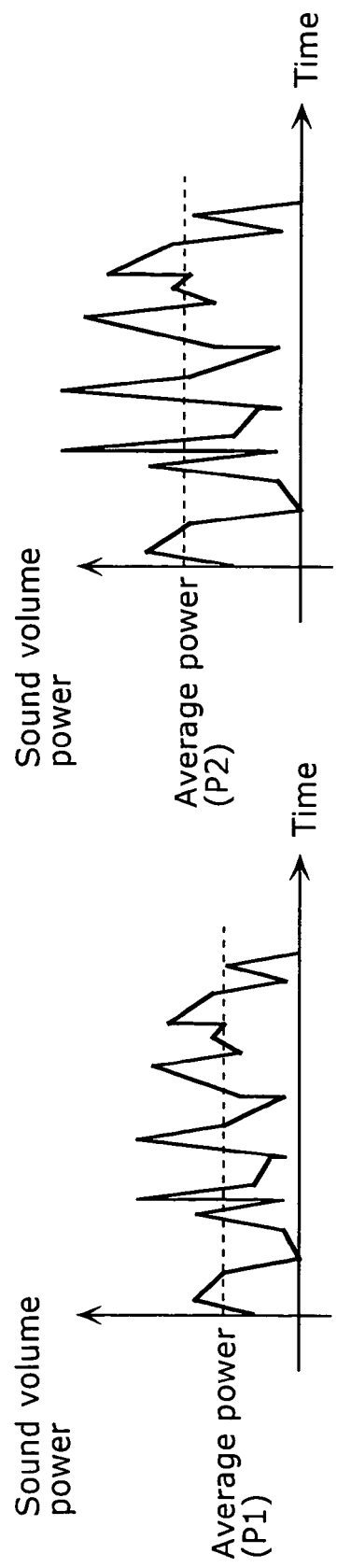
FIG. 35A is a diagram showing an example of sound volume power of a sampling moving picture measured by a sound volume power measurement unit in the case of the first recorded content.
FIG. 35B is a diagram showing an example of sound volume power of a sampling moving picture measured by a sound volume power measurement unit in the case of the second recorded content.

The sound volume power measurement unit 514 measures the respective sound volume powers of the sampling moving pictures extracted by the sampling moving picture extraction unit 513. FIG. 35A is a diagram showing an example of sound volume power of a sampling moving picture measured by a sound volume power measurement unit in the case of the first recorded content. FIG. 35B is a diagram showing an example of sound volume power of a sampling moving picture measured by a sound volume power measurement unit in the case of the second recorded content. As shown in FIGS. 35A and 35B, the respective waveforms of the sound volume powers are the same between the first recorded content and the second recorded content, but the amplitudes are different.

The sound volume power adjustment amount calculation unit 515 calculates respective average sound volume powers of the sampling moving pictures of the first recorded content and the second recorded content. Then, the sound volume power adjustment amount calculation unit 515 calculates adjustment amount of the sound volume power so that the average sound volume power of the sampling moving picture of the first recorded content can be adjusted to the average sound volume power of the sampling moving picture of the second recorded content. According to the above mentioned example, the adjustment amount of the sound volume power is calculated so that the average sound volume power of the first recorded content is adjusted to the average sound volume power of the second recorded content. However, there are other cases as well. For example, the adjustment amount of the sound volume power may be calculated so that the average sound volume power of the second recorded content is adjusted to the average sound volume power of the first recorded content. Also, the adjustment amount of the sound volume power may be calculated so that the average sound volume power can be adjusted to the mid-level sound volume power between the average sound volume power of the first recorded content and the average sound volume power of the second recorded content.

The recorded program combination unit 516 adjusts the sound volume power of the first recorded content according to the adjustment amount of the sound volume power calculated by the sound volume power adjustment amount calculation unit 515. Then, the recorded program combination unit 516 combines the first recorded content and the second recorded content.

Figure 36:
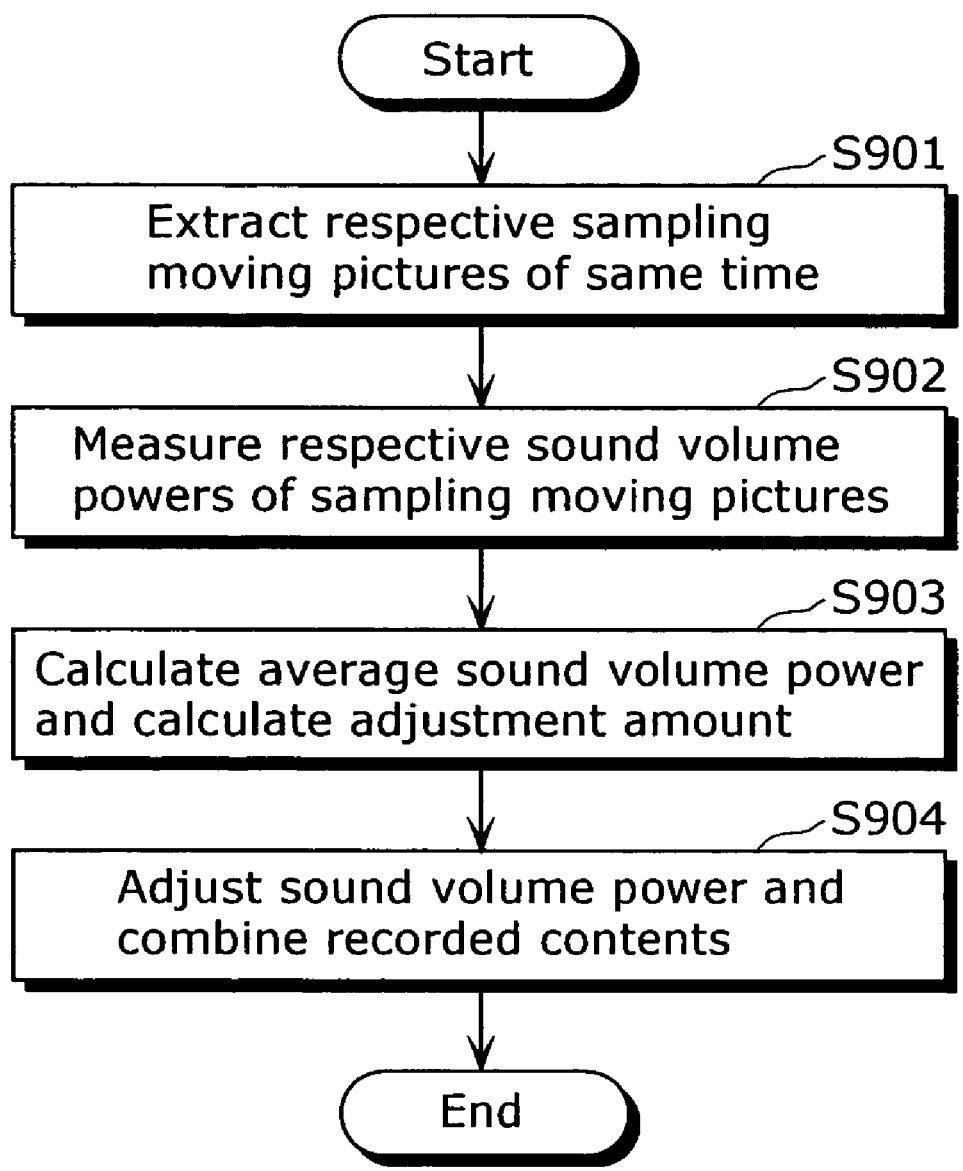
FIG. 36 is a flowchart showing a flow of operations performed in the case where the first recorded content and the second recorded content are combined in the second recording apparatus.

Next, operations performed in the following case will be described: the first recorded content and the second recorded content are combined in the second recording apparatus 510. FIG. 36 is a flowchart showing a flow of operations performed in the case where the first recorded content and the second recorded content are combined in the second recording apparatus 510.

The sampling moving picture extraction unit 513 extracts respective sampling moving pictures from the first recorded content obtained by the recorded program obtainment unit 511 and from the second recorded content accumulated in the recorded program accumulation unit 512 (step S901). Next, the sound volume power measurement unit 514 measures respective sound volume powers of the sampling moving pictures extracted by the sampling moving picture extraction unit 513 (step S902). Next, the sound volume power adjustment amount calculation unit 515 calculates the adjustment amount of the sound volume power so that the average sound volume power of the sampling moving picture of the first recorded content is adjusted to the average sound volume power of the sampling moving picture of the second recorded content (step S903). Next, the recorded program combination unit 516 adjusts the sound volume power of the first recorded content according to the adjustment amount of the sound volume power, and combines the first recorded content and the second recorded content (step S904).

As described above, the recorded parts broadcasted at the same time are used, the sound volume powers of the respective recorded contents are adjusted, and the recorded contents are combined. Thereby, it is not necessary to readjust the volume and the like when reproducing the combined contents.

Tenth Embodiment

For example, in the program recording system according to the seventh embodiment, in the case where the program recorded by the first recording apparatus and the program recorded by the second recording apparatus are simply combined, there is a high possibility that distortion of the picture occurs in the switching part. According to the present embodiment, the following case will be described: the recorded contents are combined using the switching part of the programs.

Figure 37:
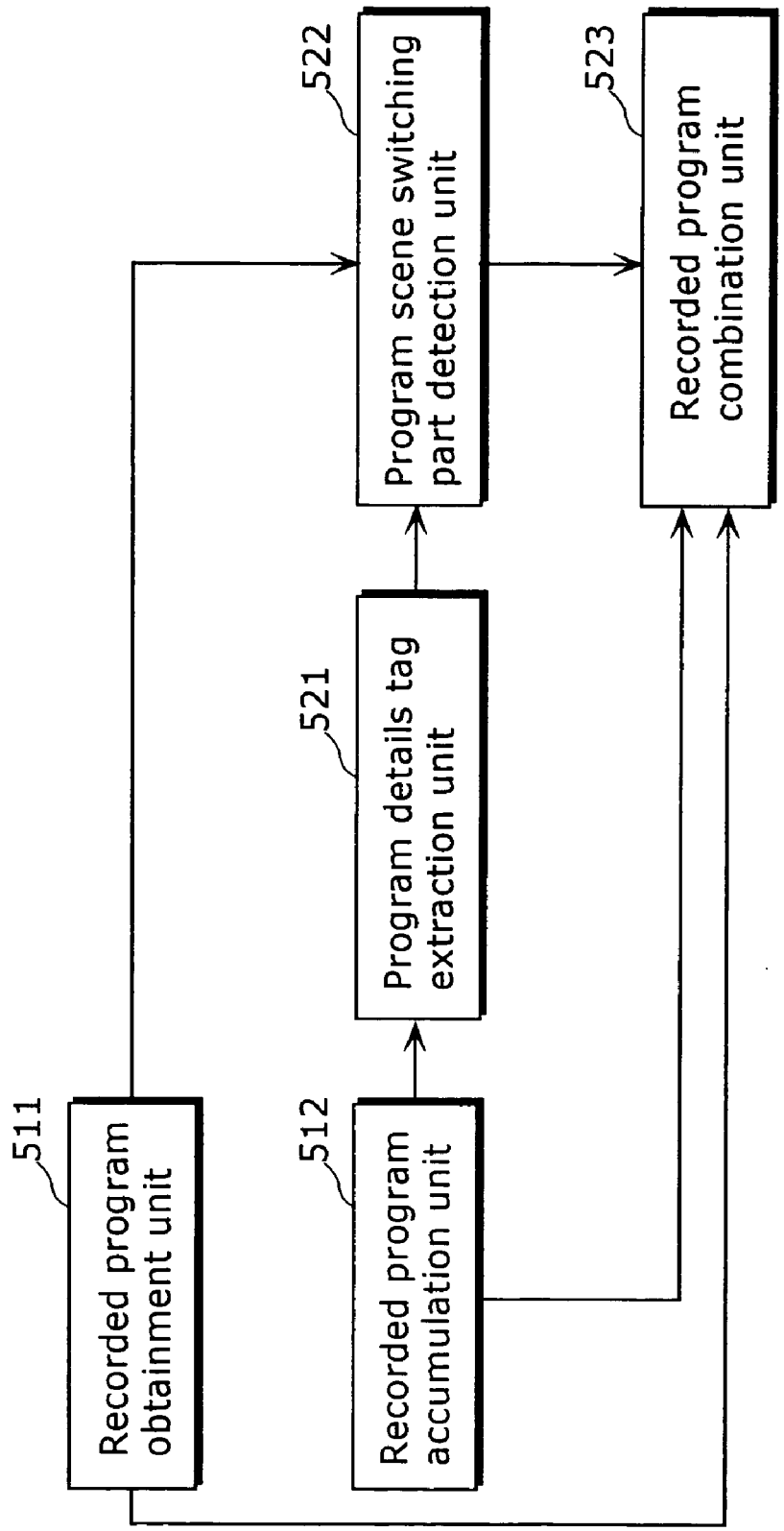
FIG. 37 is a block diagram showing a configuration of the second recording apparatus in a program recording system according to the tenth embodiment of the present invention.

FIG. 37 is a block diagram showing a configuration of the second recording apparatus in a program recording system according to the tenth embodiment of the present invention. The same components as the ninth embodiment are assigned with the same codes, and the detailed description will be omitted.

The second recording apparatus 520 is, for example, a recording apparatus set in home. As shown in FIG. 37, the second recording apparatus 520 includes: a recorded program obtainment unit 511; a recorded program accumulation unit 512; a program details tag extraction unit 521; a program scene switching part detection unit 522; and a recorded program combination unit 523.

Figure 39:
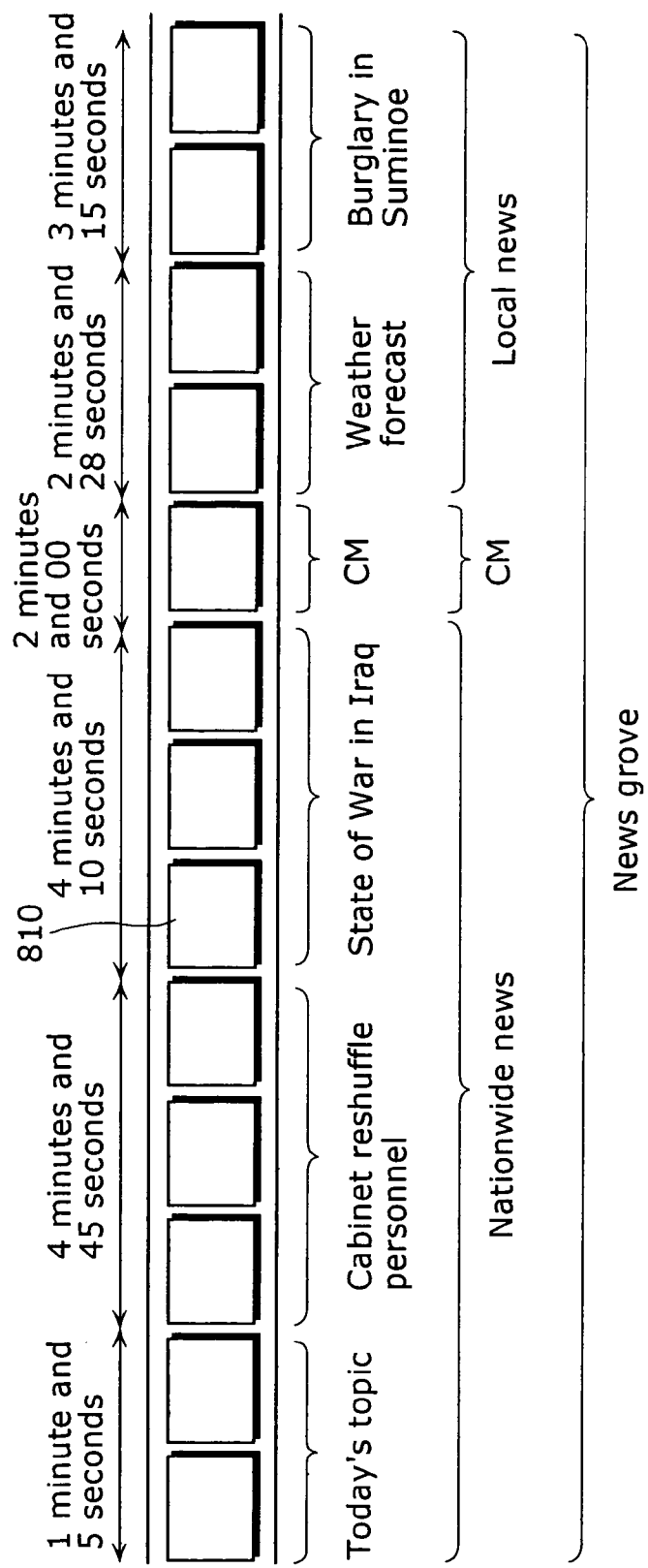
FIG. 39 is a diagram showing an example configuration of program scenes.

The program details tag extraction unit 521 extracts tag information regarding the program details from the second recorded content accumulated in the recorded program accumulation unit 512. FIG. 38 is a diagram showing an example of the tag information. As shown in FIG. 38, the program title, the program details of a certain time and the like are described in the tag information. The program scene switching part detection unit 522 detects the switching part of the scenes from the tag information extracted by the program details tag extraction unit 521. FIG. 39 is a diagram showing an example configuration of the program scene.

The recorded program combination unit 523 combines the first recorded content and the second recorded content in the switching part of the scenes 810 as shown in FIG. 39 detected by the program scene switching part detection unit 522 among the parts of the common time between the first recorded content obtained by the recorded program obtainment unit 511 and the second recorded content accumulated in the recorded program accumulation unit 512.

As described above, the switching part of the programs is detected from the tag information of the recorded programs. Then, the recorded contents are combined using the switching part of the programs. Thereby, the well-presented combination of the recorded programs can be realized.

Eleventh Embodiment

It is often restricted to copy recorded content such as digital broadcast into other media in view of copyright protection. Therefore, for example, in the program recording system according to the seventh embodiment, there is a case where the content recorded using a cellular phone and the content recorded in home where a recording apparatus is positioned cannot be combined. According to the present embodiment, the following program recording system will be described: even in the case where it is restricted to copy the recorded contents into other media, the contents can be combined.

Figure 40:
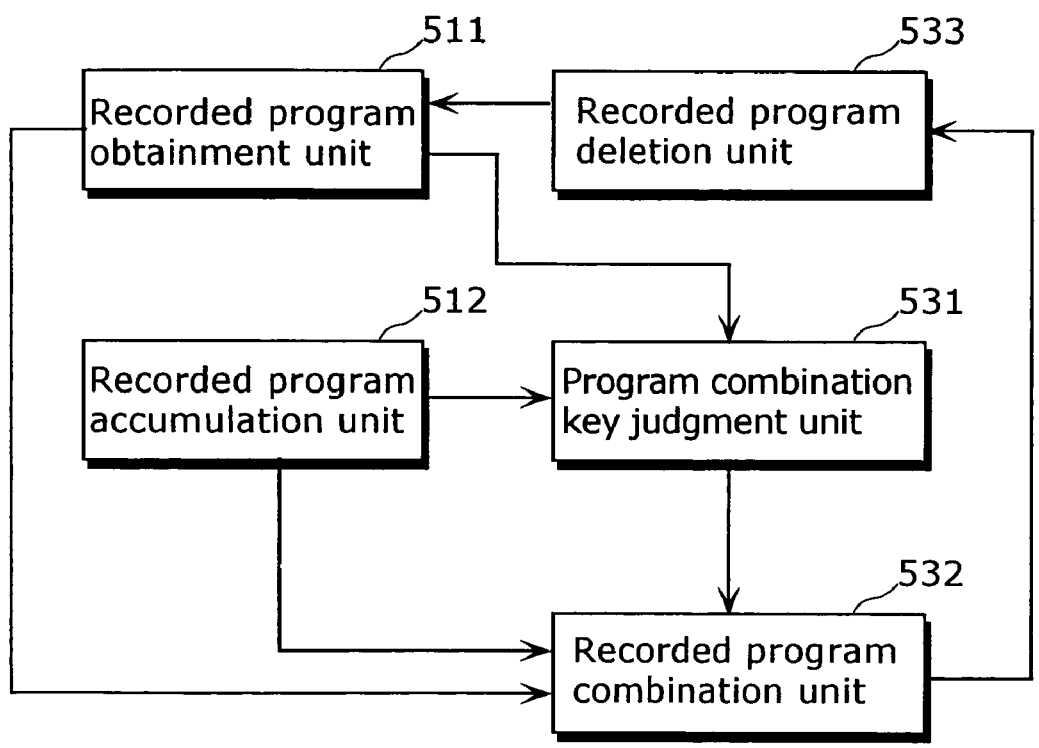
FIG. 40 is a block diagram showing a configuration of the second recording apparatus in a program recording system according to the eleventh embodiment of the present invention.

FIG. 40 is a block diagram showing a configuration of the second recording apparatus in a program recording system according to the eleventh embodiment of the present invention. Here, the same components as the ninth embodiment are assigned with the same codes, and the detailed description will be omitted.

The second recording apparatus 530 is, for example, a recording apparatus set in home. As shown in FIG. 40, the second recording apparatus 530 includes: a recorded program obtainment unit 511; a recorded program accumulation unit 512; a program combination key judgment unit 531; a recorded program combination unit 532; and a recorded program deletion unit 533.

The program combination key judgment unit 531 extracts a combination key from the first recorded content obtained by the recorded program obtainment unit 511, and judges whether or not the extracted combination key exists in the second recorded content accumulated in the recorded program accumulation unit 512. The recorded program combination unit 532 combines the first recorded content and the second recorded content only in the case where the combination key extracted from the first recorded content exists in the second recorded content.

In the case where the first recorded content and the second recorded content have been combined by the recorded program combination unit 532, the recorded program deletion unit 533 deletes the first recorded content from the semiconductor memory which includes a program recorded by the first recording apparatus 400 and obtained by the recorded program obtainment unit 511.

Figure 41:
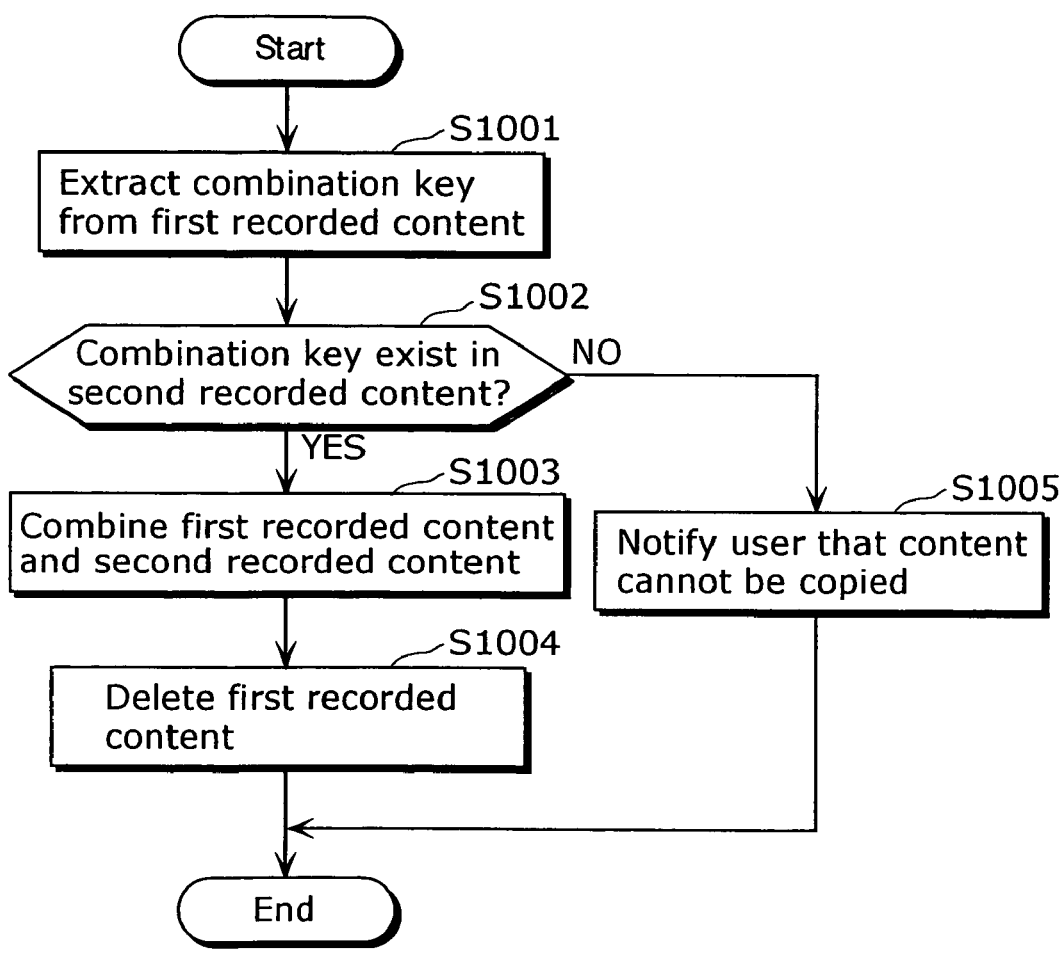
FIG. 41 is a flowchart showing a flow of operations performed in the case where the first recording content and the second recording content are combined in the second recording apparatus.

Next, the operations performed in the following case will be described: the first recorded content and the second recorded content are combined in the second recording apparatus 530 configured as described above. FIG. 41 is a flowchart showing a flow of the operations performed in the case where the first recording content and the second recording content are combined in the second recording apparatus 530.

The program combination key judgment unit 531 extracts a combination key from the first recorded content obtained by the recorded program obtainment unit 511 (step S1001). Next, the program combination key judgment unit 531 judges whether or not the extracted combination key exists in the second recorded content accumulated in the recorded program accumulation unit 512 (step S1002). As a result, in the case where the extracted combination key exists in the second recorded content (YES in the step S1002), the recorded program combination unit 532 combines the first recorded content and the second recorded content (step S1003). Then, the recorded program deletion unit 533 deletes the first recorded content from the semiconductor memory which includes a program recorded by the first recording apparatus 400 and obtained by the recorded program obtainment unit 511 (step S1004).

On the other hand, in the case where the extracted combination key does not exist in the second recorded content (NO in the step S1002), the user is notified that the first recorded content and the second recorded content cannot be combined (step S1005).

As described above, regarding the contents recorded by the first recording apparatus 400, by authorizing copying of the recorded content into the recorded content having the combination key, the recorded programs obtained in the present embodiment can be combined. Also, unlicensed copying of the recorded content can be prevented by prohibiting copying of the recorded content into the media which do not have the combination key.

Twelfth Embodiment

According to the seventh embodiment, the following case has been described: when recording is requested from the cellular phone, the in-home recording apparatus is in the recordable state. However, since the in-home recording apparatus is generally operated by the user who uses the apparatus at home, the in-home recording apparatus may not be always in the recordable state when the recording is requested from the cellular phone. According to the present embodiment, in the case where the in-home recording apparatus is not in the recordable state when the recording is requested from the cellular phone, the cellular phone is notified that the recording cannot be performed by the in-home recording apparatus. Then, the recording is performed by the cellular phone. Moreover, the following case will be described: in the case where the in-home recording apparatus becomes in the recordable state, the program specified by the cellular phone is recorded by the in-home recording apparatus, and the recording by the cellular phone is cancelled.

Figure 42:
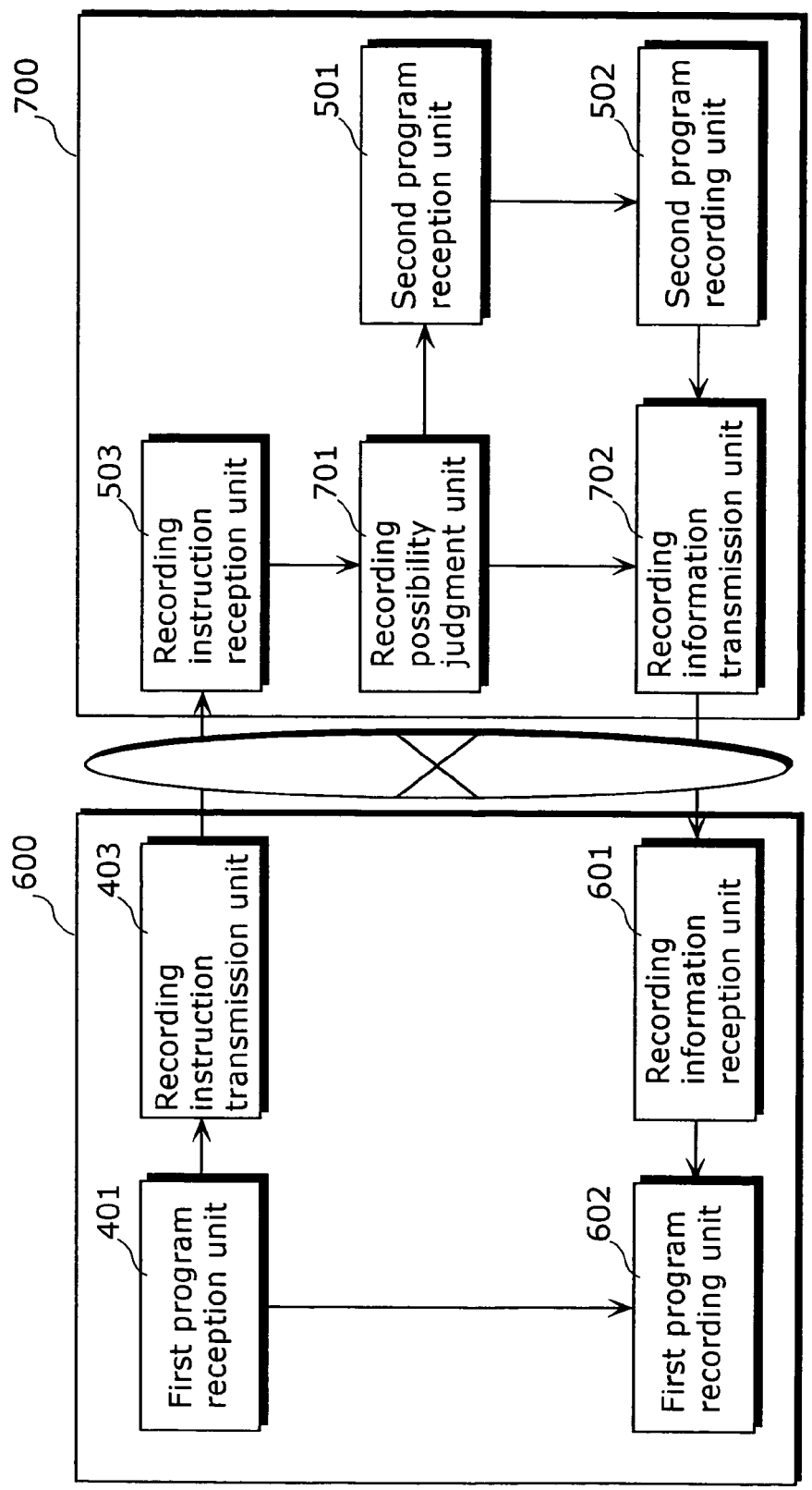
FIG. 42 is a block diagram showing a configuration of a program recording system according to the twelfth embodiment of the present invention.

FIG. 42 is a block diagram showing a configuration of a program recording system according to the twelfth embodiment of the present invention. The same components as the seventh embodiment are assigned with the same codes, and the detailed description will be omitted. Also, the hardware configuration in which the program recording system according to the present embodiment is the same as the seventh embodiment as shown in FIG. 26, thus the description will be omitted.

In addition to the configuration according to the seventh embodiment, the second recording apparatus 700 includes a recording possibility judgment unit 701. Also, the following operations are different from the seventh embodiment: the operations performed by the recording information reception unit 601 and the first program recording unit 602 of the first recording apparatus 600; and the operations performed by the recording information transmission unit 702 of the second recording apparatus 700. The recording possibility judgment unit 701 judges whether or not it is possible to record the program by the second program recording unit 502, the program being instructed to record by the first recording apparatus.

Figure 43:
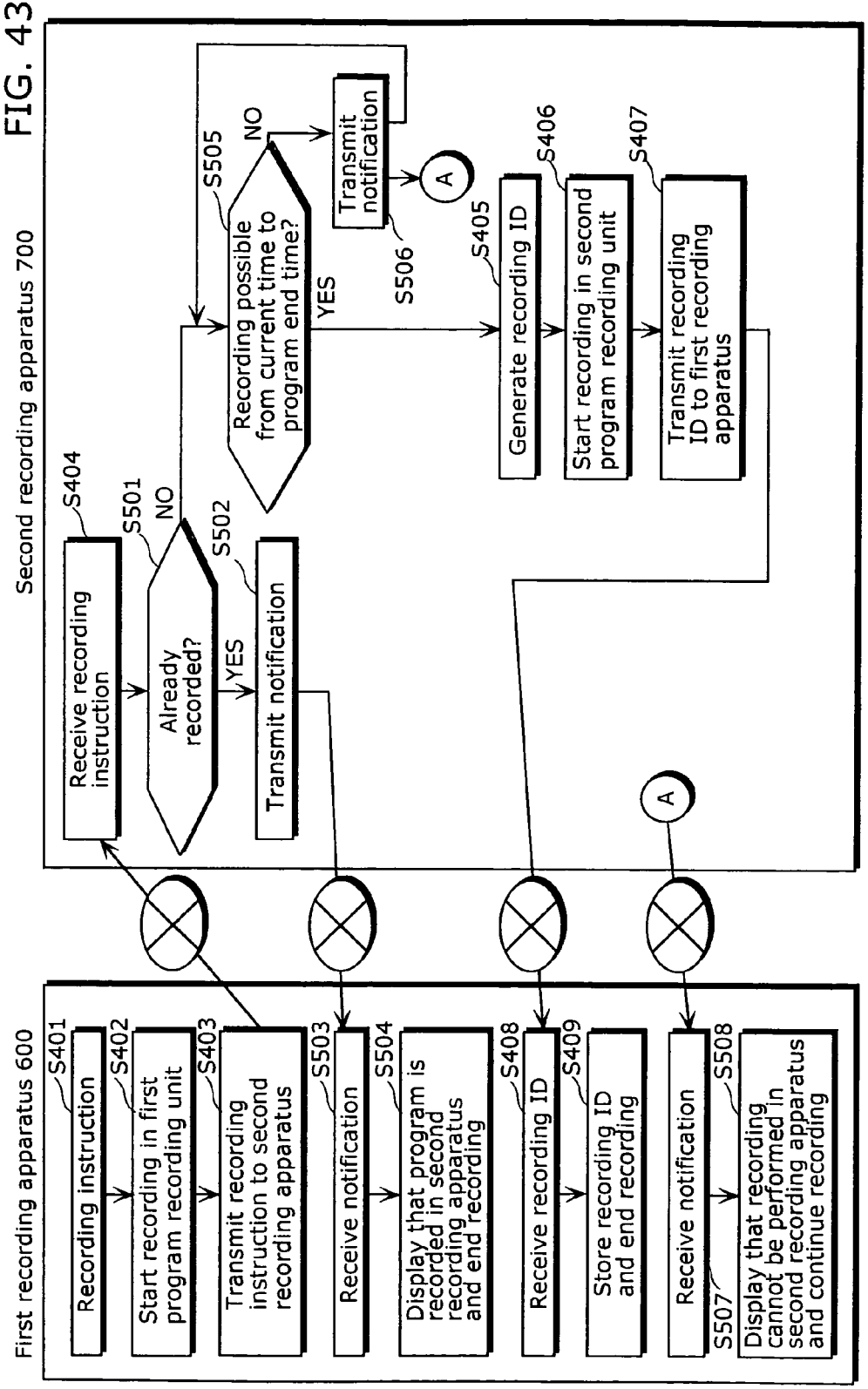
FIG. 43 is a flowchart showing a flow of operations performed in the case where a program is recorded in a program recording system.

Next, the operations performed in the following case will be described: the program is recorded when the program is watched using the cellular phone 2704 which is the first recording apparatus 600 included in the program recording system configured as described above. FIG. 43 is a flowchart showing a flow of the operations performed in the case where the program is recorded in the program recording system. Here, the same operations as the seventh embodiment are assigned with the same codes, and the detailed description will be omitted.

First, the operations from the request of recording the program watched by the user (step S401) to the reception of the recording instruction provided by the recording instruction reception unit 503 in the second recording apparatus 700 (step S404) are the same as the seventh embodiment.

Figure 45:
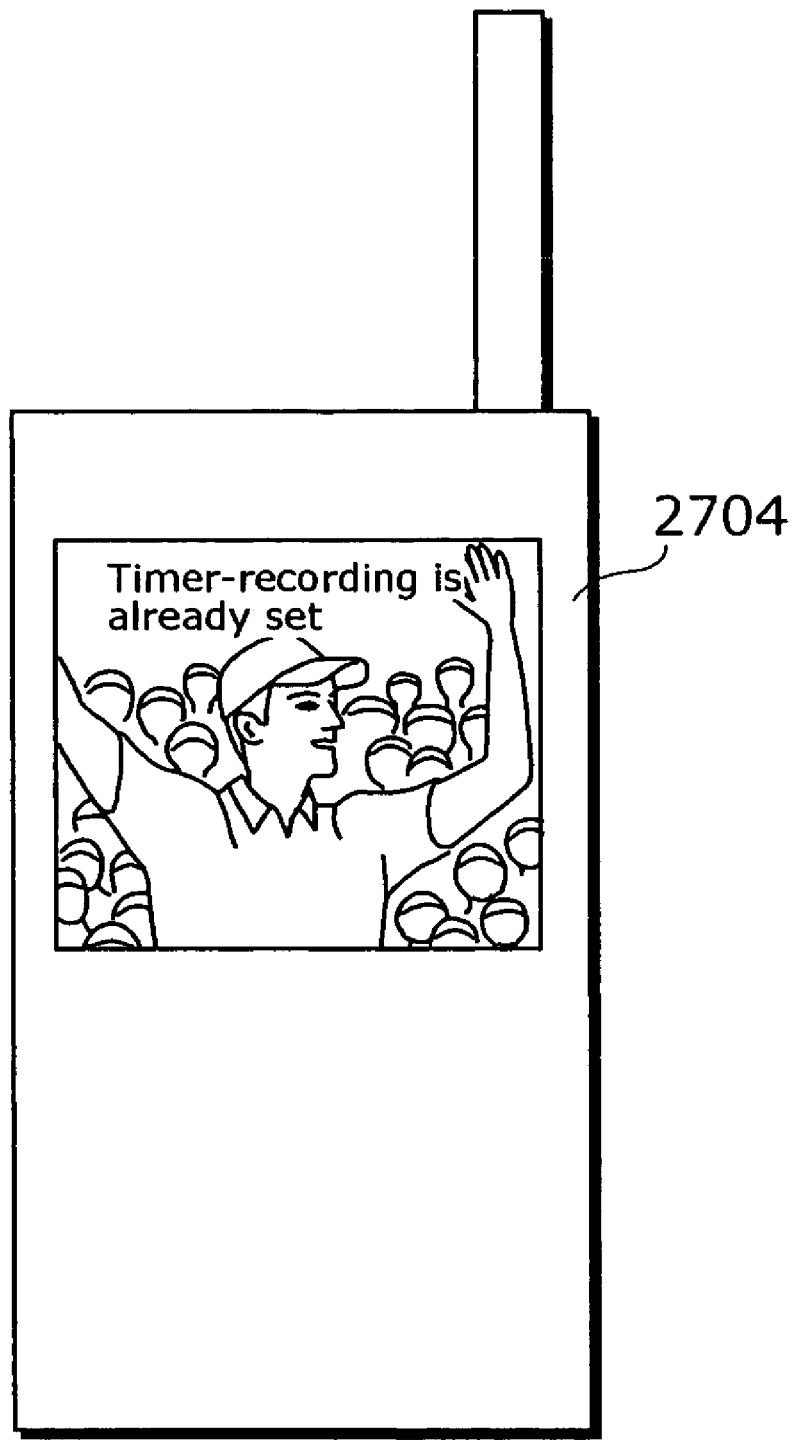
FIG. 45 is a display example of notifying that a program instructed to record is already recorded.

Next, the recording possibility judgment unit 701 judges whether or not the program instructed to record by the first recording apparatus 600 is currently recorded by the second program recording unit 502 (step S501). Here, in the case where the program is already recorded (YES in the step S501), the recording information transmission unit 702 notifies the first recording apparatus 600 that the program instructed to record is already recorded (step S502). The recording information reception unit 601 of the first recording apparatus 600 receives notification indicating that the program instructed to record is already recorded, and notifies the received notification to the first program recording unit 602 (step S503). After receiving the notification indicating that the program instructed to record is already recorded, the first program recording unit 602 displays a message as shown in FIG. 45, and ends recording the recorded program (step S504). Since the program is already recorded in the second recording apparatus 700, the program which has been recorded by the first recording apparatus 600 may be deleted.

On the other hand, in the case where the program instructed to record by the first recording apparatus 600 is not recorded (NO in step S501), the recording possibility judgment unit 701 checks the end time of the program instructed to record using a program guide, and judges whether or not the program can be recorded until the end time (step S505). Here, in the case where recording is not possible (NO in step S505), the recording information transmission unit 702 notifies the first recording apparatus 600 that recording cannot be performed (step S506). Also, in the case where the recording becomes possible before the end time of the program instructed to record, the recording possibility judgment unit 701 repeats the judgment processing.

Figure 44:
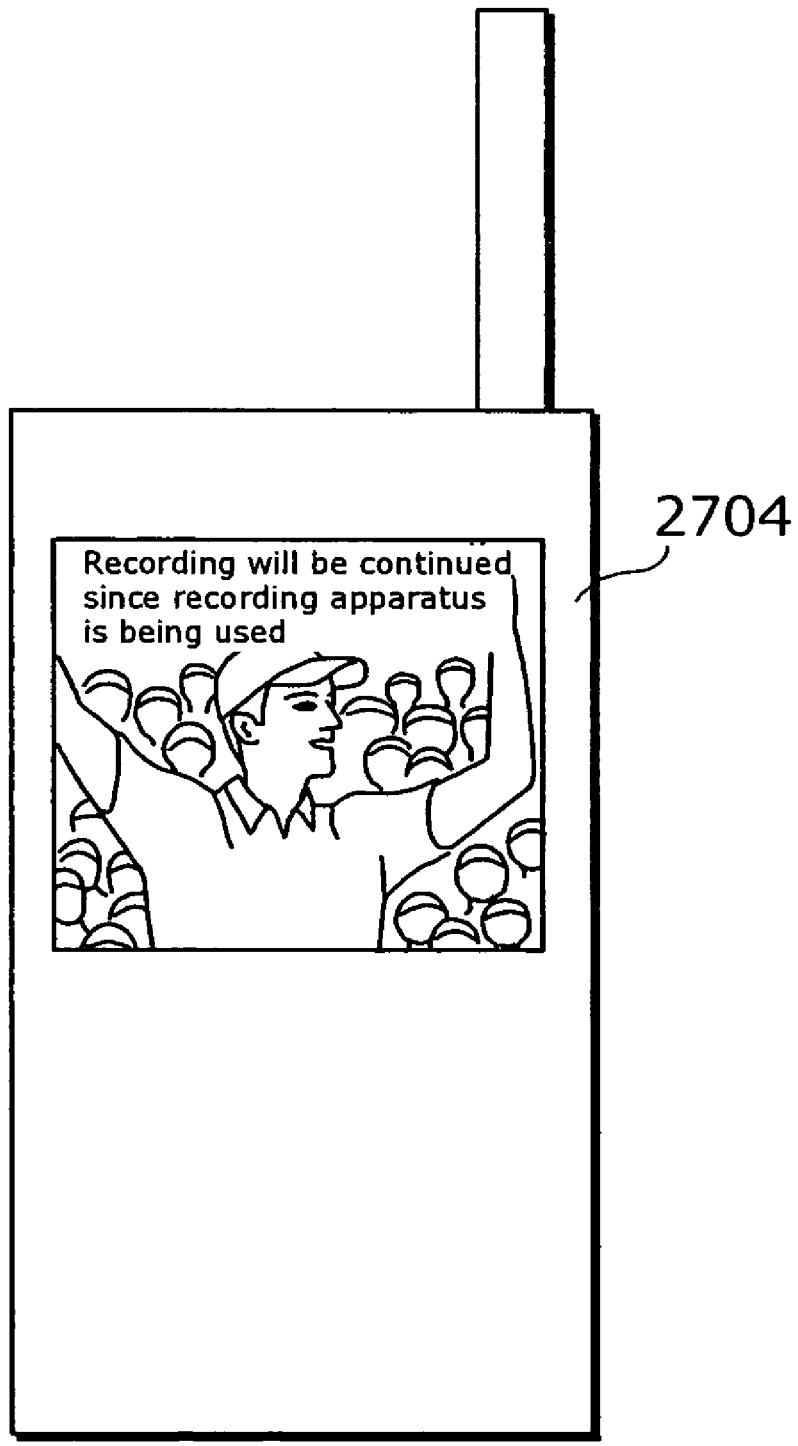
FIG. 44 is a diagram showing a display example of notifying that recording cannot be performed.

After receiving the notification indicating that the recording cannot be performed, the recording information reception unit 601 of the first recording apparatus 600 notifies the received notification to the first program recording unit 602 (step S507). After receiving the notification indicating that the recording cannot be performed, the first program recording unit 602 displays a message as shown in FIG. 44, and continues to record the recorded program (step S508).

For example, suppose that the start time of the program instructed to record by the first recording apparatus 600 is 14:00, the end time is 16:00, and the current time is 14:15. In order to record this program by the second program recording unit 502 of the second recording apparatus 700 until the end time, other programs cannot be recorded until 16:00. Here, in the case where timer recording has been previously set so that another program can be recorded from 15:00 to 15:30, the program is accumulated in the first recording apparatus 600 until 15:30 in order to record the program for which the timer recording has been set. Then, the other program is recorded by the second recording apparatus 700 from 15:30 to 16:00.

On the other hand, in the case where the recording is possible (YES in step S505), in the similar way to the seventh embodiment, the following operations are performed: from the processing of generating the recording ID in the second program recording unit 502 (step S405) to the processing of ending recording the recorded program by the first program recording unit 402 (step S409). Also, in the case where the state has become that recording can be performed by the second program recording unit 502 finally, the same operations as described above are performed. In the above mentioned example as described above, at the time of 15:30, it is judged that the recording is possible. Until then, the recording is continued by the first recording apparatus 600.

As described above, when the recording is instructed from the first recording apparatus to the second recording apparatus, the recording in the first recording apparatus is continued according to the situation such as that the second recording apparatus is used. Thereby, recording according to the situation can be easily performed.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

As described above, the watching support apparatus according to the present invention can support watching and recording of the program according to the user's residential area and the current location. The watching support apparatus according to the present invention is useful for watching and recording the program in the apparatus such as a TV, a hard disk recorder, a DVD recorder, a cellular phone, and an in-car display.

What is claimed is:

1. A watching support apparatus which supports watching of a program, said apparatus comprising:
   a same program judgment unit operable to judge sameness of the program included in a watching possible program guide which is a program guide in a current location of said apparatus and a program included in a recordable-program guide which is a program guide in a location where a recording apparatus is positioned;
   a display unit operable to display the sameness of the programs judged by said same program judgment unit;
   a recording apparatus position obtainment unit operable to obtain information indicating the location where the recording apparatus is positioned;
   a recordable-program guide obtainment unit operable to obtain the recordable-program guide in the location indicated in the information obtained by said recording apparatus position obtainment unit; and
   a watching possible program guide obtainment unit operable to obtain the watching possible program guide.

2. A watching support apparatus which supports watching of a program, said apparatus comprising:
   a same program judgment unit operable to judge sameness of the program included in a watching possible program guide which is a program guide in a current location of said apparatus and a program included in a recordable-program guide which is a program guide in a location where a recording apparatus is positioned;
   a display unit operable to display the sameness of the programs judged by said same program judgment unit;
   a recordable-program guide storage unit operable to store the recordable-program guide;
   a watching possible program guide storage unit operable to store the watching possible program guide;
   a recordable-program guide update unit operable to:
   obtain the watching possible program guide;
   judge whether or not the obtained watching possible program guide is the program guide in the location where the recording apparatus is positioned; and
   (i) store the obtained watching possible program guide into said recordable-program guide storage unit in the case where the obtained watching possible program guide is the program guide in the location where the recording apparatus is positioned, and (ii) store the obtained watching possible program guide into said watching possible program guide storage unit in the case where the obtained watching possible program guide is not the program guide in the location where the recording apparatus is positioned,
   wherein said same program judgment unit is operable to judge the sameness of a program included in the recordable-program guide stored in said recordable-program guide storage unit and a program included in the watching possible program guide stored in said watching possible program guide storage unit.

3. The watching support apparatus according to claim 2, further comprising:
   an associated program guide judgment unit operable to judge whether or not the recordable-program guide associated with the watching possible program guide is stored in said recordable-program guide storage unit, in the case where the obtained watching possible program guide is not the program guide in the location where the recording apparatus is positioned; and
   an associated program guide obtainment unit operable to obtain the recordable-program guide associated with the watching possible program guide in the case where said associated program guide judgment unit judges that the recordable-program guide associated with the watching possible program guide is not stored in said recordable-program guide storage unit.

4. A watching support apparatus which supports watching of a program, said apparatus comprising:
   a same program judgment unit operable to judge sameness of the program included in a watching possible program guide which is a program guide in a current location of said apparatus and a program included in a recordable-program guide which is a program guide in a location where a recording apparatus is positioned; and
   a display unit operable to display the sameness of the programs judged by said same program can be recorded by said recording apparatus, based on the sameness of the programs judged by said same program judgment unit, and
   said display unit is further operable to display a watching possible language of the program which can be recorded by the recording apparatus based on the recordable-program guide, in the case where the currently watched program can be recorded by said recording apparatus.

5. A watching support apparatus which supports watching of a program, said apparatus
   a same program judgment unit operable to judge sameness of the program included in a watching possible program guide which is a program guide in a current location of said apparatus and a program included in a recordable-program guide which is a program guide in a location where a recording apparatus is positioned; and
   a display unit operable to display the sameness of the programs judged by said same program judgment unit,
   wherein said display unit is operable to:
   add, to the watching possible program guide, information indicating whether or not each program can be recorded by said recording apparatus based on the sameness of the respective programs judged by said same program judgment unit; and
   display the watching possible program guide added with the information.

6. The watching support apparatus according to claim 5, further comprising
   a selection reception unit operable to receive a selection instruction of a program guide, and
   said display unit is operable to display one of the recordable-program guide, the watching possible program guide and the watching possible program guide added with the information indicating the recording possibility, based on the selection instruction.

7. A watching support apparatus which supports watching of a program, said apparatus comprising:
- a same program judgment unit operable to judge sameness of the program included in a watching possible program guide which is a program guide in a current location of said apparatus and a program included in a recordable-program guide which is a program guide in a location where a recording apparatus is positioned;
- a display unit operable to display the sameness of the programs judged by said same program judgment unit;
- a taste information accumulation unit operable to accumulate taste information; and
- a program recommendation unit operable to select a program based on the taste information, the watching possible program guide and the recordable-program guide, and to recommend the selected program,
- wherein said program recommendation unit is operable to preferentially select a program which is not included in the recordable-program guide from among the programs included in the watching possible program guide.

8. A program recording system comprising a first recording apparatus and a second recording apparatus,
- wherein said first recording apparatus includes:
- a first program reception unit operable to receive a program;
- a same program judgment unit operable to judge sameness of a program included in a watching possible program guide which is a program guide in a current location of said first recording apparatus and a program included in a recordable-program guide which is a program guide in a location where said second recording apparatus is positioned;
- a display unit operable to display the sameness of the programs judged by said same program judgment unit;
- a first program recording unit operable to record the program received by said first program reception unit; and
- a recording instruction unit operable to instruct said second recording apparatus to record the program recorded by said first program recording unit, in the case where said same program judgment unit judges that the same program as the program recorded by said program recording unit is included in the recordable-program guide, and
- said second recording apparatus includes:
- a second program reception unit operable to receive a program instructed to record by said recording instruction unit; and
- a second program recording unit operable to record the program received by said second program reception unit.

9. The program recording system according to claim 8, wherein said second recording apparatus further includes
- a recording information transmission unit operable to notify said first recording apparatus that said second program recording unit has started recording the program instructed to record, and
- said first program recording unit is operable to cancel recording the program after said recording information transmission unit notifies the recording start.

10. The program recording system according to claim 9, wherein said second program recording unit is operable to generate a recording ID for specifying the program instructed to record, to record the program so that the program is associated with the recording ID,
- said recording information transmission unit is operable to notify the recording ID to said first recording apparatus, and
- said first program recording unit is operable to associate the notified recording ID with the program, and to store the recording ID associated with the program.

11. The program recording system according to claim 10, wherein said second recording apparatus further includes:
- a recorded program obtainment unit operable to obtain the program recorded by said first recording apparatus; and
- a program combination unit operable to combine the obtained program and the program recorded by said second program recording unit, based on the recording ID.

12. The program recording system according to claim 11, wherein said second recording apparatus further includes:
- a sampling moving picture extraction unit operable to extract respective content data for a time part which is common between the program obtained by said recording program obtainment unit and the program recorded by said second program recording unit;
- a sound volume power measurement unit operable to measure respective sound volume powers of the content data extracted by said sampling moving picture extraction unit; and
- an amendment amount calculation unit operable to calculate an amendment amount of at least one of the sound volume powers so that the respective sound volume powers measured by said sound volume power measurement unit are the same, and
- said program combination unit is operable to amend at least one of the sound volume powers based on the amendment amount calculated by said amendment amount calculation unit, and to combine the program obtained by said recorded program obtainment unit and the program recorded by said second program recording unit.

13. The program recording system according to claim 11, wherein said second recording apparatus further includes:
- a tag information obtainment unit operable to obtain tag information related to the program obtained by said recorded program obtainment unit and the program recorded by said second program recording unit; and
- a switching part detection unit operable to detect a switching part of scenes of the program based on the tag information obtained by said tag information obtainment unit, and
- said program combination unit is operable to combine the program obtained by said recorded program obtainment unit and the program recorded by said second program recording unit in the switching part of scenes of the program detected by said switching part detection unit.

14. The program recording system according to claim 11, wherein said second recording apparatus further includes
- a combination key judgment unit operable to extract a combination key from the program obtained by said recorded program obtainment unit, and to judge whether or not the extracted combination key exists in the program recorded by said second program recording unit, and
- said program combination unit is operable to combine the program obtained by said recorded program obtainment unit and the program recorded by said second program recording unit, in the case where said combination key judgment unit judges that the combination key exists in the program recorded by said second program recording unit.

15. The program recording system according to claim 14, wherein said second recording apparatus further includes a recorded program deletion unit operable to delete the program obtained by said recorded program obtainment unit from the obtainment source of the program.

16. The program recording system according to claim 9, wherein said second recording apparatus further includes a recording possibility judgment unit operable to judge whether or not recording is possible when the recording instruction is received from said recording instruction unit, and said recording information transmission unit is operable to notify said first recording apparatus that recording is not possible when said recording possibility judgment unit judges that the recording is not possible.

17. The program recording system according to claim 16, wherein said recording possibility judgment unit is further operable to judge whether or not the program instructed to record is being recorded by said second program recording unit when the recording instruction is received from said recording instruction unit, and said recording information transmission unit is operable to notify said first recording apparatus that the program is being recorded when said recording possibility judgment unit judges that the program is being recorded.

18. A program recording method for recording a program in a system comprising a first recording apparatus and a second recording apparatus, the method comprising the following steps executed in said first recording apparatus:

receiving a program;

judging sameness of a program included in a watching possible program guide which is a program guide in a current location of said apparatus and a program included in a recordable-program guide which is a program guide in a location where said second recording apparatus is positioned;

displaying sameness of the programs judged by said same program judgment unit;

recording the program received by said first program reception unit; and instructing said second recording apparatus to record the program recorded in said first program recording, in the case where said same program judgment unit judges that the same program as the program recorded by said program recording unit is included in the recordable-program guide, and the method further comprising the following steps executed in said second recording apparatus:

receiving a program instructed to record in said recording instructing; and recording the program received in said second program receiving.

19. A computer program recorded on a computer-readable storage medium for recording a program in a system comprising a first recording apparatus and a second recording apparatus, said computer program comprising the following steps in said first recording apparatus:

receiving a program;

judging sameness of the program included in a watching possible program guide which is a program guide in a current location of said apparatus and a program included in a recordable-program guide which is a program guide in a location where said second recording apparatus is positioned;

displaying sameness of the programs judged in said same program judging;

recording the program received in said first program receiving; and instructing said second recording apparatus to record the program recorded in said first program recording, in the case where in said same program judging it is judged that the same program as the program recorded by said program recording unit is included in the recordable-program guide, and said computer program causing a computer to execute the following steps in said second recording apparatus:

receiving a program instructed to record in said recording instructing; and recording the program received in said second program receiving.

* * * * *